United States Patent [19]

Robinson et al.

[11] 4,134,117
[45] Jan. 9, 1979

[54] LORAN C RECEIVER

[75] Inventors: Eugene A. Robinson; Jerry L. Setliff, both of Dallas, Tex.

[73] Assignee: Texas Instruments Incorporated, Dallas, Tex.

[21] Appl. No.: 843,383

[22] Filed: Oct. 19, 1977

[51] Int. Cl.² .................................................. G01S 1/24
[52] U.S. Cl. ...................................... 343/103; 364/449
[58] Field of Search ........................... 343/103, 105 R; 364/449

[56] References Cited

U.S. PATENT DOCUMENTS

| 3,947,849 | 3/1976 | Fehlner et al. | 343/103 |
| 4,024,383 | 5/1977 | Beasley | 364/449 |

*Primary Examiner*—Theodore M. Blum
*Attorney, Agent, or Firm*—Rene' E. Grossman; Alva H. Bandy

[57] ABSTRACT

A Loran C receiver is disclosed which has a scanned type keyboard including data entry, primary function and special function keys. The primary function keys include an automatic key for selecting automatic operation. A microprocessor is controlled by the keyboard, a timing means, a real time interrupt, a counter, a groundwave phase and envelope sample strobe generator, a delayed phase channel sample strobe generator and a latches and multiplexer. The timing means orients the microprocessor as to time and triggers the counter. The counter provides the proper count to the groundwave phase and envelope strobe generator and delayed phase channel sample strobe generator for producing a plurality of sampling signals for the latches and multiplexer. The real time interrupt produces a data ready or cycle done signal for the microprocessor. The latches of the latches and multiplexer sample at selected time intervals digitized phase indicating outputs representative of the RF signals received by the receiver from master and secondary stations of a GRI. The multiplexer multiplexes the digitized phase information into the microprocessor in response to a command from the microprocessor. The command is given after receipt of the data ready (cycle done) signal. The microprocessor then processes the digitized phase information for GRI searching, coarse envelope and cycle identification of the master and secondary stations of the GRI and determining sequentially for display at regular intervals the time differences between the master station and each slave station.

17 Claims, 48 Drawing Figures

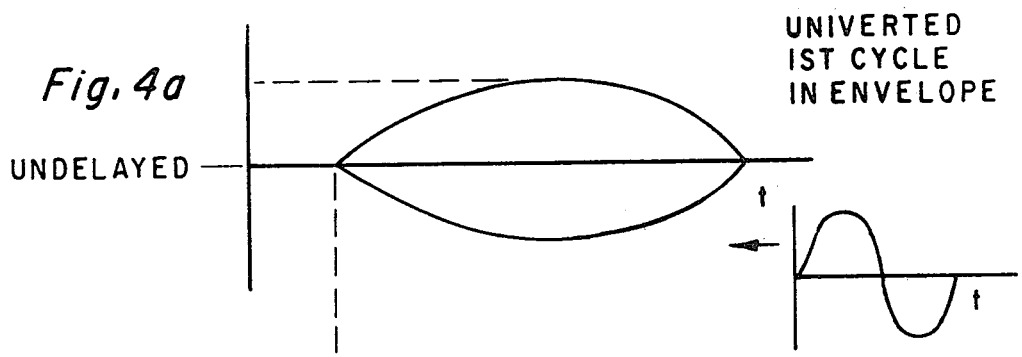
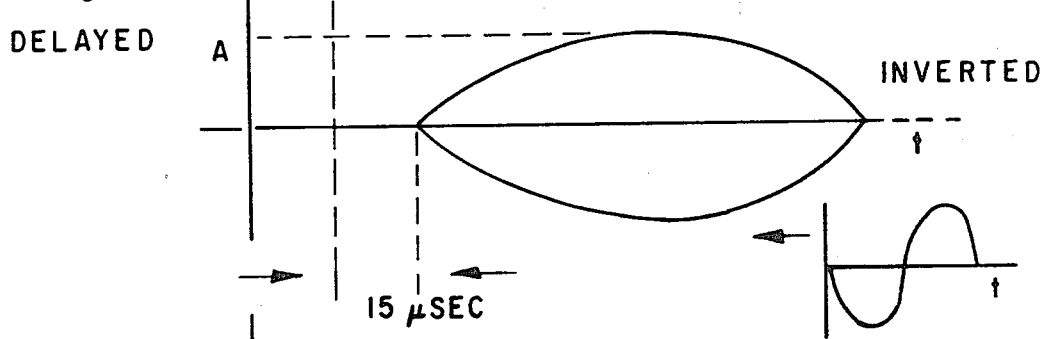
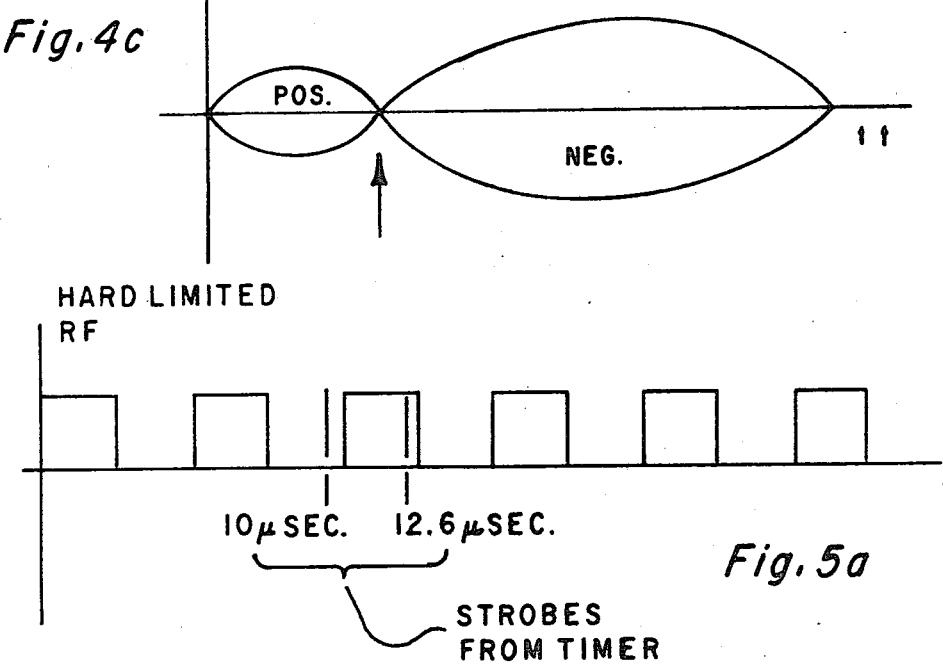
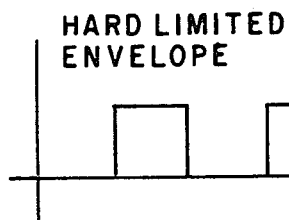

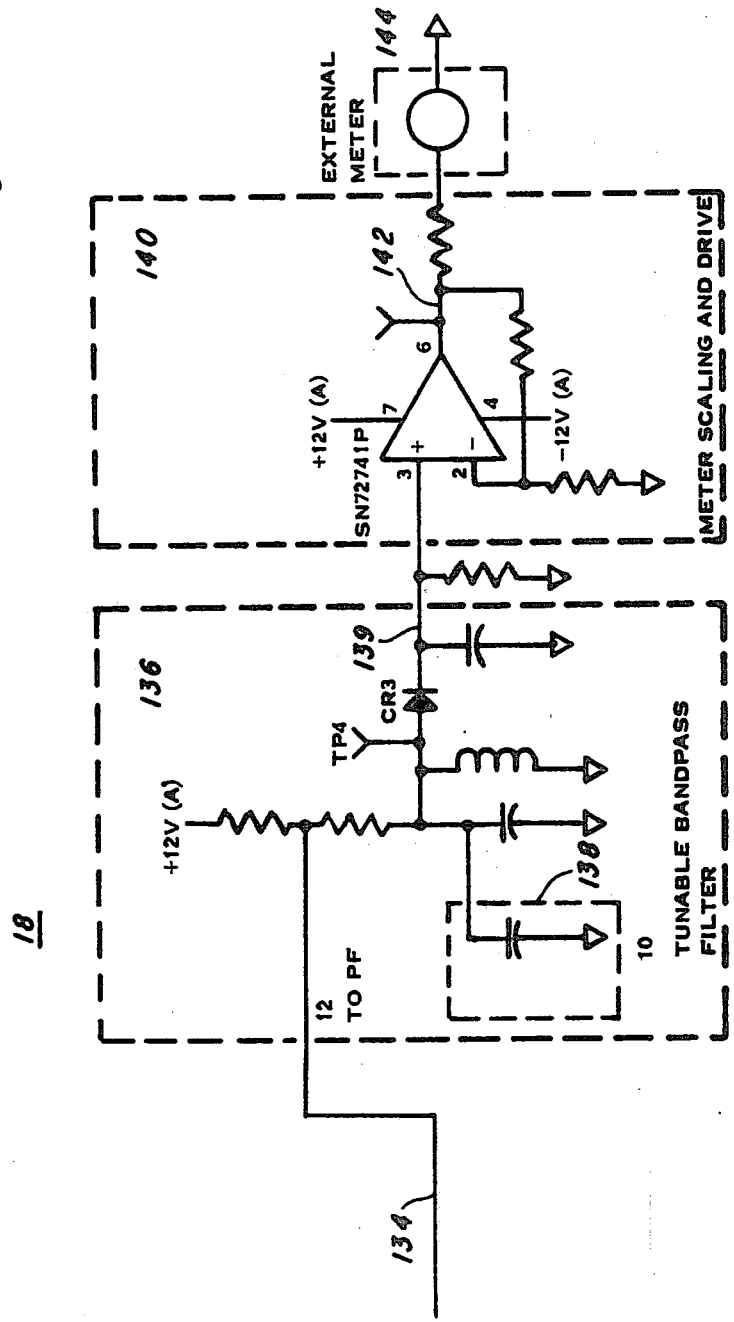

| Fig. 7a | Fig. 7g | Fig. 7h |
| --- | --- | --- |
| Fig. 7b | Fig. 7c | Fig. 7f |
|  | Fig. 7d | Fig. 7e |

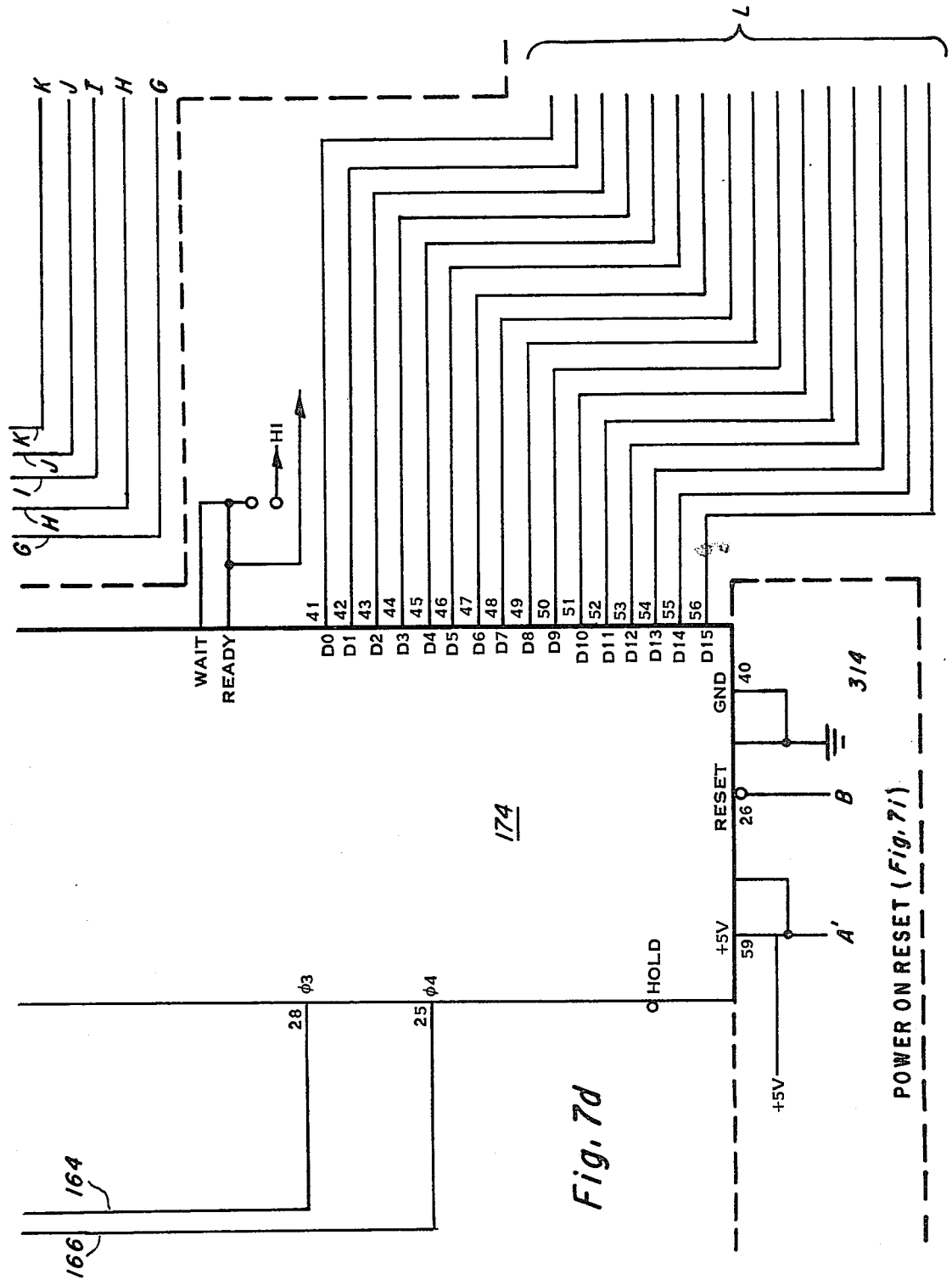

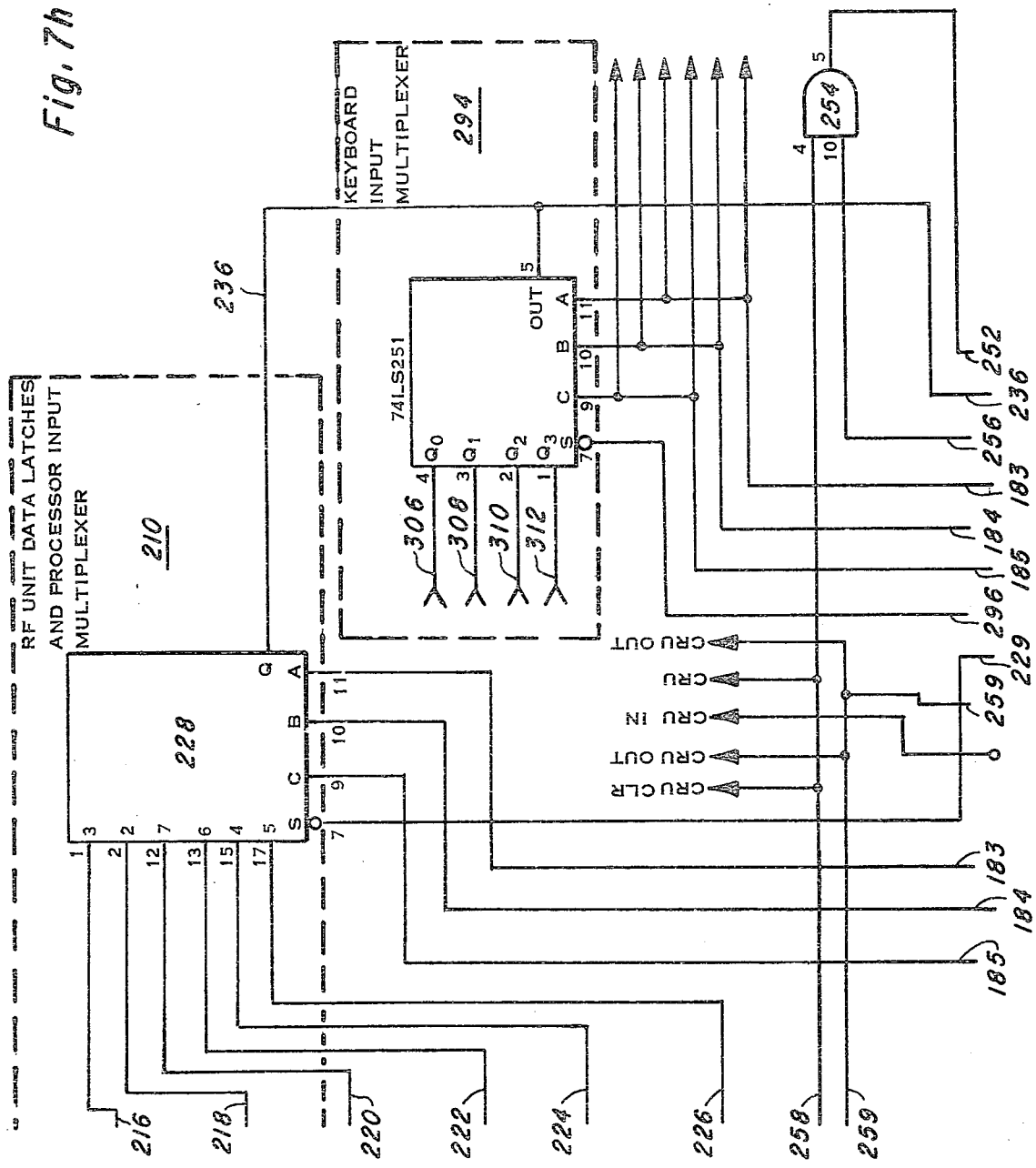

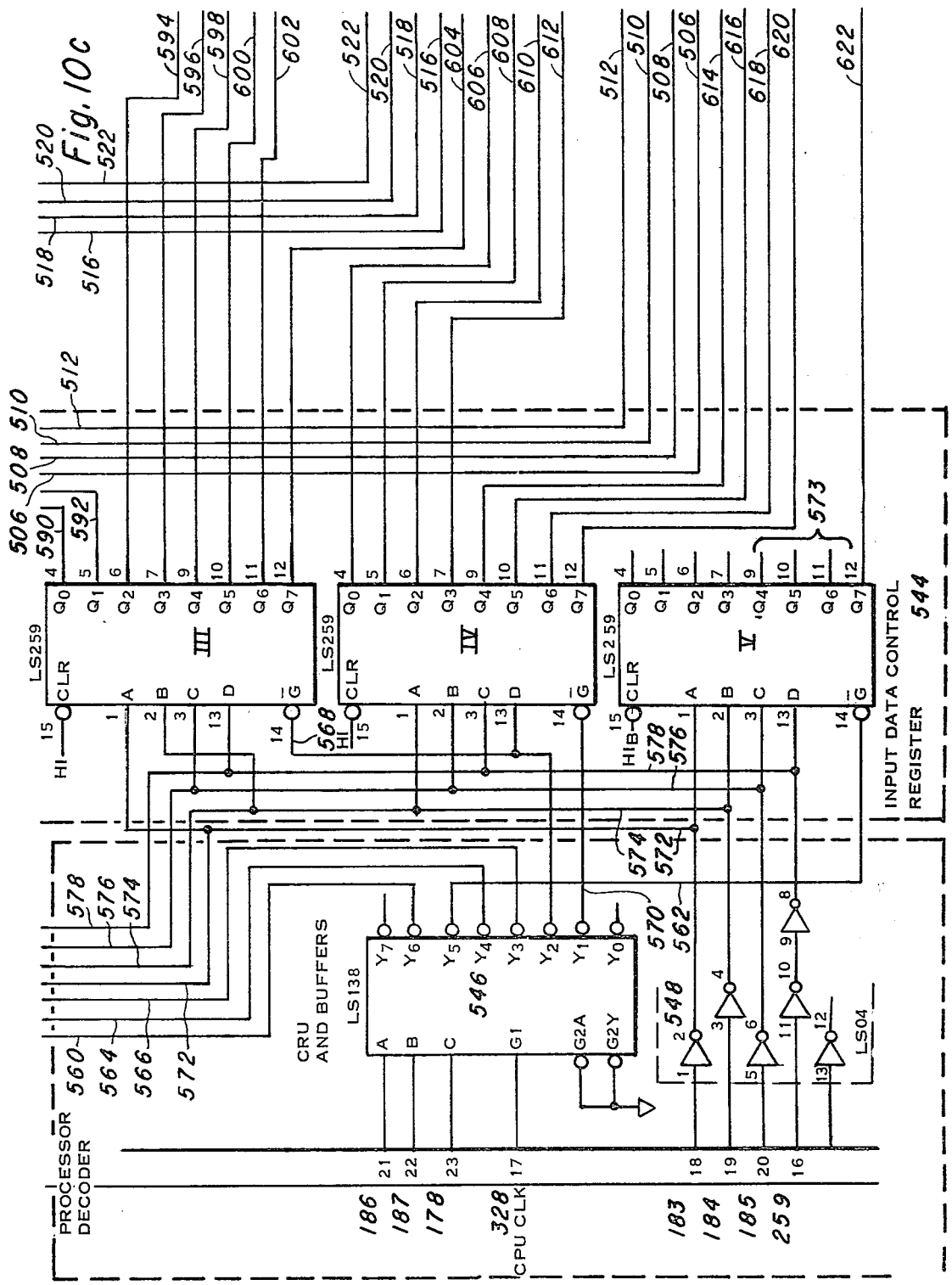

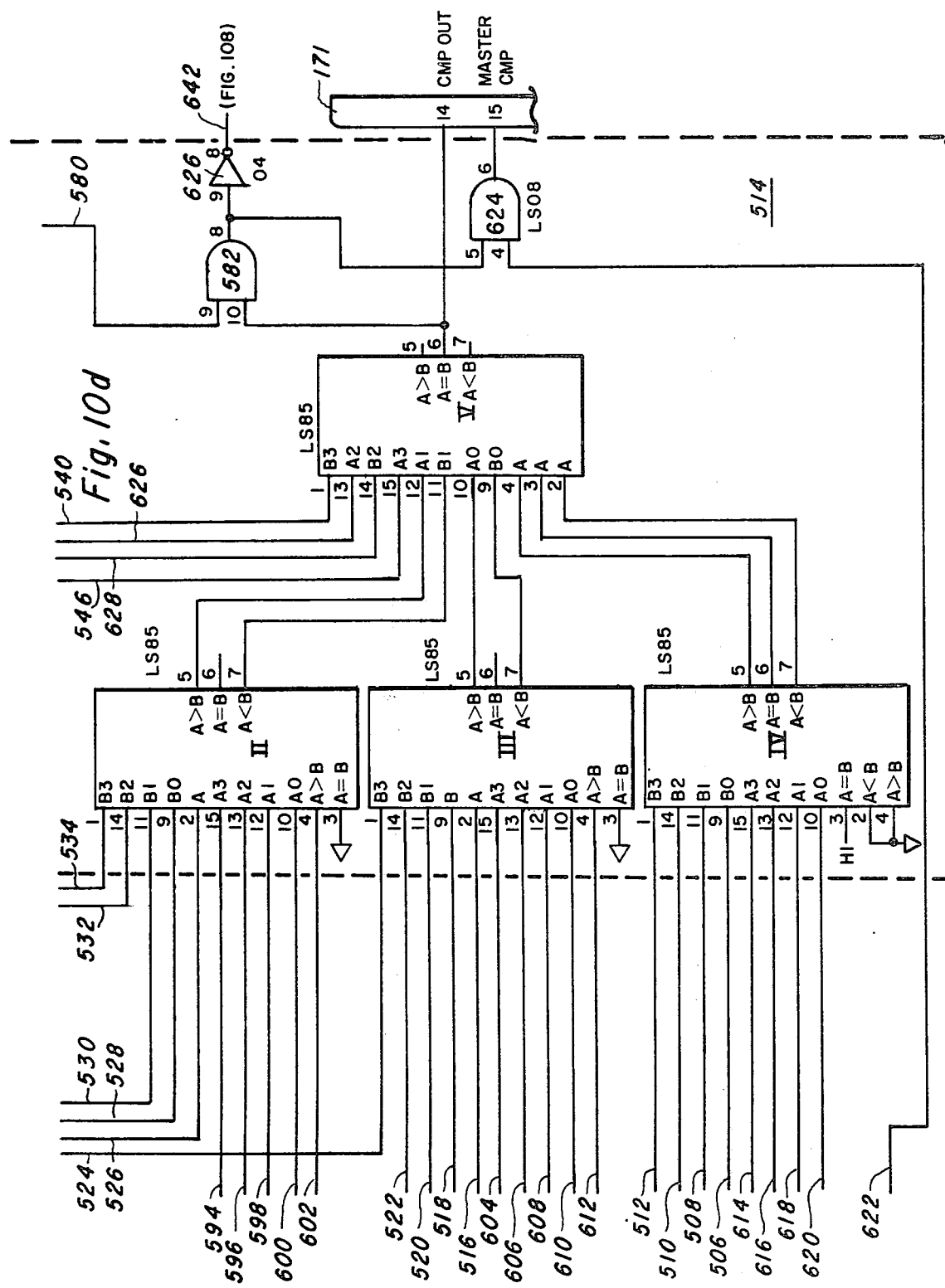

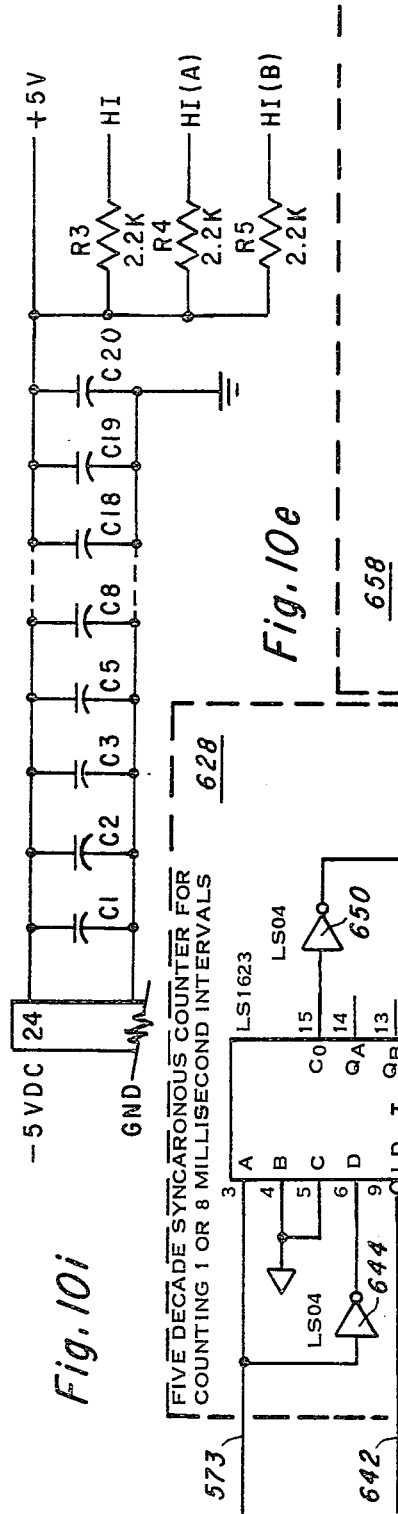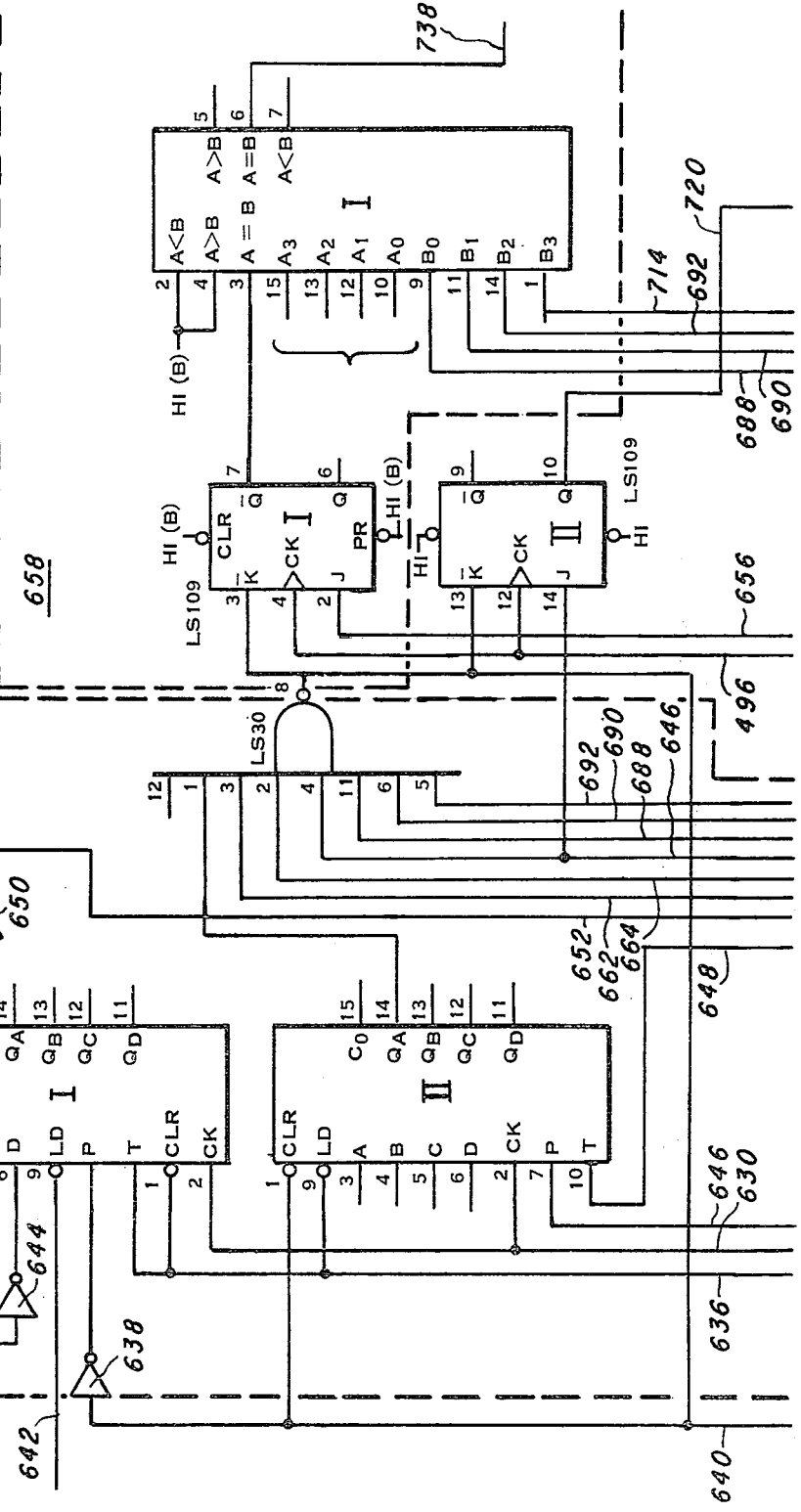
Fig. 10i
Fig. 10e

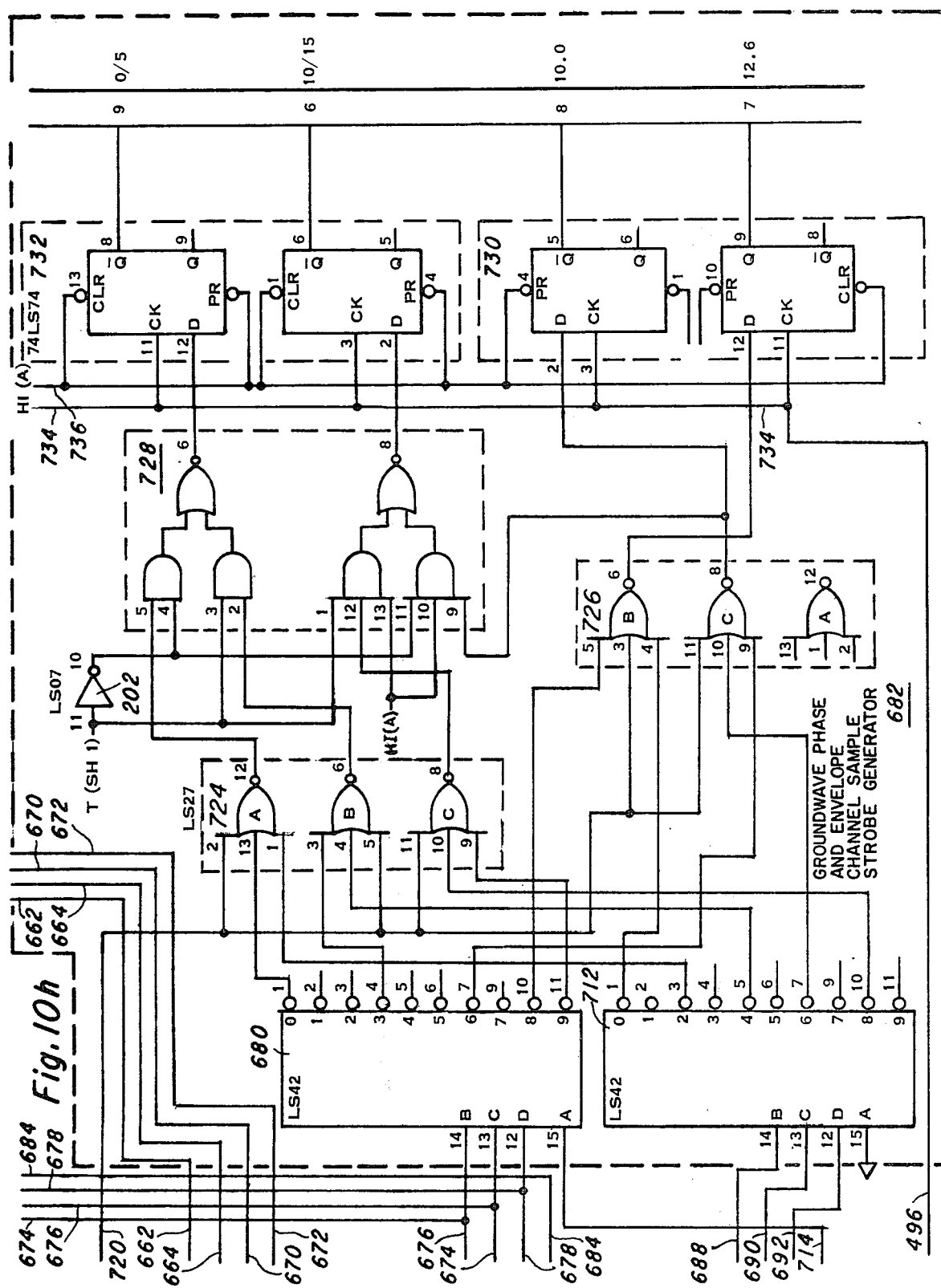

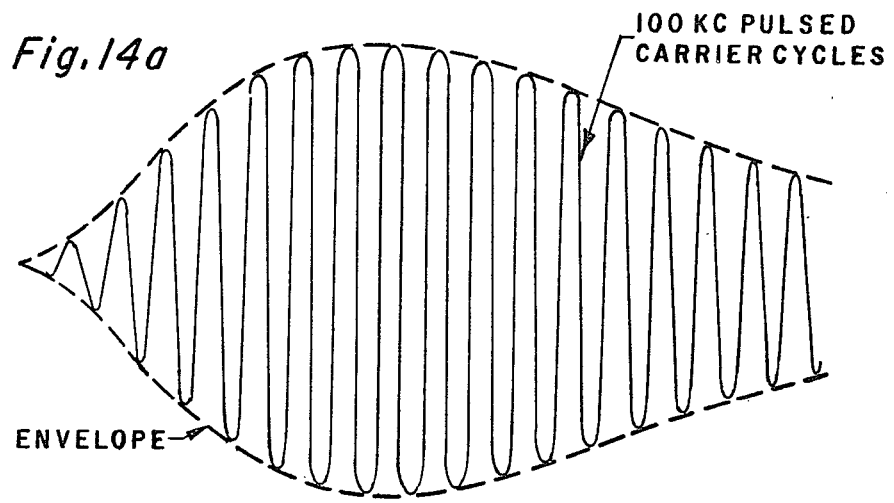
Fig. 14a
100 KC PULSED CARRIER CYCLES
ENVELOPE
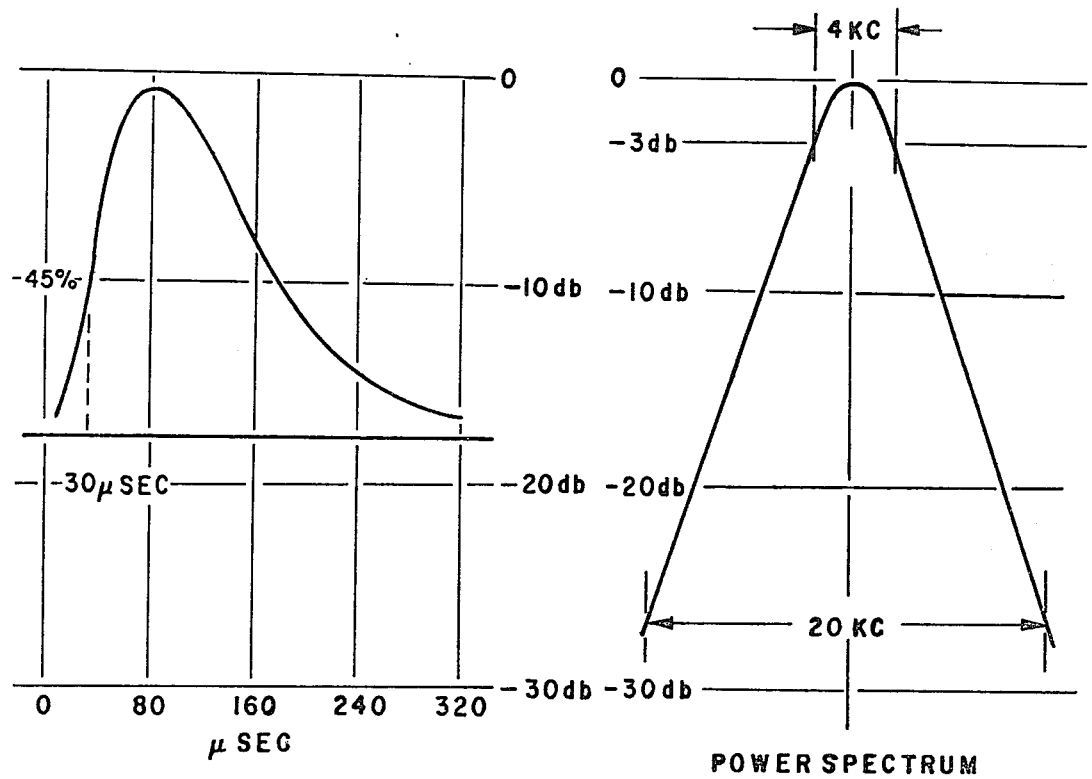
Fig. 14b
Fig. 14c
POWER SPECTRUM

LORAN C RECEIVER

This invention relates to navigational aids, and more particularly, to an improved Loran C receiver.

The Loran C navigation system includes groups of transmitting stations which provide precisely timed RF pulsed pulses for the establishment of a highly accurate hyperbolic navigation grid. These sharp rising pulses, having a carrier frequency between 90–110KHz, permit the utilization of the ground wave propagated signals to a range of about 1,300 to 1,400 nautical miles, and the first-hop sky wave to about 2,100 nautical miles during the day and about 2,300 nautical miles at night.

A Loran C group, or net, is comprised of a master station and two, three, or four associated slaves or secondary stations. Transmissions from the master station are received at one of the slave stations; the slave station delays a precise time interval and then transmits its own signal. The time differences between the reception of the master and one of the slave's pulses establishes a first family of hyperbolic contours wherein the two stations serve as foci; the other slave station likewise transmits its own pulses which together with the master pulse generates a second family of hyperbolic contours. These hyperbolic contours are charted on maps of the area to be served. Thus, a receiver in the service area may be tuned in to the master and slave stations, the time difference between the reception of the slave pulses relative to the master pulses determined and the time differences utilized to locate contours. The applicable contours are then traced to their intersection to determine the position of the receiver on the map.

The transmitted pulse is as shown in FIG. 14a.

The pulse shape and its spectrum are shown in FIGS. 14b and 14c, respectively.

As sky waves at 100KHz are delayed by as little as 30 microseconds after the ground wave, transmitted pulses are shaped to rise to peak amplitude in 65 microseconds. This rise time allows the receiver to measure time and phase on the leading edge of its pulse without sky wave contamination.

The theoretical pulse shape when tailored to match spectrum requirements has approximately 25 percent of the peak power at the sampling point. In actual practice, the transmitter pulse shape is modified by adjusting the transmitter so that about 56 percent of peak power is obtained at the sampling point. The pulses are transmitted as vertically polarized radio signals.

Each Loran C system transmits at a particular repetition rate. Repetition rates are defined from 10 to 99,990 microseconds in 10 microsecond increments; however, 35,000–40,000 microseconds is a practical minimum.

To increase average transmitted power, each station transmits a group of eight pulses spaced at 1,000 microsecond intervals. The pulse groups are phase modulated. The phase modulation within the pulse groups eliminates the effects of sky wave contamination on pulses subsequent to the first in each group and provides necessary logical information for signal search, identification and lock.

To provide visual identification of the master station, a ninth pulse is transmitted 2,000 microseconds after the last pulse of the master group.

As the user receiver measures both phase and envelope time differences, ground stations must maintain precise coherence between the pulse envelope and the radio frequency (RF) cycles within the envelope.

Loran C time difference measurements are made by a two-step method: (1) the coarse reading is obtained by measuring the time difference between the envelopes of corresponding pulses of the master and slave groups; and (2) a precise time difference reading is obtained by measuring the relative phase of the carrier frequency of the master and slave pulses.

Loran C receivers are of the manual and automatic type, and utilize either a linear with wide dynamic range or hard limiting techniques. These receivers include an RF front end, a digital timing and processor section and a display for the time difference measurement. The manual receivers are linear receivers with AGC front ends and a CRT display of the received pulses (master and slave for greater use during acquisition and time difference measurement). A problem with Loran C receivers is their cost. Up to the present invention, their cost has limited their use to the military and commercial market. Further, the prior art systems have selected a cycle of each pulse for time measurement. This cycle identification is very difficult to achieve. Failure, though to identify the same cycle in each pulse results in time errors and false position determination.

Accordingly, it is an object of this invention to provide a low cost, rugged, and highly reliable Loran C receiver.

A further object is to provide an improved automatic hard limited Loran C receiver.

Still another object of the invention is to provide a Loran receiver system providing phase lock to zero crossings which are the same for all stations rather than being on the absolutely correct zero crossing.

Still another object of the invention is to provide a Loran C receiver that is easy to operate and equipped with error indicating means for insuring accurate operation.

Briefly stated the invention comprises an improved Loran C receiver. It receives Loran C. transmissions for the chain of stations defined by a unique Group Repetition Interval (GRI). The time difference (TD) between the reception of the master station in the chain and each of the secondary stations is computed using a microprocessor programmed to compare many interactions of undelayed LORAN signals with delayed signals. This information is also used to identify the Group Repitition Interval (GRI). The time difference is displayed as a six digit number for use as a navigation aid. The receiver is operated by an operator utilizing a keyboard also in the front panel.

The novel features characteristic of the embodiment of the invention may best be understood by reference to the following detailed description when read in conjunction with the accompanying drawings wherein:

FIGS. 4a–4c show the pulse evnelope outputs of the undelayed channel, the delayed channel and the summing amplifier of the RF unit;

FIGS. 5a and 5b show the RF unit output signal waveforms;

FIGS. 6a and 6b show schematically the optional notch filter;

FIGS. 7a–7i are schematic drawings of the processor assembly;

FIGS. 10a–10i are schematics for the processor timing and strobing; and

FIGS. 14a–14c show, respectively, a LORAN C transmitted pulse, its shape and power spectrum.

Figure 1:
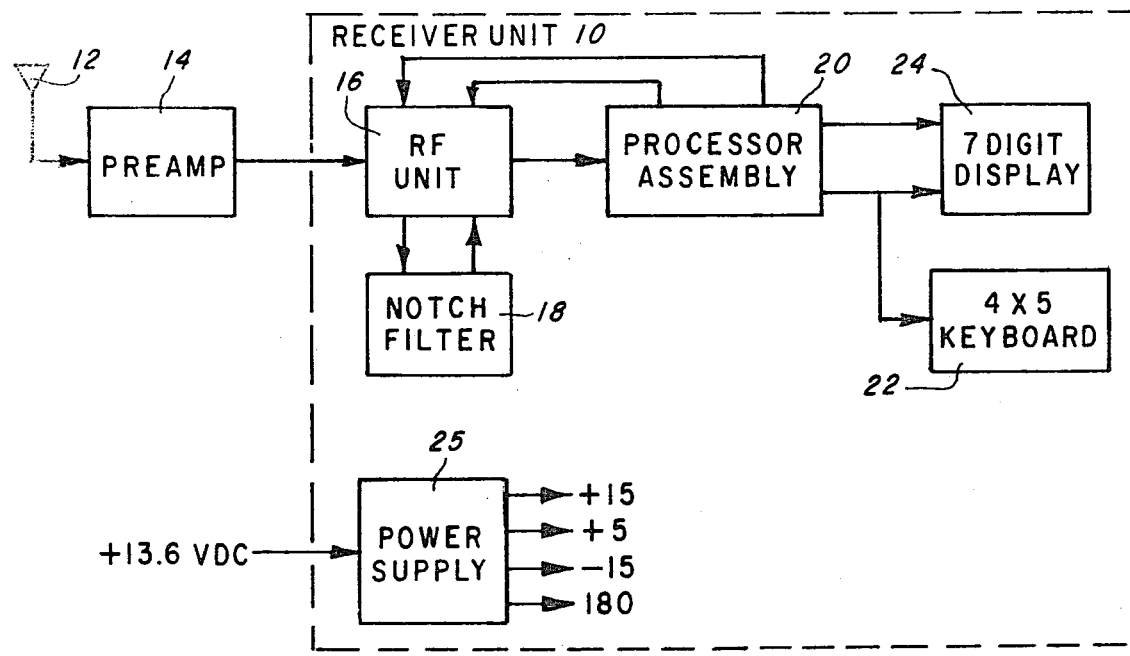
FIG. 1 is a block diagram of the Loran C receiver.

Referring to the drawings, the LORAN C receiver 1 (FIG. 1) of the present invention comprises an antenna 12 for receiving master and secondary radio frequency signals from a chain of LORAN C transmitters. The antenna 12 is connected to a preamplifier 14 which amplifies the master and secondary signals to working levels for an RF unit 16. The RF unit 16 processes the received signals into digitized format for GRI searching, and coarse envelope and cycle identification of the master and slave signals as hereinafter described. For operation in areas not having a band of frequencies set aside for LORAN C, a notch filter 18 is connected to the RF unit to provide attenuation at a desired frequency for preventing possible interference from other carrier frequencies. A processor assembly 20 synchronously samples the output of the RF unit to determine the presence of a LORAN C signals having a specific GRI, coarse envelope, phase lock loop and zero phase crossings for cycle identification. A keyboard 22 is connected to a display control 24. Power for the receiver 10 is provided from power supply 25. An operator utilizes the keyboard to operate the receiver through the display control 24 to obtain information pertinent to the position of the LORAN C carrier for display.

ANTENNA AND PREAMPLIFIER

Figure 2A:
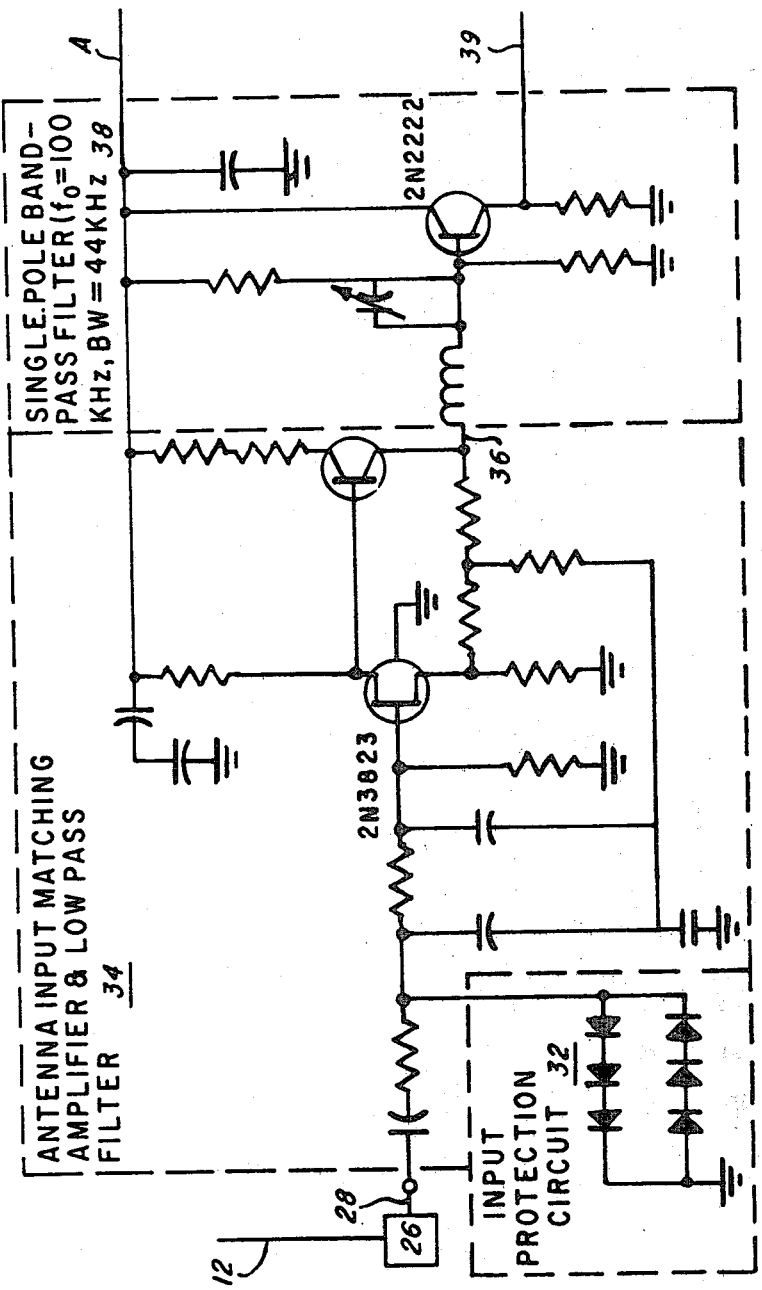
FIGS. 2a and 2b show schematically the preamplifier, input protection circuit and the low pass filters of the preamplifier.

Referring now to FIG. 2a, the antenna 12 is, for example, a whip antenna mounted upon the carrier ship or vehicle by a connector 26. The output of the connector is connected through lead 28 to an input protection circuit 32 and to an antenna input matching amplifier and low pass filter 34. The input protection circuit 32 is to protect the receiver 10 from lightning by grounding sudden high voltages entering the system. The amplifier of the antenna input matching amplifier and low-pass filter 34 amplifies the filtered input signal to a suitable working level.

Figure 2B:
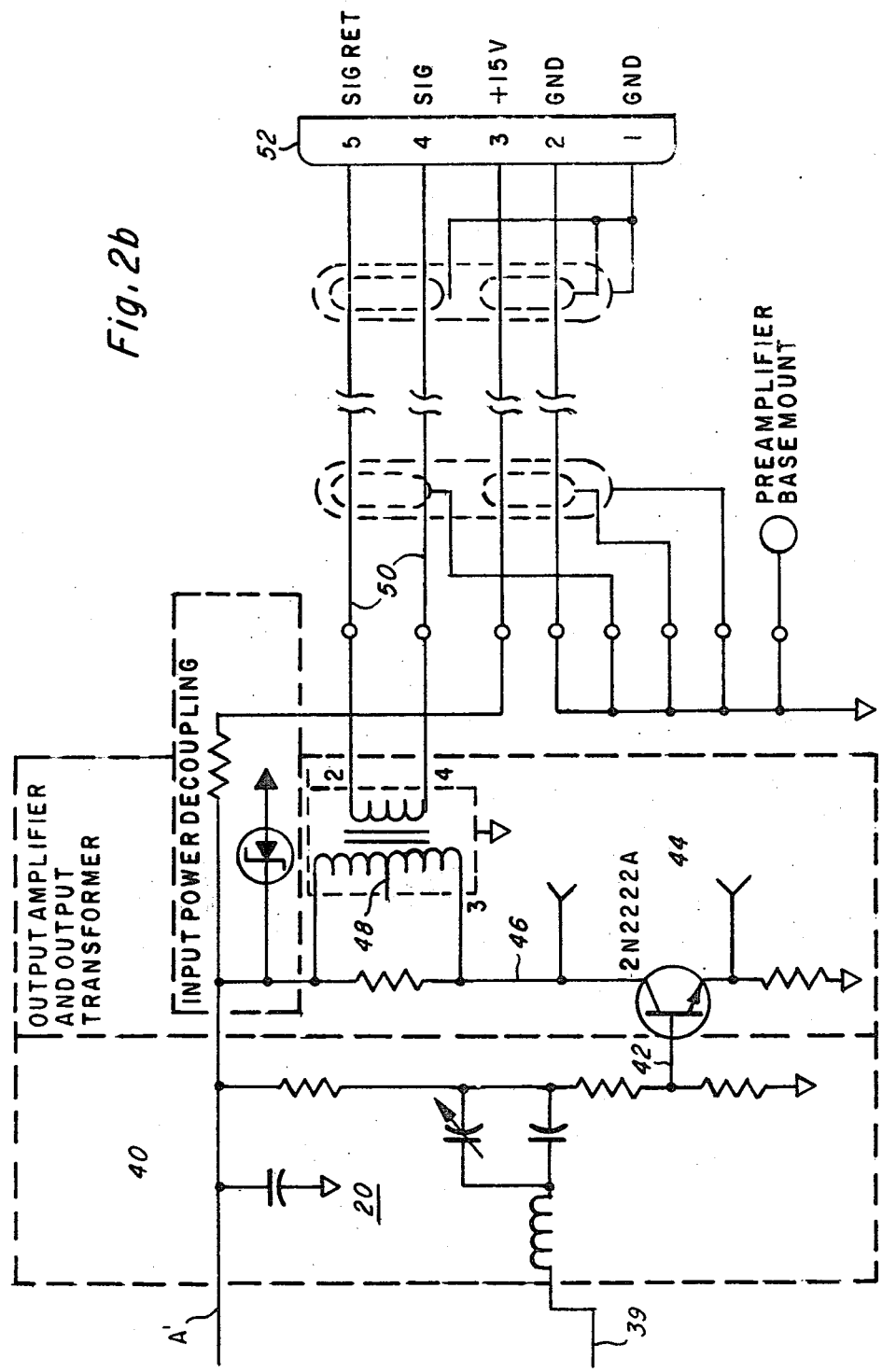

The amplifier and low-pass filter 34 is connected by lead 36, to a first bandpass filter 38. Bandpass filter 38 is connected by lead 39 to a second bandpass filter 40 (FIG. 2b). The bandpass filters 38 and 40 each have a center frequency ($f_o$) of 100KHz, and a bandwidth equal to 44KHz. These filters limit the incoming signals to those having frequencies of interest. The bandpass filter 40 is connected through lead 42 to an output amplifier 44.

The output amplifier 44 is connected through lead 46 to the primary winding of stepdown transformer 48. The secondary of transformer 48 is connected to leads 50 running to pins 5 and 4 of bus 52 located in the preamplifier's chassis. Bus 52 is attached to the preamplifier chassis and is connected through leads 54 to bus 56 (FIG. 3a) mounted on the ship's or carrier's cabin panel. Bus 56 provides the input terminals for the RF unit 16. Bus 56 has a lead 58 connected to the positive power supply for supplying a positive voltage to the preamplifier 14.

RF UNIT

The bus 56 (FIG. 3a) is connected through leads 60 to the primary of transformer 62. The secondary of the transformer 62 is connected through lead 64 to an amplifier 66 for amplification.

UNDELAYED CHANNEL

The amplifier 66 is connected through lead 68 to a switchable notch filter 70 of the RF unit 14. The output of the switchable notch filter 70 is connected through lead 72 to a second switchable notch filter 74. The notch filters 70 and 74 have a variable notch center frequency which is tunable from 60KHz to 140KHz. The notch filters 70 and 74 may also be switched out of the circuit if not needed by removing jumpers 71 and 73. The switchable notch filter 74 is connected by lead 76 to a bus 78 for an optional notch filter hereinafter described, and to a single pole bandpass filter 80 (FIG. 3b). The bandpass filter 80 (FIG. 3b) has a center frequency ($f_o$) of 100KHz and a bandwidth of 44KHz. The bandpass filter 80 has its output connected through lead 82 to the variable gain element 86 (FIG. 3c) and through lead 84 to a delayed channel (FIG. 3b). Leads 82 and 84 are the undelayed channel outputs. The variable gain element 86 has a plurality of switchable parallel circuits whose switches are controlled by the outputs (PINS 6, 8, 7, 9, 10) of an RF unit interface latch and buffer 246 (FIG. 7f) to adjust the gain of the undelayed signal. The variable gain element 86 (FIG. 3c) is connected through lead 88 to a terminal of summing amplifier 90.

DELAYED CHANNEL

The delayed channel includes the first switchable bandpass filter 92 (FIG. 3b). Switchable bandpass filter 92 is connected in cascade through lead 94 to a second switchable bandpass filter 96 for shaping the delayed pulse. The filters 92 and 96 have a center frequency ($f_o$) of 100KHz and a switchable bandwidth of about 44KHz or about 6KHz for use during GRI search and coarse envelope. The narrowband (6KHz) filter is used to improve the signal-to-noise ratio (SNR) during the search and coarse envelope modes. The switchable bandwidth filters 92 and 96 are connected through lead 98 to a buffer 100 (FIG. 3d); the buffer 100 is connected through lead 102 to the bandwidth control terminal (PIN 10) of the processor 171 (FIG. 3c). The buffer 100 (FIG. 3d) acts to amplify the control voltages for the bandwidth filters 92 and 96 (FIG. 3b), and to isolate the processor from the filters.

The output of the switchable bandpass filter 96 (FIG. 3b) is connected through lead 104 to an amplifier inverter 106 to amplify and invert the phase of the delayed channel output signal relative to the phase of the undelayed channel output signal. The delayed output of the amplifier/inverter 106, which is delayed, for example, 15 μsecs, is connected through lead 108 to one terminal of the summing amplifier 90 (FIG. 3c) and to the input of the amplifier 110 (FIG. 3d) of the phase channel amplifier/limiter 112. The summing amplifier 90 sums the inverted, delayed output and the undelayed output to provide a phase reversal at the cycle which occurs at the 56% point on the envelope.

Referring to FIGS. 4a–4c, FIG. 4a shows the envelope shape of the undelayed pulse in the time domain;

FIG. 4b similarly shows the delayed and inverted pulse. FIG. 4c shows the resulting pulse after summing.

PHASE CHANNEL AMPLIFIER/LIMITER

Figures 7, 7I:
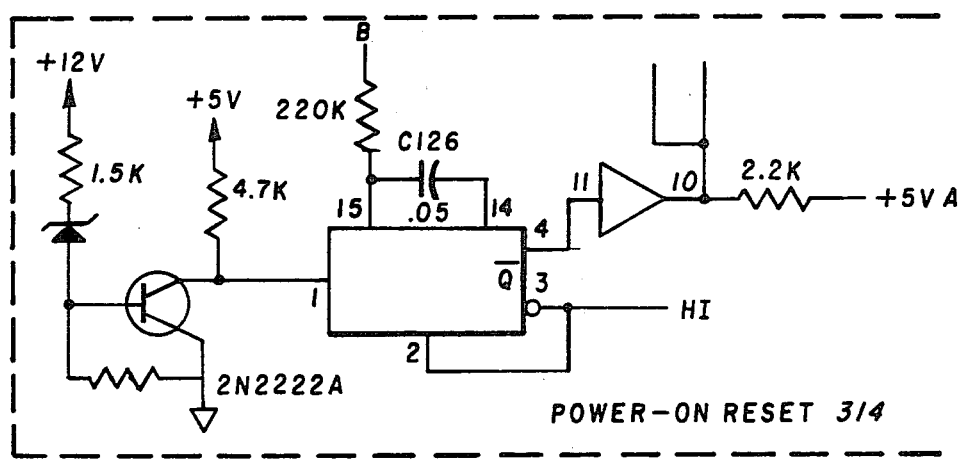

The delayed pulse output of the amplifier/inverter 106 (FIG. 3b) applied to amplifier 110 (FIG. 3d) of the phase channel amplifier/limiter 112 is hard limited to provide a digital representation (FIG. 5a) of the phase of the cycles. The digitized output of the phase channel limiter is connected to selected latches of an RF unit data latches and multiplexer 210 (FIG. 7g).

ENVELOPE CHANNEL AMPLIFIER/LIMITER

The summing amplifier 90 (FIG. 3c) is connected through lead 118 to an envelope channel amplifier/limiter 120 (FIG. 3d) for hard limiting the sum of the delayed and undelayed pulse cycles to provide a digital signal which preserves the phase of the summed signal as shown in FIG. 5b. The digitized output of the envelope channel limiter is connected to selected latches I through VI of the RF unit data latches and multiplexer 210 (FIG. 7g).

OPTIONAL NOTCH FILTER

Figure 3A:
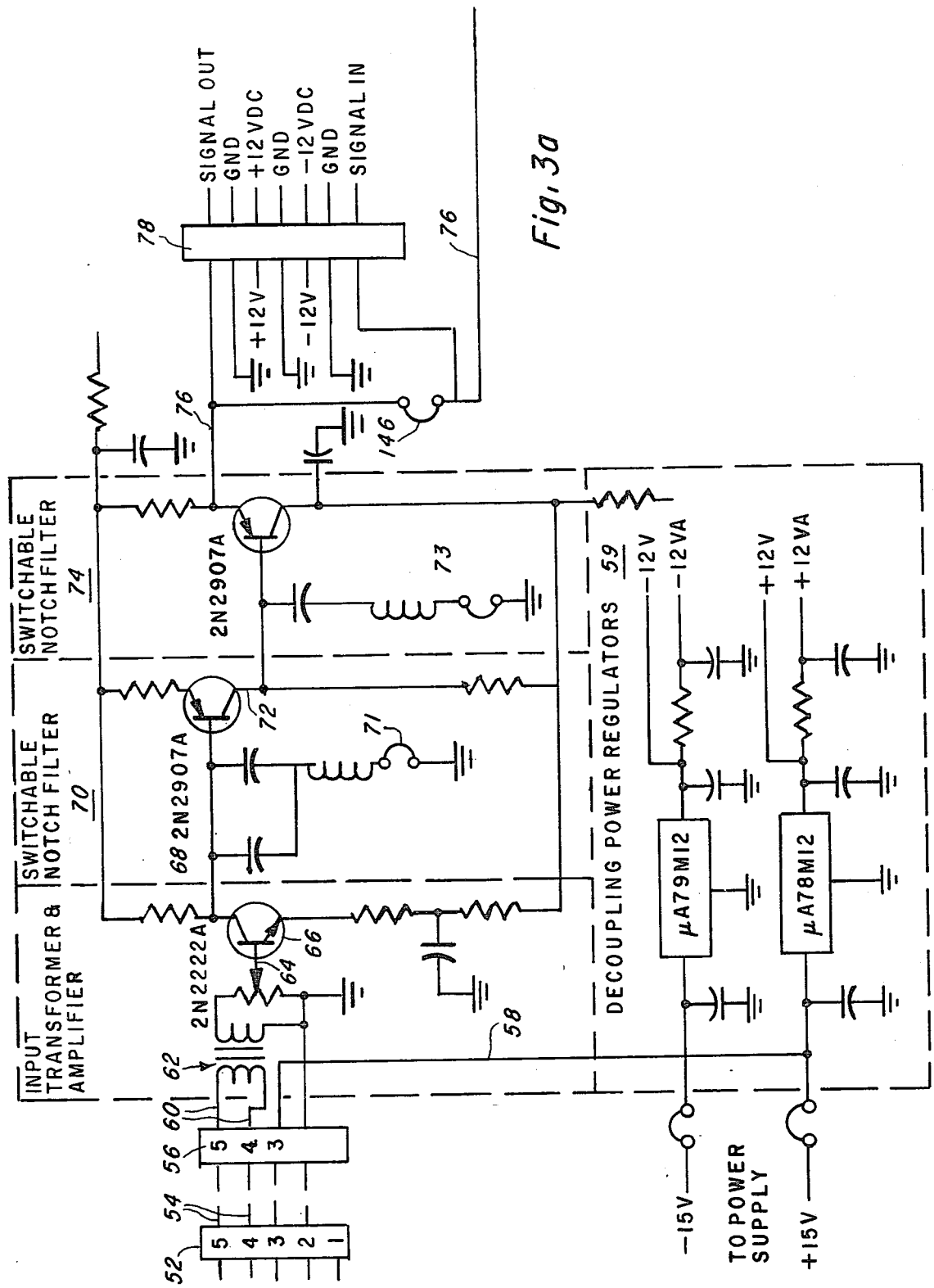
FIGS. 3a–3d show schematically the RF unit.
Figure 3B:
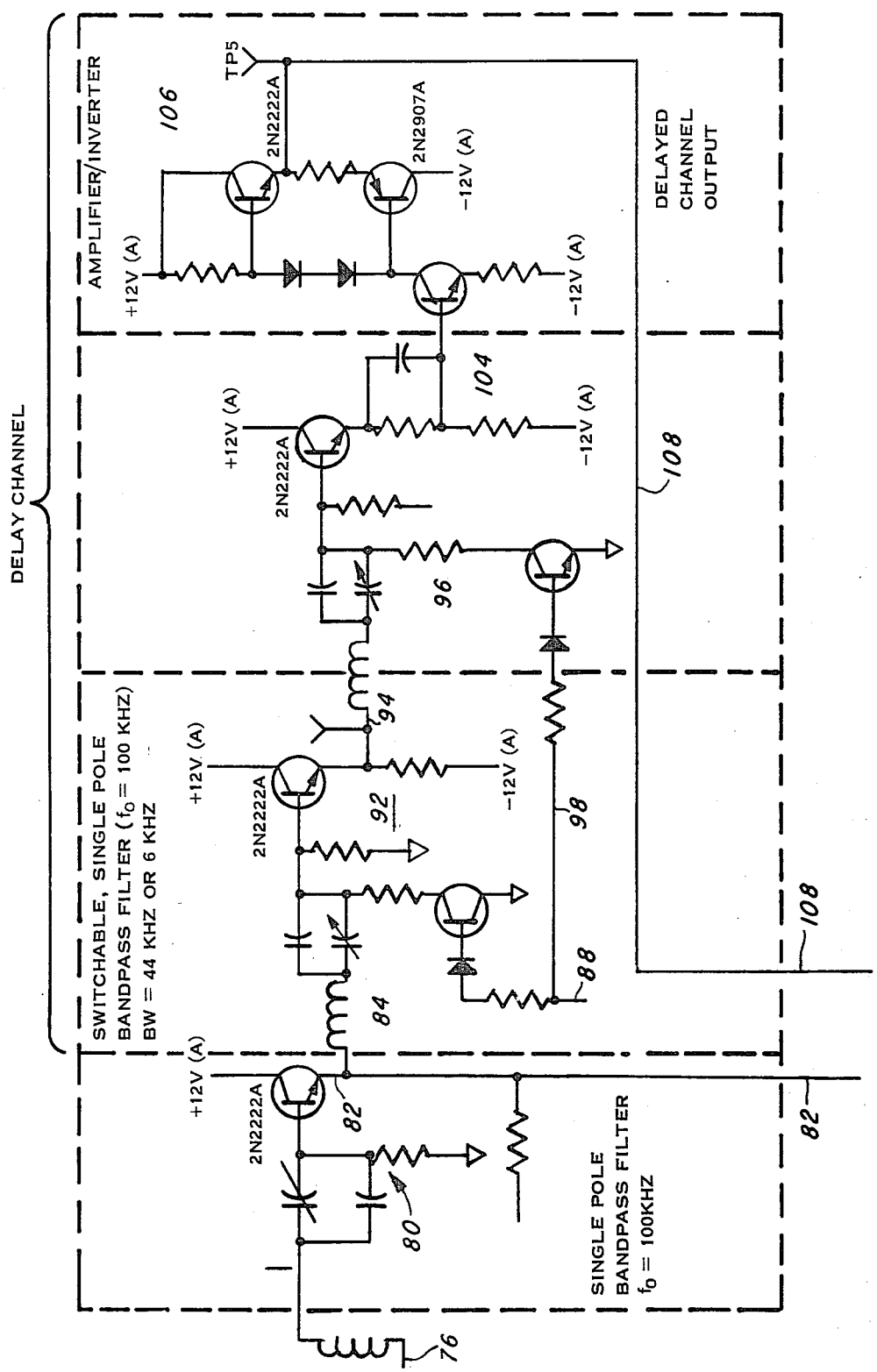
Figure 3C:
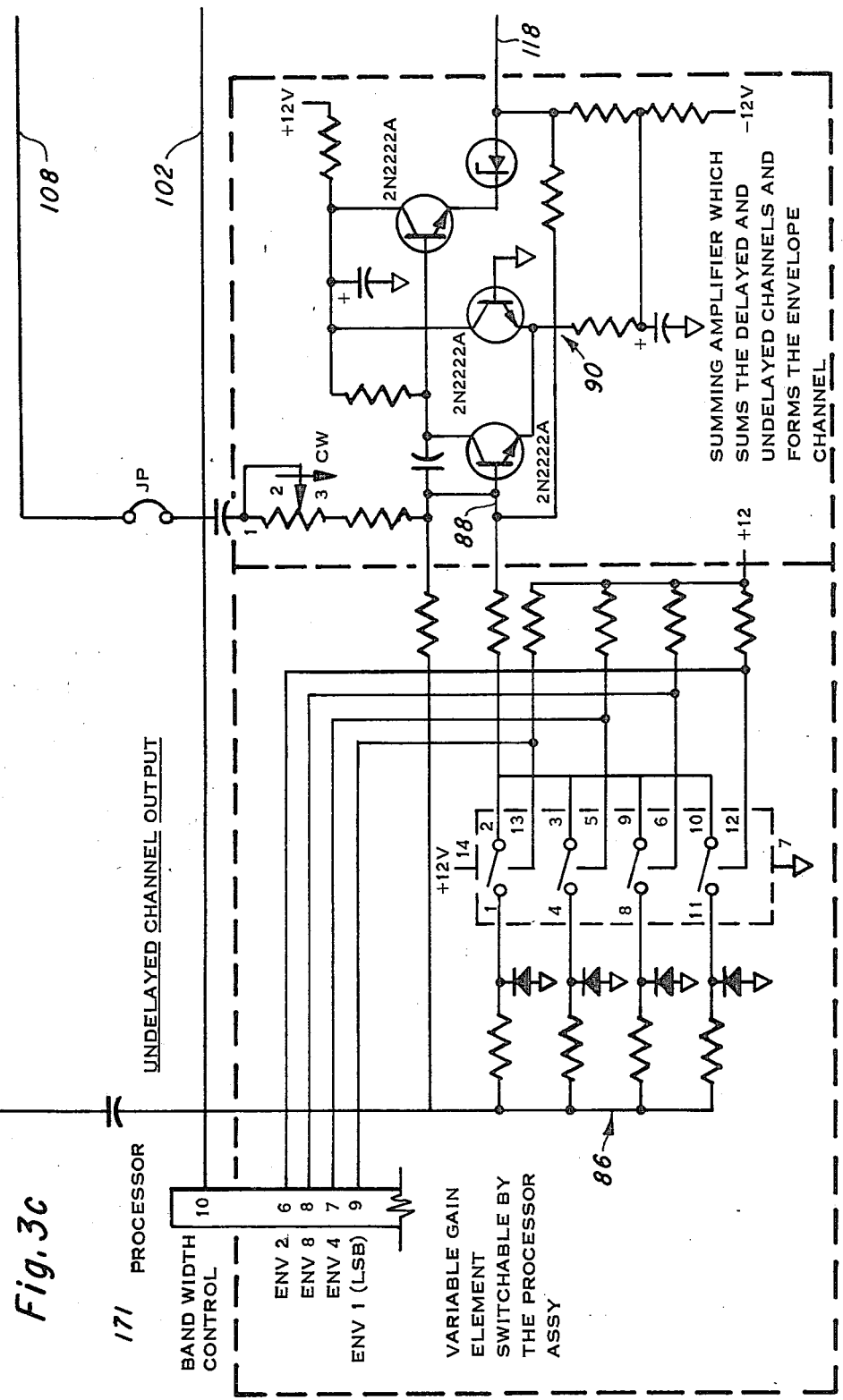
Figure 6A:
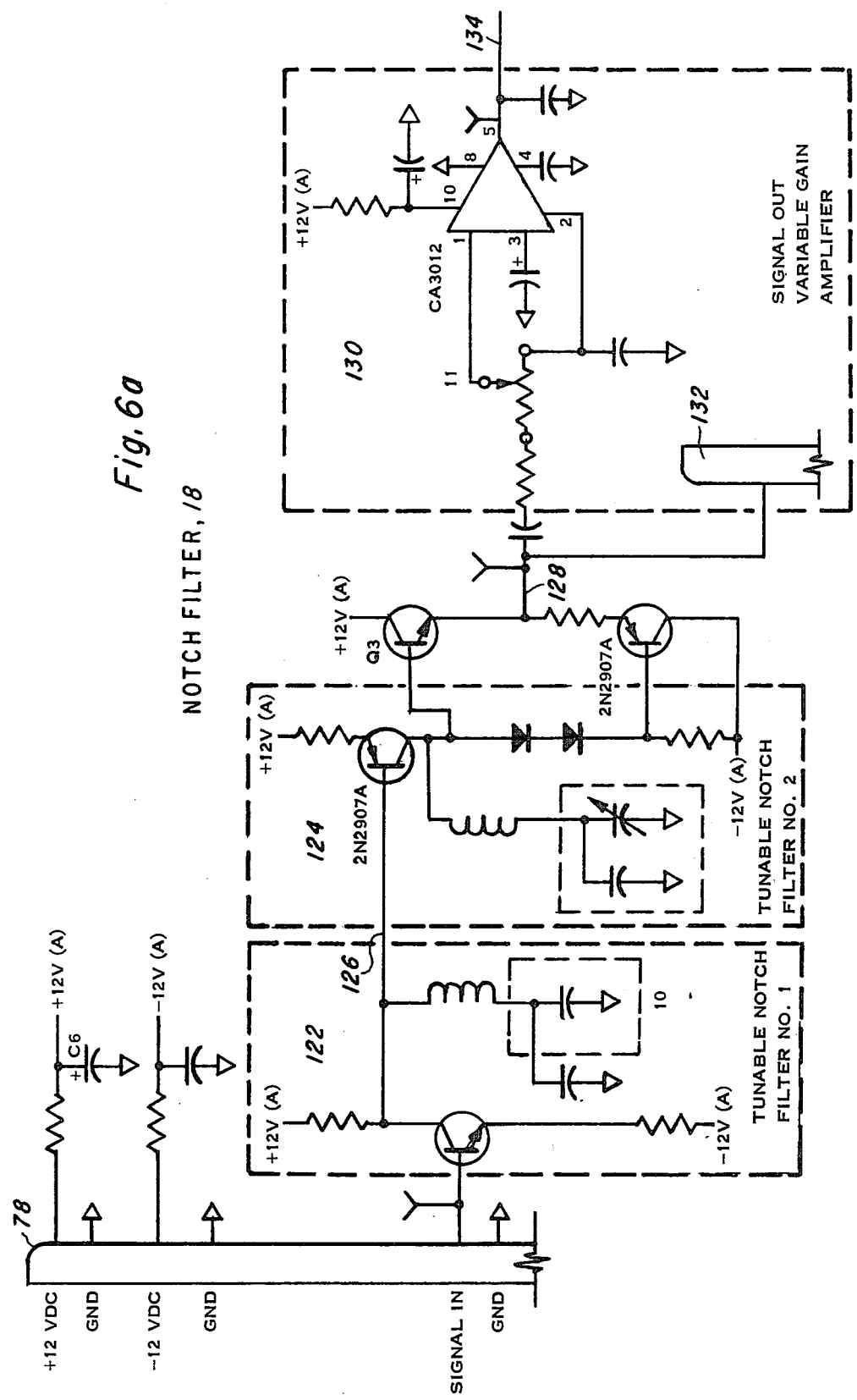

Referring now to FIG. 6a, the notch filter 18 is connected to the bus connector 78 (FIG. 3a). The notch filter 18 (FIG. 6a) includes a plurality of tunable notch filters 122 and 124 connected in cascade by lead 126. The output of filter 124 is connected through lead 128 to a variable gain amplifier 130 and to an output terminal 132. The variable gain amplifier 130 is connected through lead 134 to a tunable bandpass filter 136 (FIG. 6b). The tunable bandpass filter 136 has a variable capacitor 138 which is adjustable to identify the frequency of interfering noise. The tunable bandpass filter 136 is connected through lead 139 to a meter scaling and drive circuit 140 which is connected through lead 142 to a meter 144 located in the front panel. An operator can adjust the tunable bandpass filter 136 and read the relative amplitude of the interfering noise from the meter 144. He then can adjust the tunable notch filter 122 or 124 or both (FIG. 6a) to remove the interference. When the notch filter is used the jumper 146 (FIG. 3a) is removed.

PROCESSOR ASSEMBLY

Figure 7A:
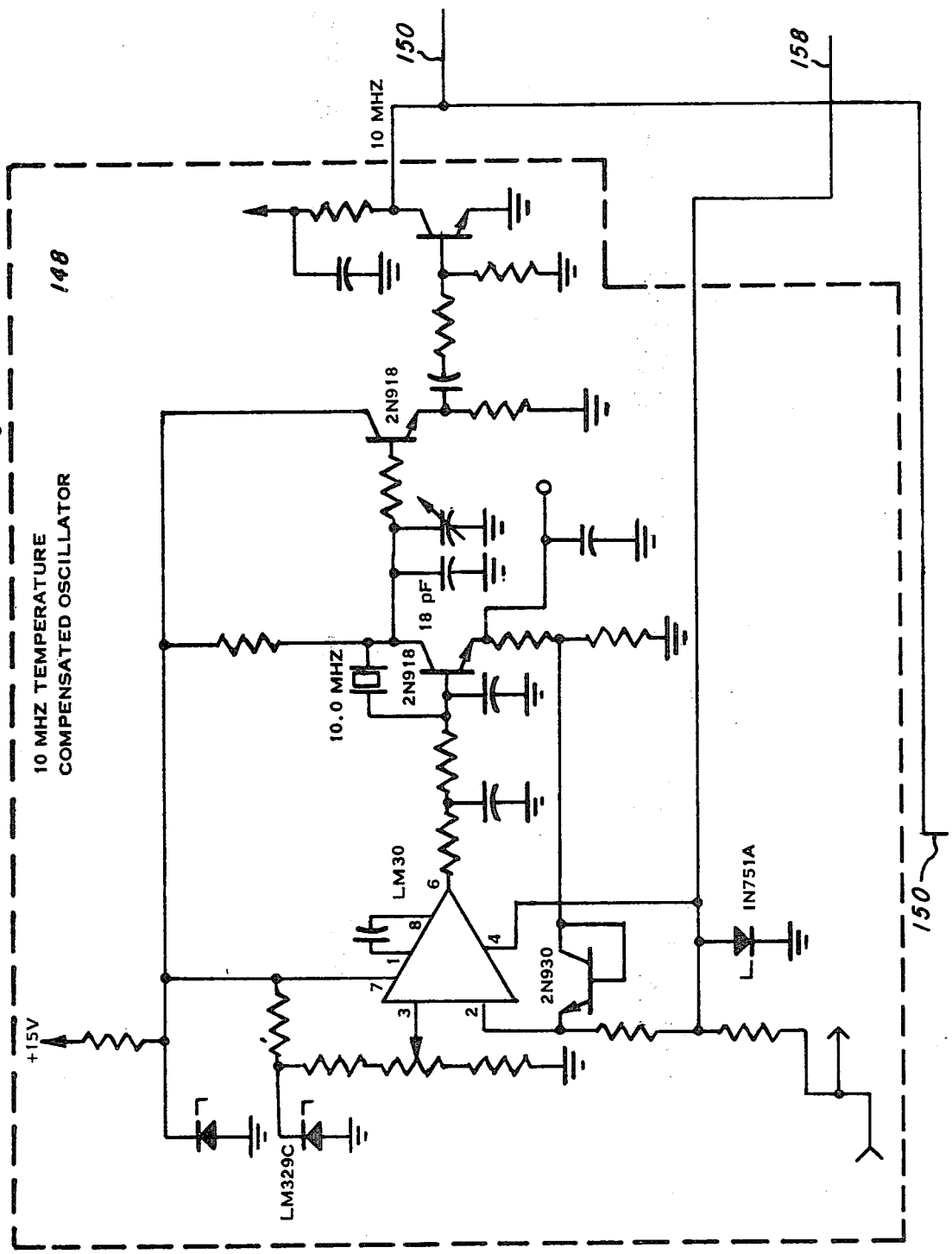
Figure 7B:
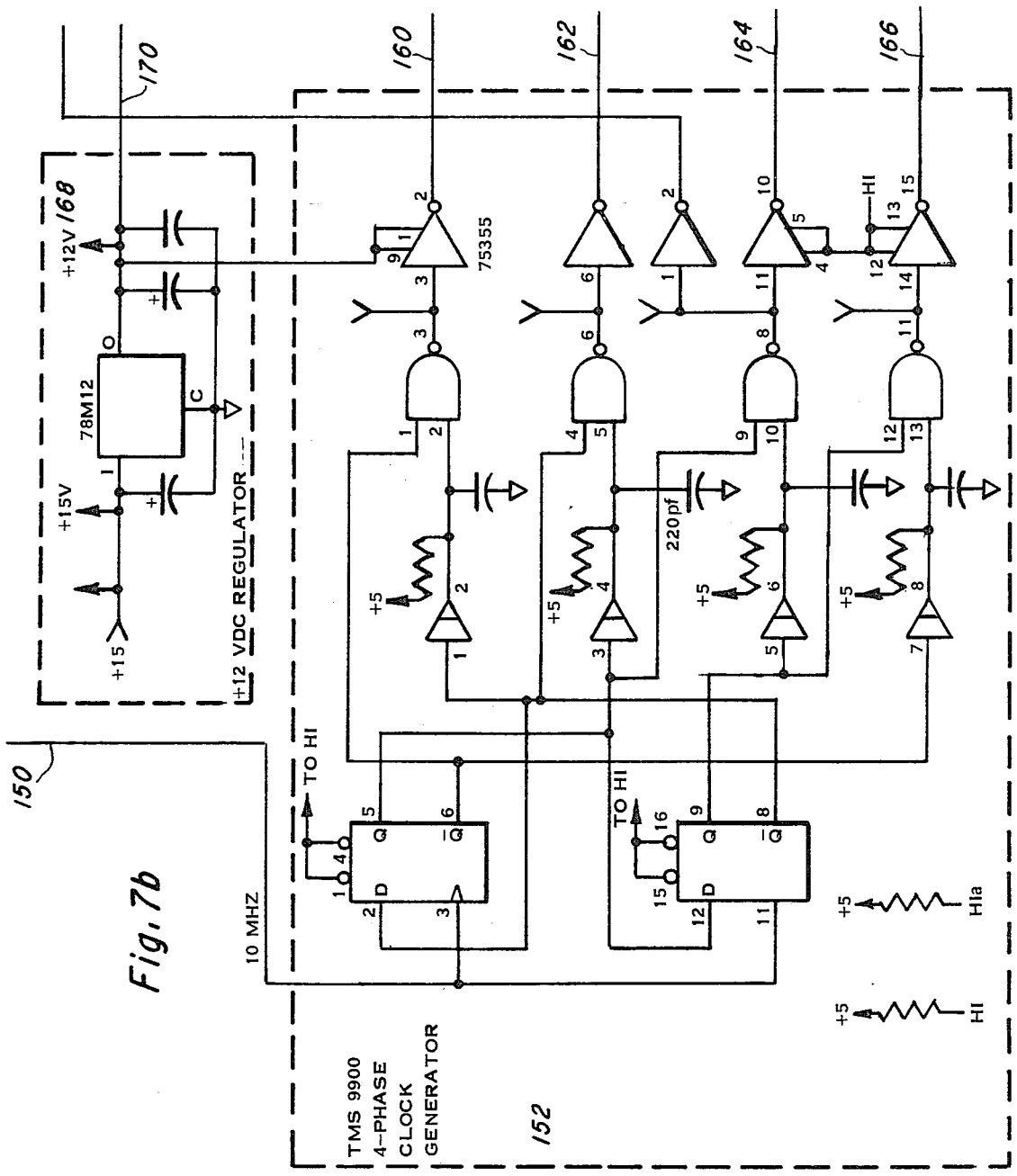
Figure 7C:
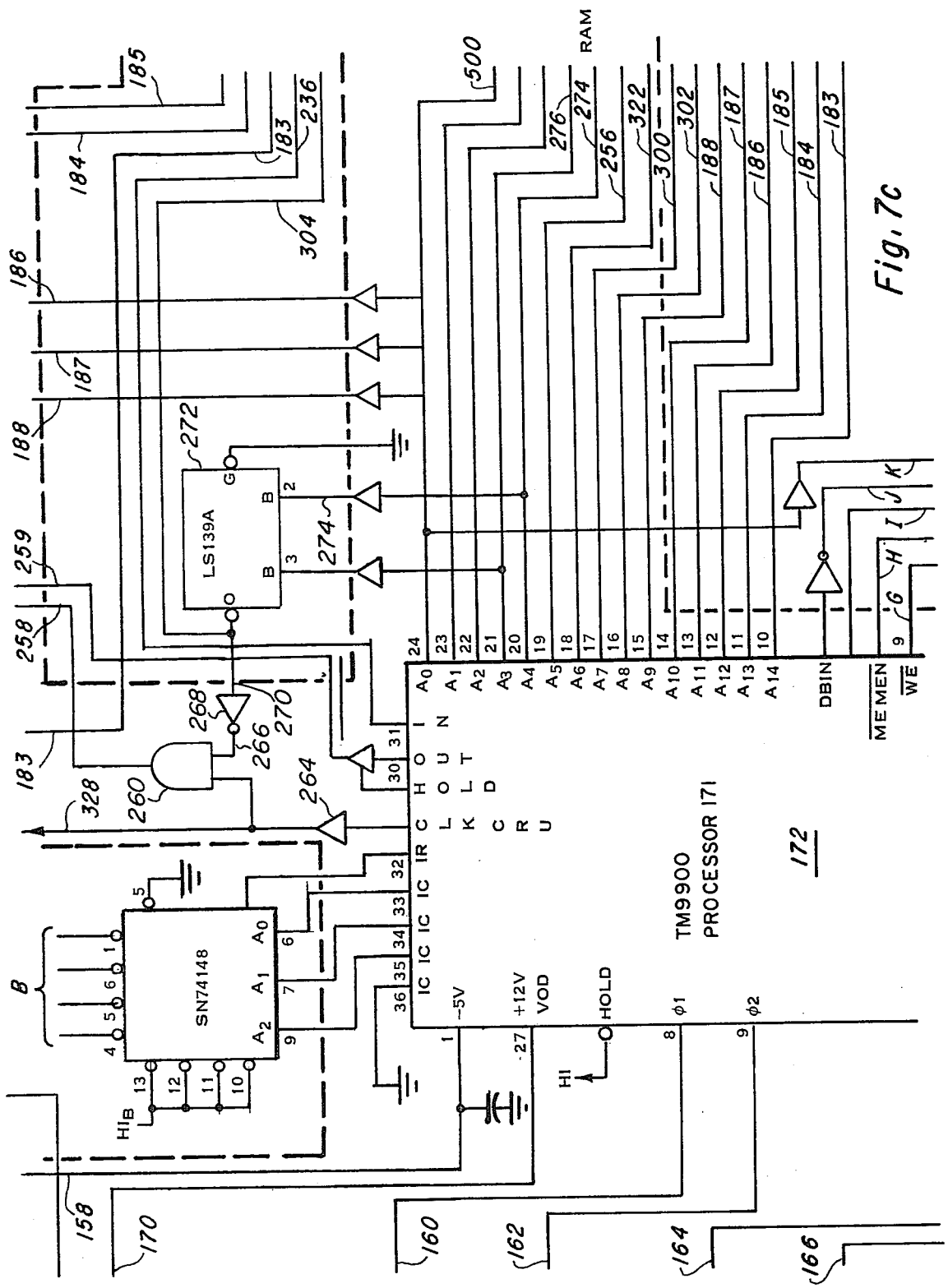

The processor assembly 20 (FIGS. 7a-7i) includes in addition to the central processor 171 (FIGS. 7c and 7d) a 10MHz temperature compensated oscillator 148 (FIG. 7a). The oscillator 148 must be very stable and preferably is a crystal controlled oscillator. The oscillator 148 is connected through lead 150 to a four phase clock generator 152 (FIG. 7b), and to a timing and strobe circuit 156 (FIG. 7g). The −5v reference for the temperature compensated oscillator 148 (FIG. 7a) is connected through lead 158 to the −5v terminal (PIN 1) of the central processor (FIG. 7c). The four phase clock generator 152 (FIG. 7b) has its phases $\phi_1$ through $\phi_4$ connected through leads 160, 162, 164, and 166 to corresponding terminals (PINS 8, 9, 28 and 25) of the central processor 171 (FIGS. 7c and 7d).

The central processor 171 (FIGS. 7c and 7d) is, for example, a TMS 9900, solid state, programmable, digital microprocessor. This processor is a 16 bit, single-chip microprocessor using MOS N-channel silicon-gate technology; it requires the four phase clock generator 152. A +12 VDC regulator 168 (FIG. 7b) is connected through lead 170 to the central processor 171 (PIN 27) to provide a constant +12 VDC voltage. The processor 171 (FIGS. 7c and 7d) includes a communications register unit (CRU) 172 which is instruction driven and a central processing unit (CPU) 174. Only the terminals of the CRU 172 and CPU 174 are shown. The CRU 172 and CPU 174 are connected through leads to a random access memory (RAM) 176 (FIG. 7e) which may be, for example, a 256 × 16 RAM, and to a read-only-memory (ROM) 178, which may be, for example, a 4K × 16 ROM. The variables are stored in and read out of the RAM 176 and the program (instructions) and constants are contained in and read out of the ROM 178. Those skilled in the art requiring more information are referred to the "990 Computer Family Systems Handbook" 1st Edition, October 1975, published by Texas Instruments Incorporated, Digital Systems Division, Austin, Texas 78767.

PROCESS TIMING AND STROBE CIRCUIT

The timing and strobe circuit 156 (FIG. 7g) includes a divide by two counter 180, connected through lead 150 to the output of the 10MHz oscillator 148 (FIG. 7a), to provide a 5MHz signal at its output. The divide by two counter 180 is connected to timer 182. Timer 182 has its bit selector terminals (A through F) connected through leads 183 through 188 to terminals (A14 down through A9) of the CRU 172 (FIG. 7c) for control of its output. The timer also signals, through its data ready (DR) terminal (PIN 4), the microprocessor 171 when data is available and ready for processing. The data ready terminal is connected through lead 190 to the interrupt latch and decoder 192, which also receives processor operation timing frequencies of 1.2KHz and 76Hz at separate terminals (PINS 13, 12) through leads 194 and 196. The latch 193 may be, for example, an D-type flip-flop, SN74 LS 175, having its outputs B connected to a decoder 195 (FIG. 7c) which may be, for example an SN 74148. The outputs of the decoder (PINS 6, 7, 9) are connected to the interrupt terminals (PINS 33, 34, 35) of the processor 171 (FIG. 7c).

RF UNIT DATA LATCHES AND PROCESSOR INPUT MULTIPLEXER

The 20 bit timer word, which is inputted serially to the timer 182 by the processor 171 (FIG. 7c) through lead 259, relates the timer (FIG. 7g) output to the action of the processor 171 as hereinafter described. The timer output signals which may be, for example, 10 μsecs, 12 μsecs, 10P μsecs, 12.6P μsecs, 05 μsecs, and 10/15 μsecs (generated as hereinafter described under heading GROUND WAVE PHASE AND ENVELOPE CHANNEL SAMPLE STROBE GENERATOR) are connected by leads 198, 200, 202, 204, 206, and 208 to strobe the latches (I–VI) of the RF unit data latches 210 (FIGS. 7g and 7h). The latches I though VI may be, for example, dual D-type flip-flops (SN 74LS74).

The RF digitized output of the phase channel amplifier/limiter 112 (FIG. 3d) and the digitized envelope signals of the envelope channel amplifier/limiter 120 are connected, respectively, through leads 212 and 214 to the data input terminals of latches I, II, III, and IV, and V, VI of the RF unit data latches. Latches I and II sample digitally the phase of the RF signals at, respectively, 10 and 12.6 μsecs respective to the 20 bit time word; latches V and VI sample digitally the phase of the cycles of the envelope channel signals at 0 or 5 and 10 to 15 μsecs in the same manner.

The outputs of latches I-VI of the RF unit data latches and processor input multiplexer 210 are connected through leads 216, 218, 220, 222, 224, and 226 to the input terminals of the multiplexer 228 (FIG. 7h). The multiplexer 228 data select PINS A, B, C are connected through leads 183, 184, 185 to the corresponding PINS A14, A13, A12 of the CRU 172 which controls the output of the multiplexer 228. The strobe terminal S is connected by lead 229 to processor CRU decoder 298 (FIG. 7f). The output terminal of the multiplexer 228 (FIG. 7h) is connected through lead 236 to the CRU input (FIG. 7c) (IN PIN) for selectively feeding the sampled digitized phase information of the RF and envelope signals into the processor 171. The multiplexer 228 may be, for example, SN74LS261.

Figure 7E:
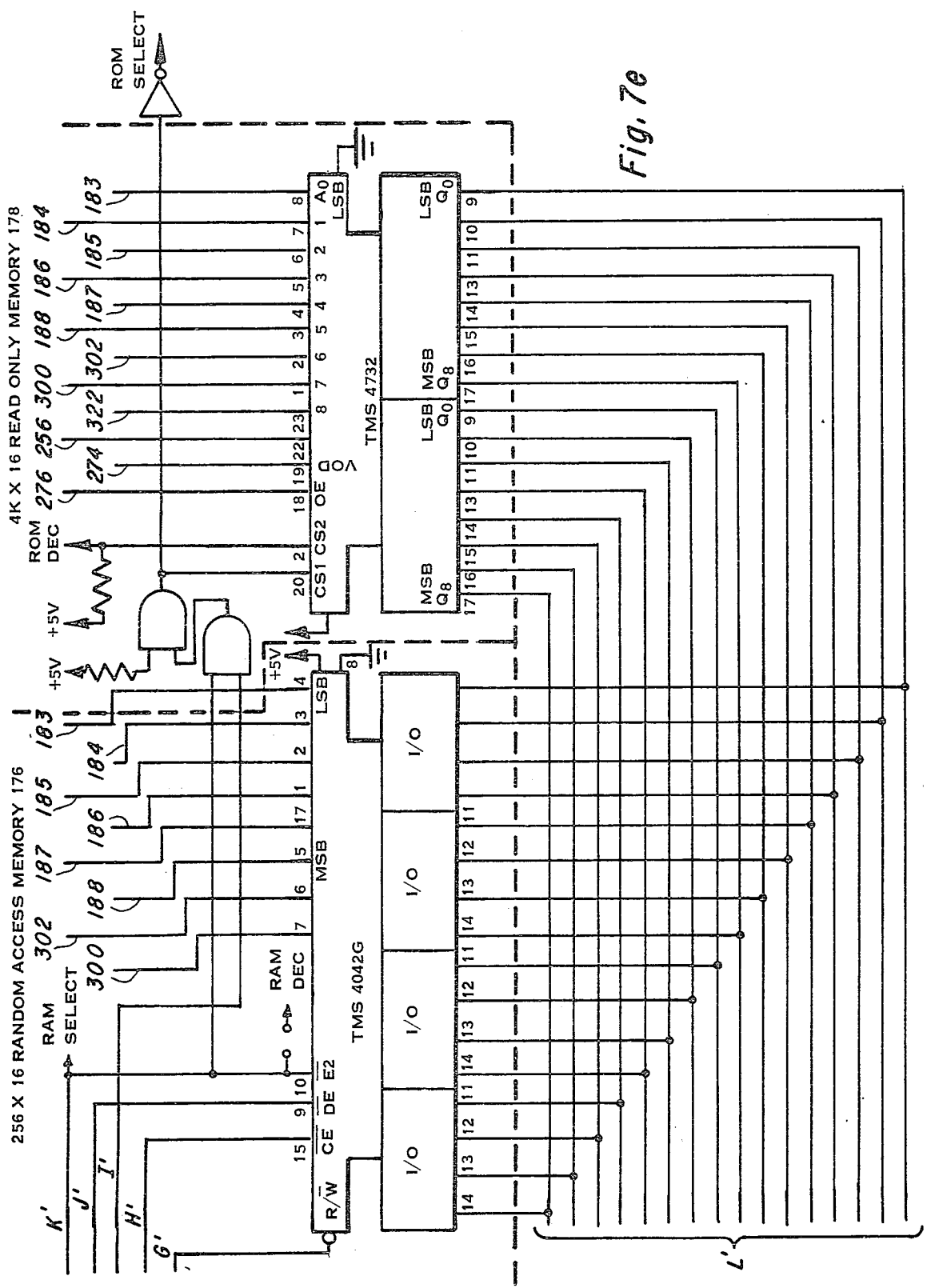
Figure 7F:
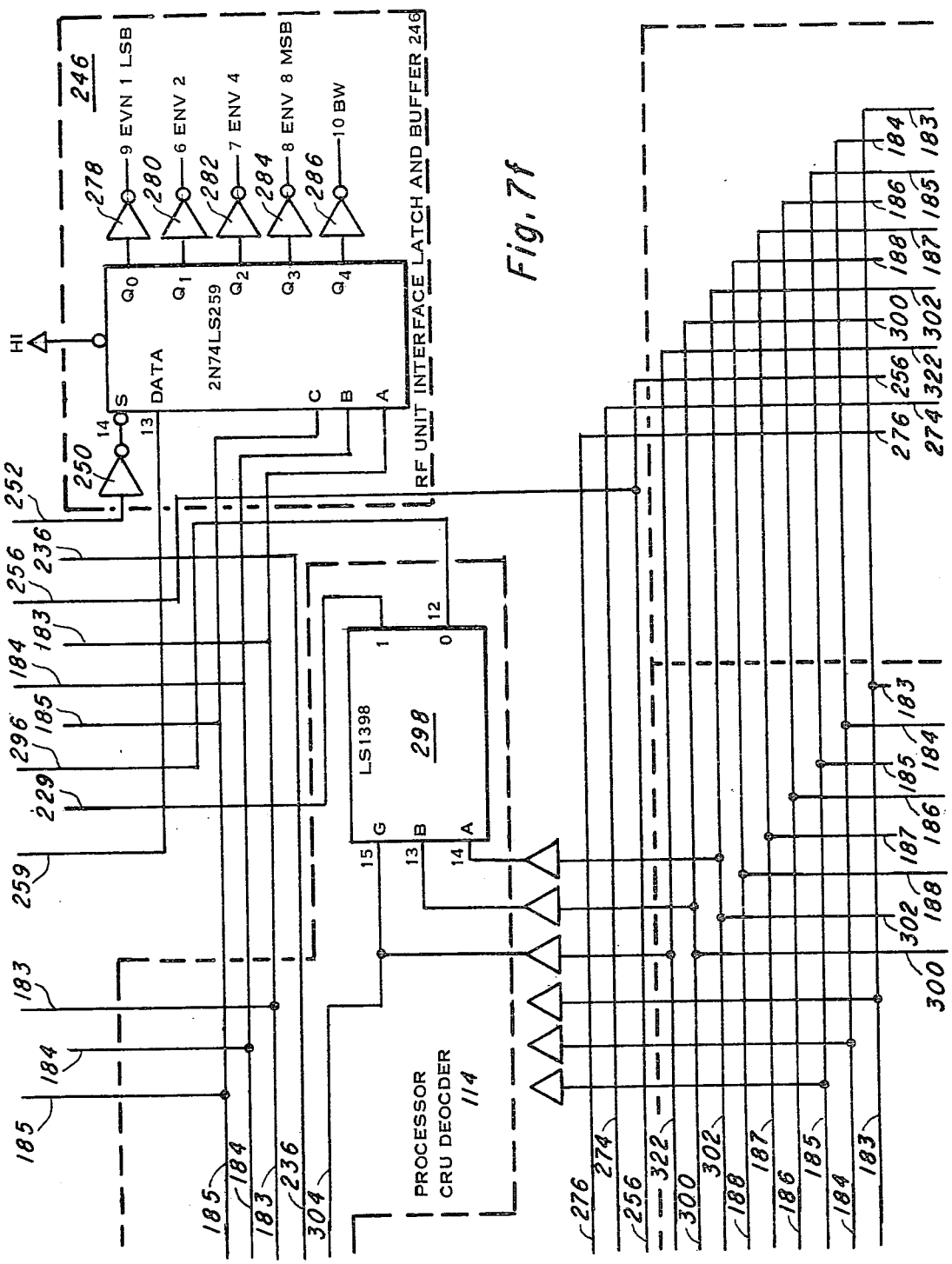
Figure 7G:
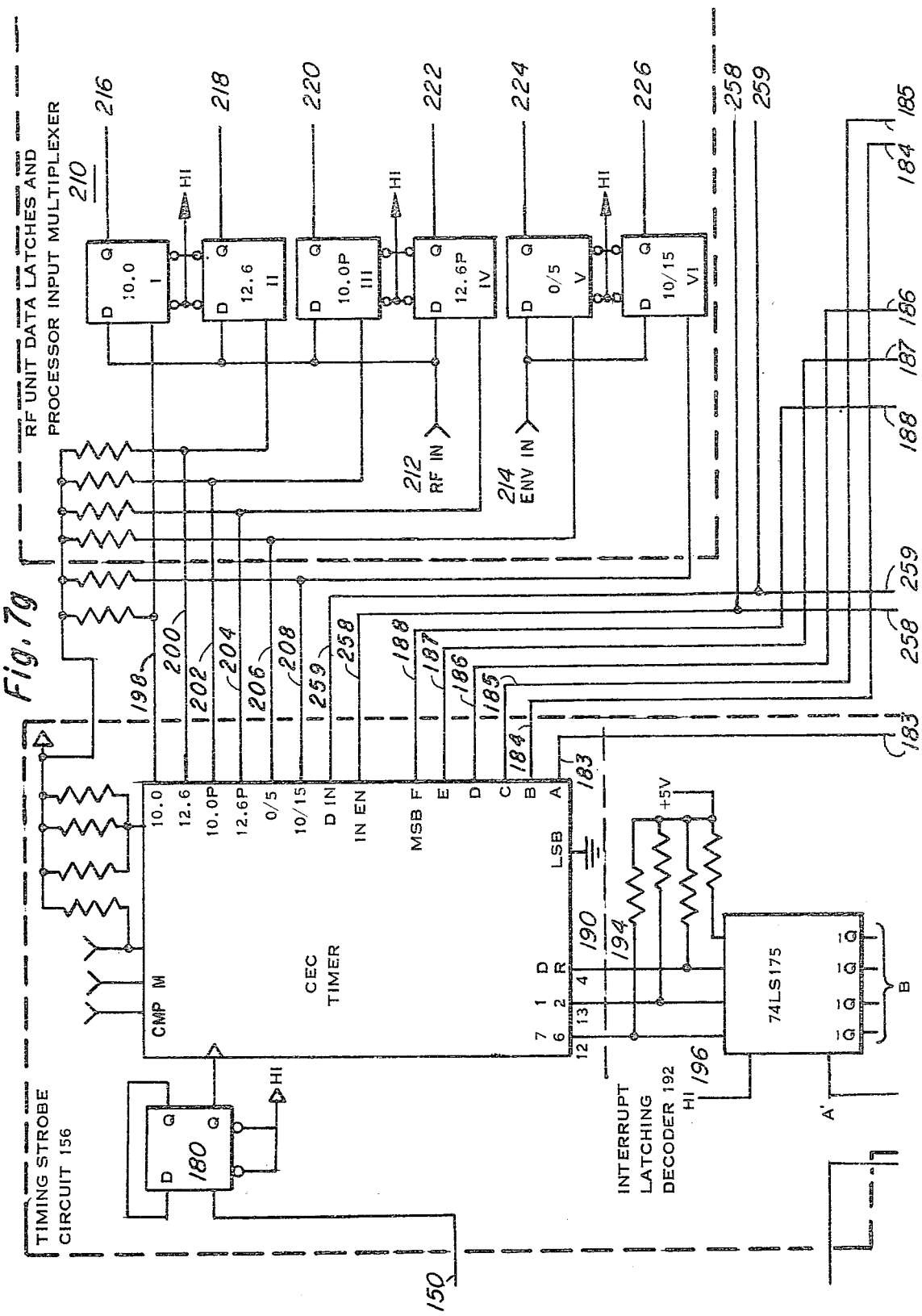

The CRU 172 (FIG. 7c) receives the sampled digitized phase information serially and then stores the information through the data bus in the 16 bit RAM 176 (FIG. 7e).

RF UNIT INTERFACE LATCH AND BUFFER

The latch select terminals A12, A13, A14 of the CRU 172 (FIG. 7c) are also attached through leads 183, 184, 185 to the bit select terminals A, B and C of the latch 244 of the RF unit interface latch and buffer 246 (FIG. 7f). The latch 244 may be, for example, a SN74LS259 whose data in terminal is connected through lead 259 to the CRU out terminal (FIG. 7c). This data in terminal (FIG. 7f) when strobed by an input on PIN 13 provides (gain) envelope control information to the latch 244 of the RF unit interface latch and buffer 246. The strobe of latch 244 (PIN 14) is connected to the ouput of latch select inverter 250. The inverter is connected through lead 252 to AND gate 254 (FIG. 7h) whose inputs are connected through lead 256 to processor terminal A-5 (FIGS. 7c-7f) and through lead 258 (FIGS. 7c, 7g) to output of AND gate 260 (FIG. 7c). The AND gate 260 has its inputs connected by lead 262 to buffer 264 connected to the processor CRU clock terminal, and by lead 266 to output of inverter 268 connected through lead 270 to the output of decoder 272. Decoder 272, which may be, for example, a SN74LS139, has its select PINS 2 and 3 connected by leads 274 and 276 to CRU address PINS A3 and A4 and to the enable PINS 18 and 19 of ROM 178 (FIG. 7e). The output terminals Q0, Q1, Q2, Q3, and Q4 of latch 244 (FIG. 7f) are buffered in inverters 278, 280, 282, 284 and 286 connected to the variable gain element 86 (FIG. 3c) through processor terminals 9, 6, 7, 8, and 10 for adjusting the gain of the undelayed signal.

KEYBOARD INPUT MULTIPLEXER

The data select terminals A12, A13, A14 (FIG. 7c) of the CRU are further connected through leads 183, 184, 185 to the data select terminals of the keyboard input multiplexer 294 (FIG. 7h). The multiplexer 294 may be, for example, a SN74LS251 whose strobe (PIN 7) is connected through lead 296 to output terminal 12 of the processor CRU decoder 298 (FIG. 7f). The select terminals (PINS 13, 14) of the decoder 298 are connected by leads 300 and 302 to CRU address terminals A8 and A7 (FIG. 7c) and to ROM 178 address PINS 23 and 1 (FIG. 7e). The enable terminal G (PIN 15) of the decoder 298 (FIG. 7f) is connected by lead 304 to the output terminal of processor CRU decoder 272 (FIG. 7c). The keyboard multiplexer 294 (FIG. 7h) has its input terminals (PINS 1, 2, 3, 4) connected by leads 306, 308, 310, and 312 to the keyboard column outputs (KC0, KC1-KC2 and KC3) (FIG. 8e). The output PIN 5 of the keyboard input multiplexer 294 (FIG. 7h) is connected to output lead 236 of the multiplexer 228 of the RF unit data latches and processor input multiplexer 210. The keyboard input multiplexer scans the key columns to detect the column in which a key has been pressed for input to the microprocessor 171 (FIG. 7c).

POWER-ON RESET CIRCUIT

Figure 8A:
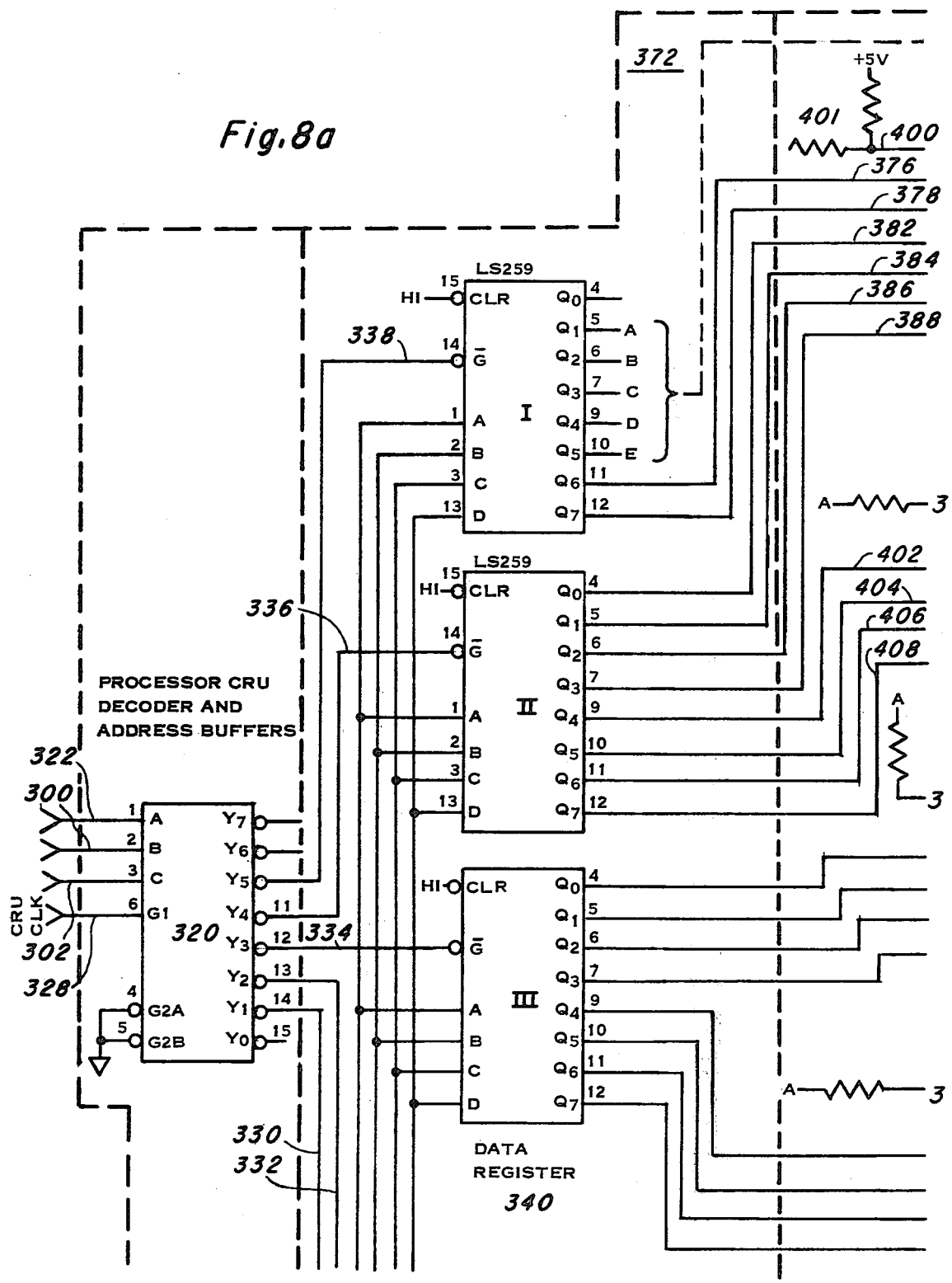
FIGS. 8a–8f are schematic drawings of the display control assembly.
Figure 8B:
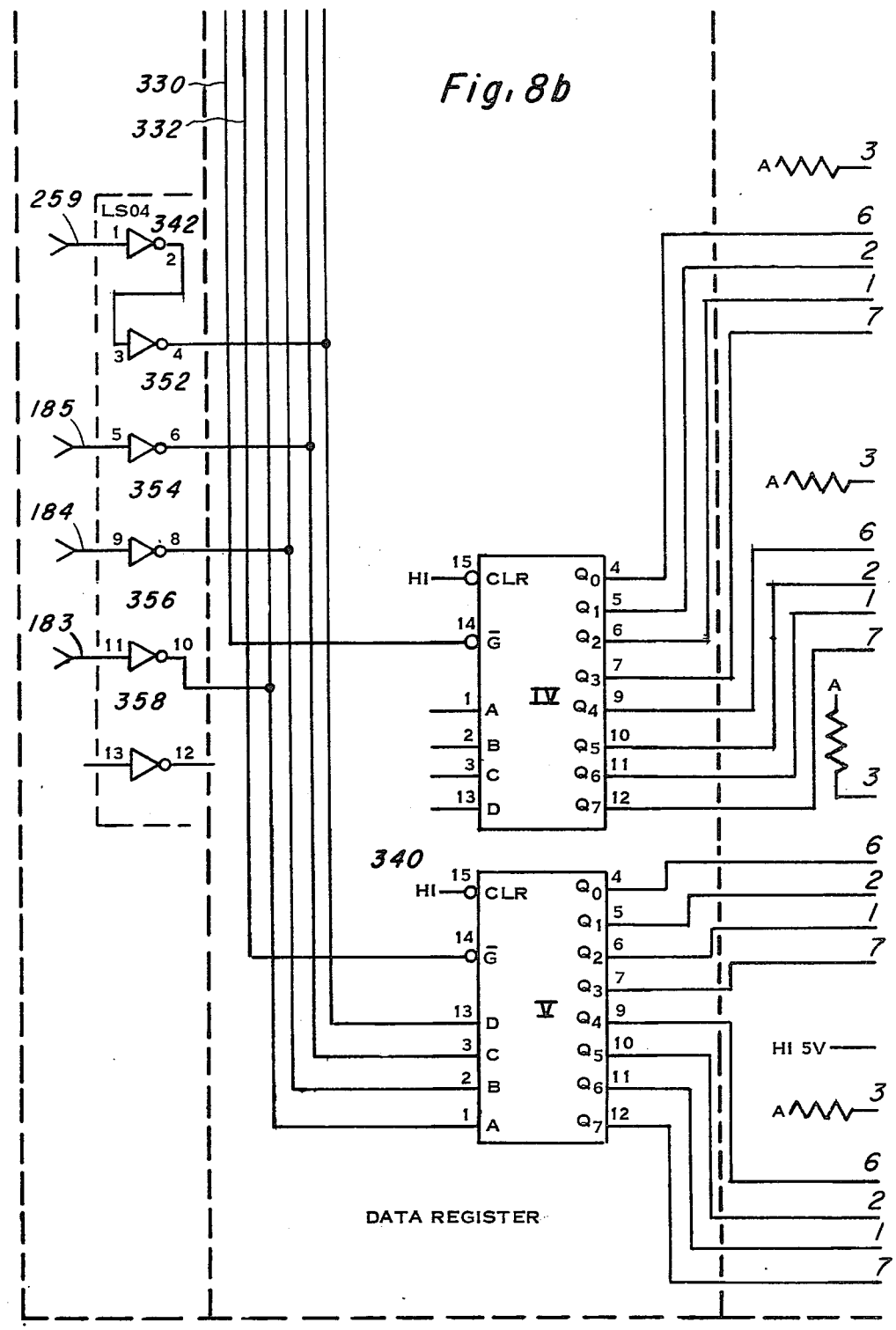
Figure 8C:
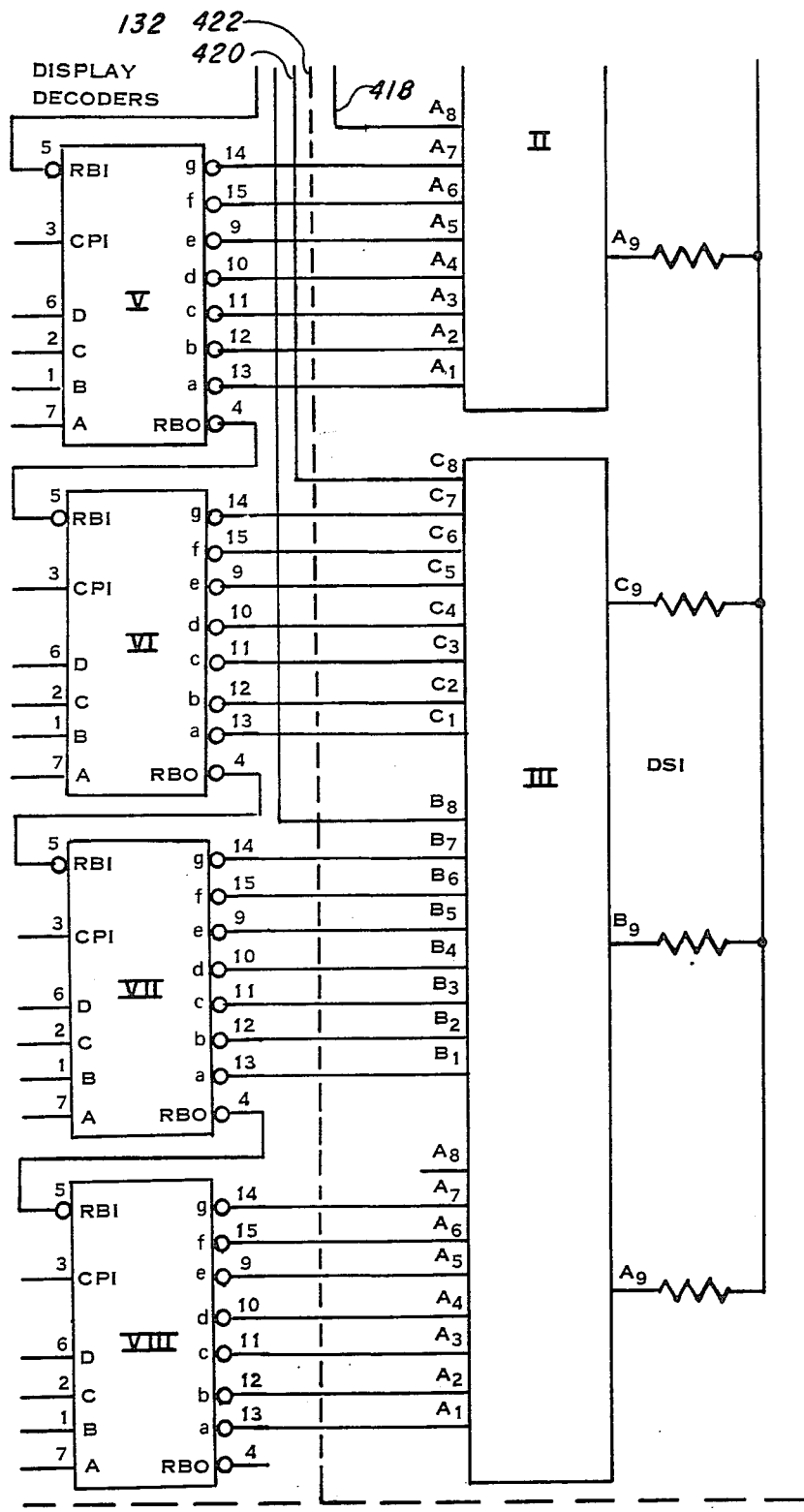
Figure 8D:
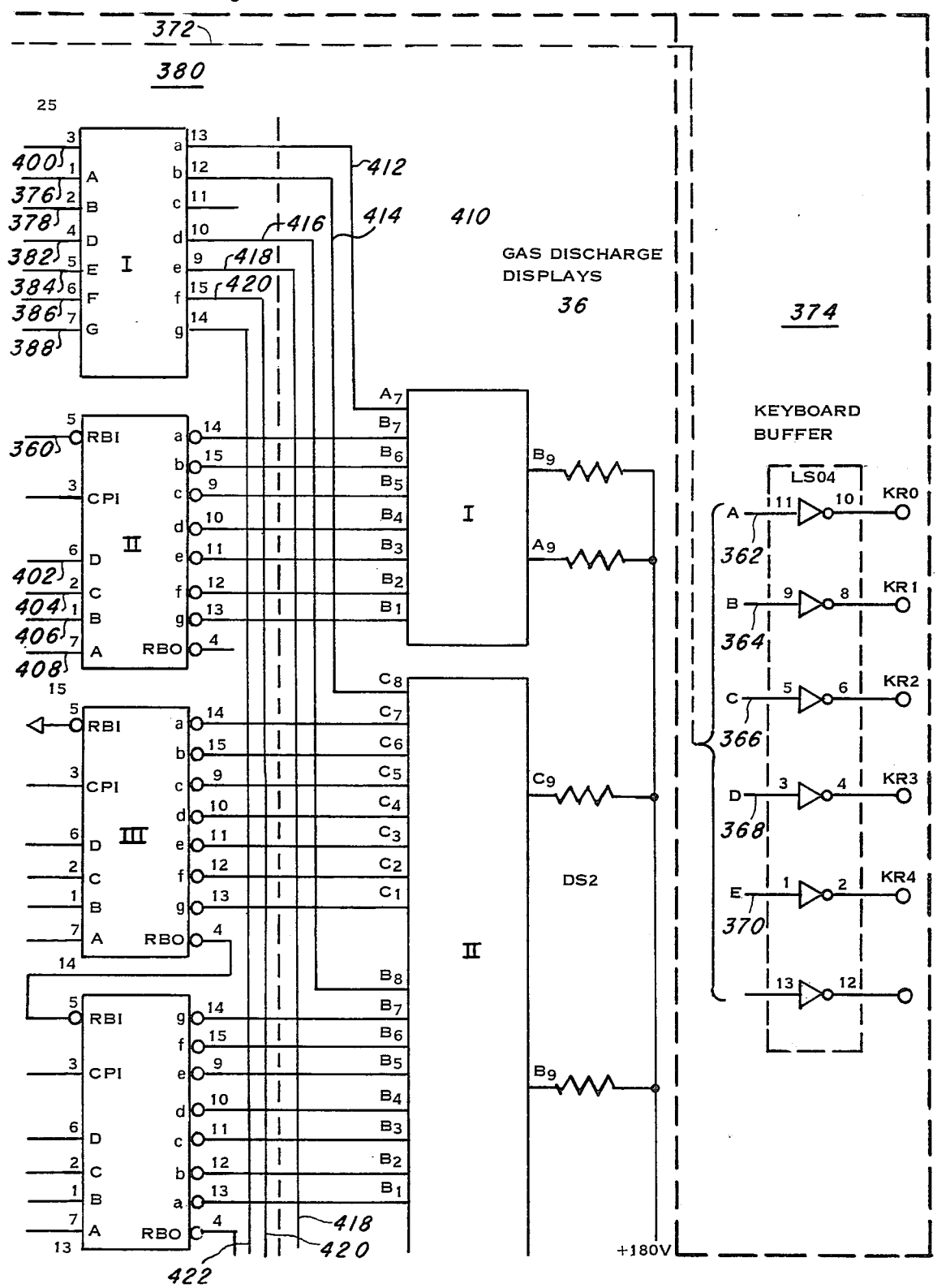
Figure 8E:
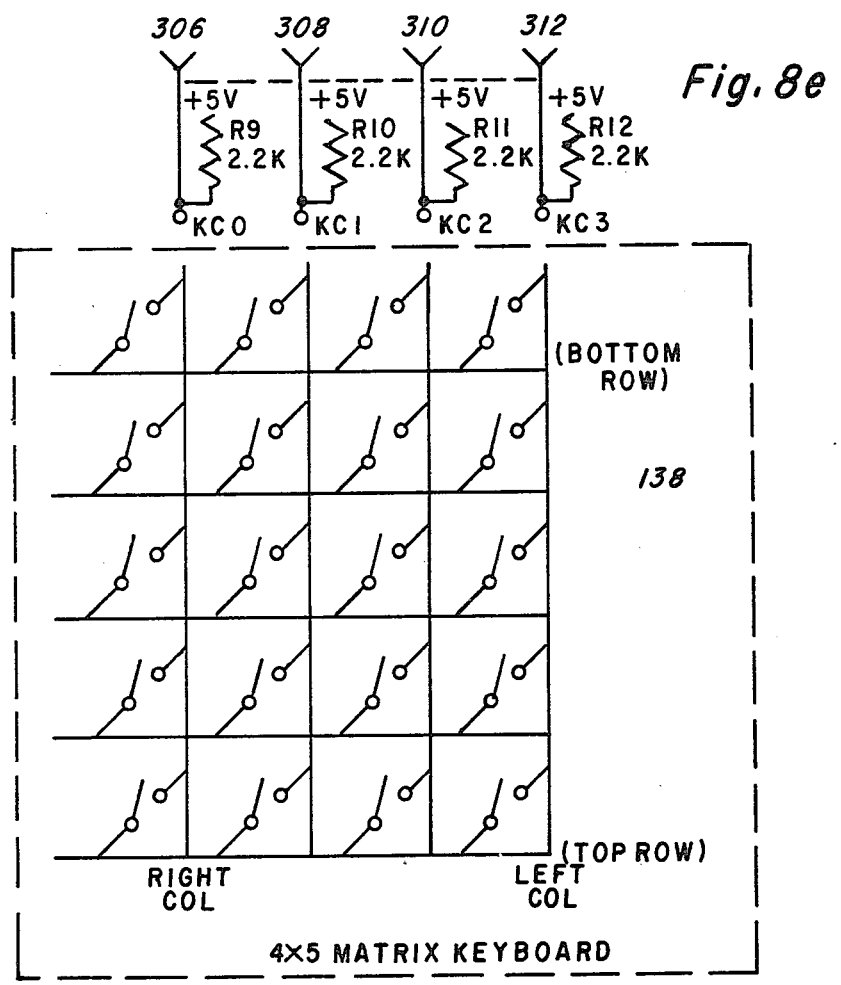
Figure 8F:
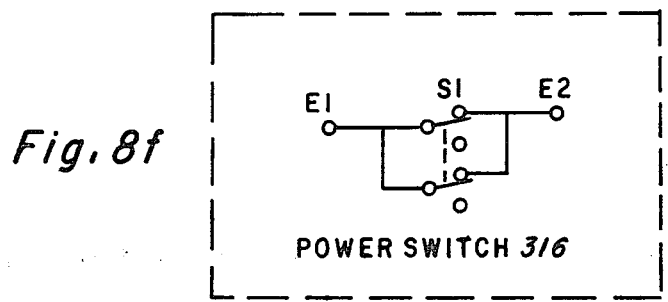

The processor 171 (FIG. 7d) is controlled by the power-on reset circuit 314 (FIG. 7i) which is controlled by keyboard switch 316 (FIG. 8f). The power-on reset circuit 314 resets the processor to receive instruction on each time the receiver power is turned on.

DISPLAY

Referring now to FIGS. 8a-8g, the display control includes a processor CRU decoder 320 (FIG. 8a) and an address buffer 342 (FIG. 8b). The decoder 320 which is, for example, a SN74LS138, has its input terminals (A, B, C, G1) connected, respectively, by leads 322, 300, 302, and 328 to processor CRU address PINS A6, A7, A8, and CRU clock pin (FIG. 7c). The output terminals Y1 through Y5 (FIG. 8a) are connected by leads 330, 332, 334, 336, and 338, respectively, to the enable ($\overline{G}$) terminals 14 of the addressable latches I through V of the data register 340 (FIGS. 8a and 8b). The decoder 320 through its select terminals (A, B, C) enable the addressable latches I through V to serially accept and store the data to be displayed. The address buffer 342 (FIG. 8b) which consists of, for example, an hex inverter (SN74LS04) has its input terminals 11, 9, 5, 1 connected through leads 183, 184, 185, and 259, respectively, to address terminals A14, A13, A12 and data in terminal of the processor CRU 172 (FIG. 7c). The outputs (PINS 2, 6, 8, 10) of the hex inverter 342 (FIG. 8b) are connected to leads 352, 354, 356, and 358, respectively, to the data (D) terminal (PIN 13) and the C, B, A select terminals (PINS 3, 2, 1) of the addressable latches I through V (FIGS. 8a and 8b) of the data register 340. The data latches I-V are, for example, SN74LS259's. The clear (CLR) terminal (PIN 15) of the addressable latches I through V are connected by lead 360 to the HI power source (FIG. 10i). Addressable latch I (FIG. 8a) has its output terminals Q1 through Q5 (PINS 5-10) connected through leads 362, 364, 366, 368, 370 in bus 372 to the input terminals (PINS 11, 9, 5, 3, 1) of a hex inverter constituting a keyboard buffer 374 (FIG. 8d). The output terminals Q6 and Q7 (PINS 6, 7) of addressable latch I (FIG. 8a) are connected by leads 376, 378 to input terminals A, B (PINS 1, 2) of driver I (FIG. 8d) of the display decoders 380. Display decoder I is, for example, a DS8885 and display decoders II through VIII are, for example, SN75480's. Addressable latch II (FIG. 8a) of the data register 340 has its outputs Q0, Q1 connected, respectively, by leads 382, 384 to terminals D, E (PINS 4, 5) of the driver I (FIG. 8d). Terminal D (PIN 4) and terminal E (PIN 5) of driver I provide drive capability for two display decimal points PINS B8 and A8 of display II (FIGS. 8d and 8c) through leads 416 and 418.

Output terminals Q2, Q3 (PINS 6, 7) of data latch II (FIG. 8a) are connected by leads 386, 388 to input terminals F, G (PINS 6, 7) of the display driver I (FIG. 8d). Input terminal current program input (PIN 3) of display driver I is connected by lead 400 to a current sourcing resistor 401 (FIG. 8a). The remaining output terminals Q4 through Q7 of data latch II of the data register 340 (FIG. 8a) are connected by leads 402, 404, 406 and 408 to input terminals D, C, B, A (PINS 6, 2, 1, 7) of decoder II (FIG. 8d). The ripple blanking input (RBI) terminal (PIN 5) of decoder II (FIG. 8d) is connected by lead 360 to source of power HI (FIG. 10i) and CPI terminal (PIN 3) is connected to a current sourcing resistor. The outputs of addressable latches III, IV and V (FIGS. 8a and 8b) are connected to the input terminals of decoders III through VIII (PINS 6, 2, 1, 7) (FIGS. 8d and 8c) whose CPI terminals (PIN 3) are connected as described above for display decoder II. The CPI pins control display brightness as determined by the current source resistors. The RBI terminal (PIN 5) of display decoder III is grounded; RBI pins of the decoders IV through VII (PINS 5) are connected in cascade to the ripple blanking out (RBO) terminals (PINS 4) of decoders III through VII. The RBI terminal (PIN 5) of display decoder VIII is connected to the HI power source (FIG. 10i). All display leading zeros are blanked except for the station ID and least significant digit by the RBi's. The RBI's of drivers II and VIII (FIGS. 8e and 8d) are disabled.

The output terminals of display driver I (FIG. 8d) are connected to the decimal input terminals of the, for example, gas discharge displays 410 (FIGS. 8d and 8c) as follows: output terminal (PIN 13) is connected by lead 412 to terminal A7 of display I which is the minus sign display; output terminal (PIN 12) is connected by lead 414 to terminal C8 of display II which is the most significant decimal point display; output terminal (PIN 10) is connected by lead 416 to terminal B8 of display II which is the second most significant decimal point; output terminal (PIN 9) is connected by lead 418 to terminal A8 (FIG. 8c) of display II which is the third most significant decimal point; output terminal (PIN 15) is connected by lead 420 to terminal C8 of display III which is the fourth most significant decimal point; and output terminal (PIN 14) is connected by lead 422 to terminal B8 of display III which is the least significant decimal point. The remaining display drivers II through VIII have their output terminals a through g (PINS 13, 12, 11, 10, 9, 15 and 14) connected to corresponding segment terminals of the seven segment gas discharge displays as shown in FIGS. 8d and 8c. Although eight digits are provided only seven digits are displayed.

POWER SUPPLY

Figure 9A:
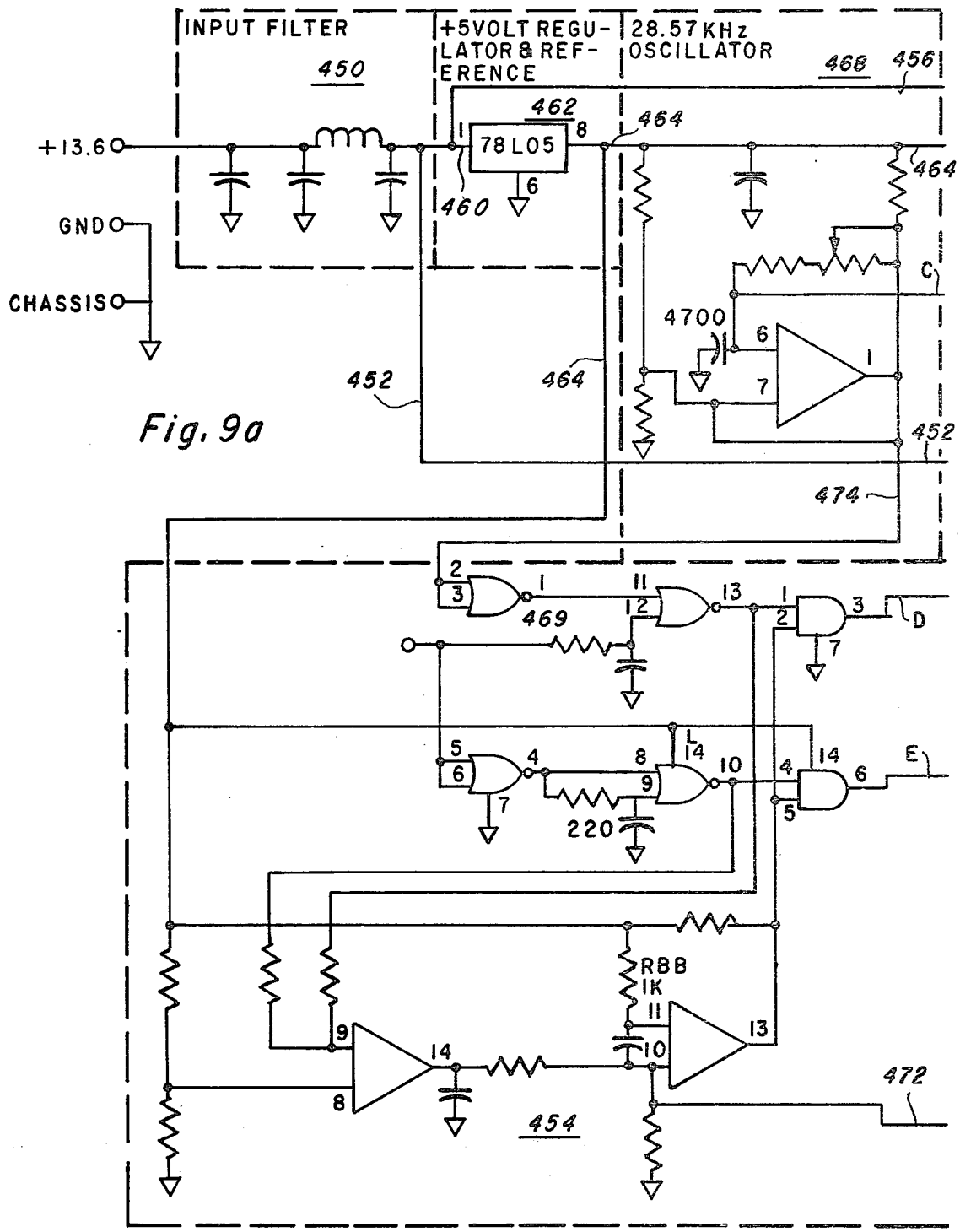
FIGS. 9a and 9b, are schematics of the power supply.
Figure 9B:
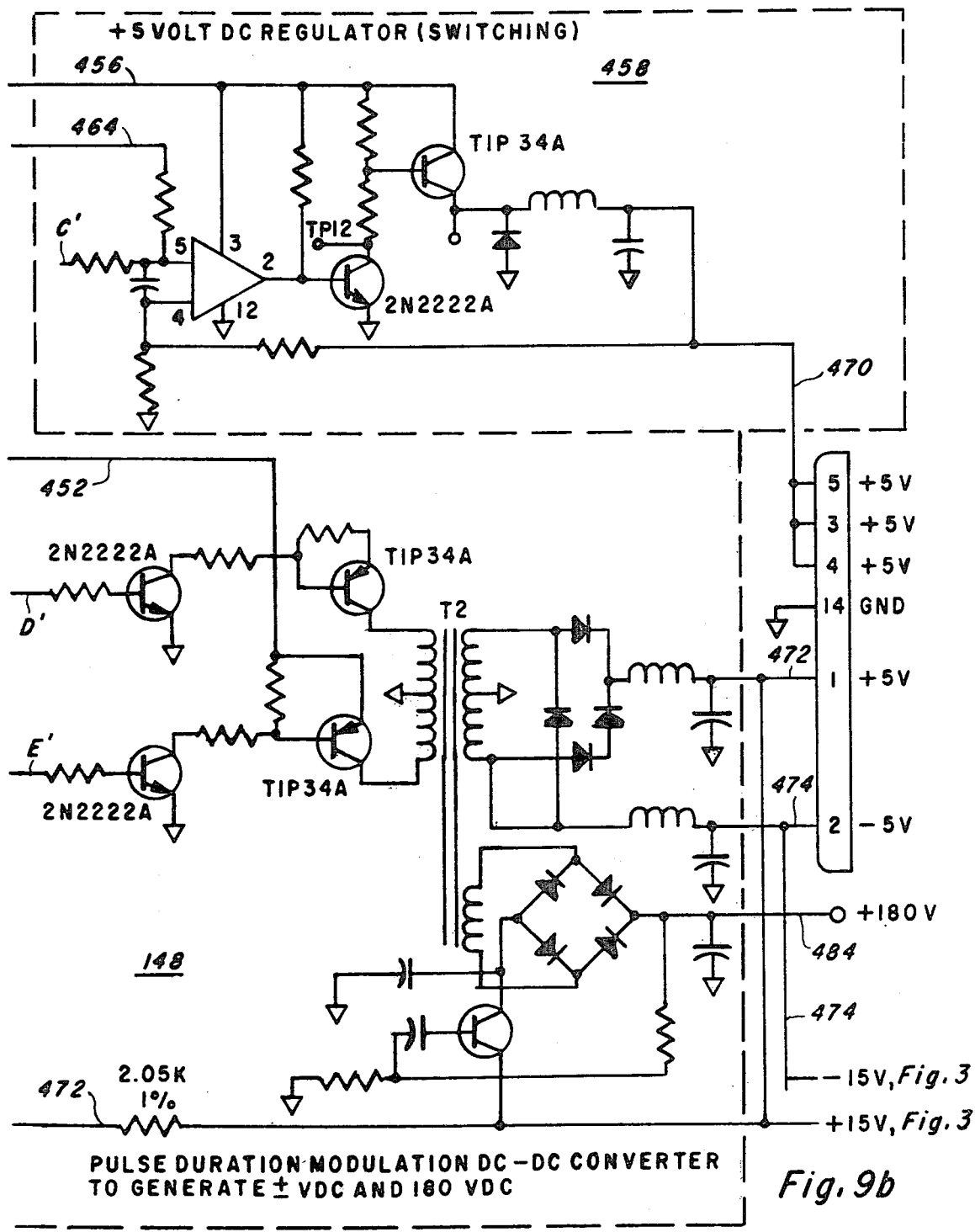

Referring now to FIGS. 9a and 9b, the power supply comprises, for example a +13.6V source, not shown, connected to an input filter 450 (FIG. 9a). The output of filter 450 is connected by lead 452 to a pulse duration modulation dc-dc converter 454 (FIG. 9b) to generate ±15 Vdc and +180 Vdc, and to lead 456 which provides power to a 5Vdc switching regulator 458 (FIG. 9b) and to input terminal 460 of +5 volt regulator and reference 462 (FIG. 9a). The output of the +5v regulator and reference 462 is connected by lead 464 to the pulse duration modulation dc-dc converter 454, to the +5 volt dc switching regulator 458 as shown in FIGS. 9a and 9b and to the input of a 28.57 KHz oscillator 468. The 28.57 KHz oscillator 468 has its output connected by lead 474 to a NOR gate 469 of the pulse duration modulation dc-dc converter 454. The +5 volt dc regulator 458 (switching) provides through lead 470 a +5 Vdc voltage. While the pulse duration modulation dc-dc converter provides by leads 472 and 474, respectively, +15 volt and −15 volt outputs to the decoupling power regulator 476 (FIG. 3a) and to PINS 1 and 2 (not shown) of the processor 171 (FIG. 7c). The +5v outputs are connected to PINS 3, 4, and 5 (not shown) of the processor 171 and the +180v outputs is connected to the dimmer (not shown).

TIMER

Figure 10A:
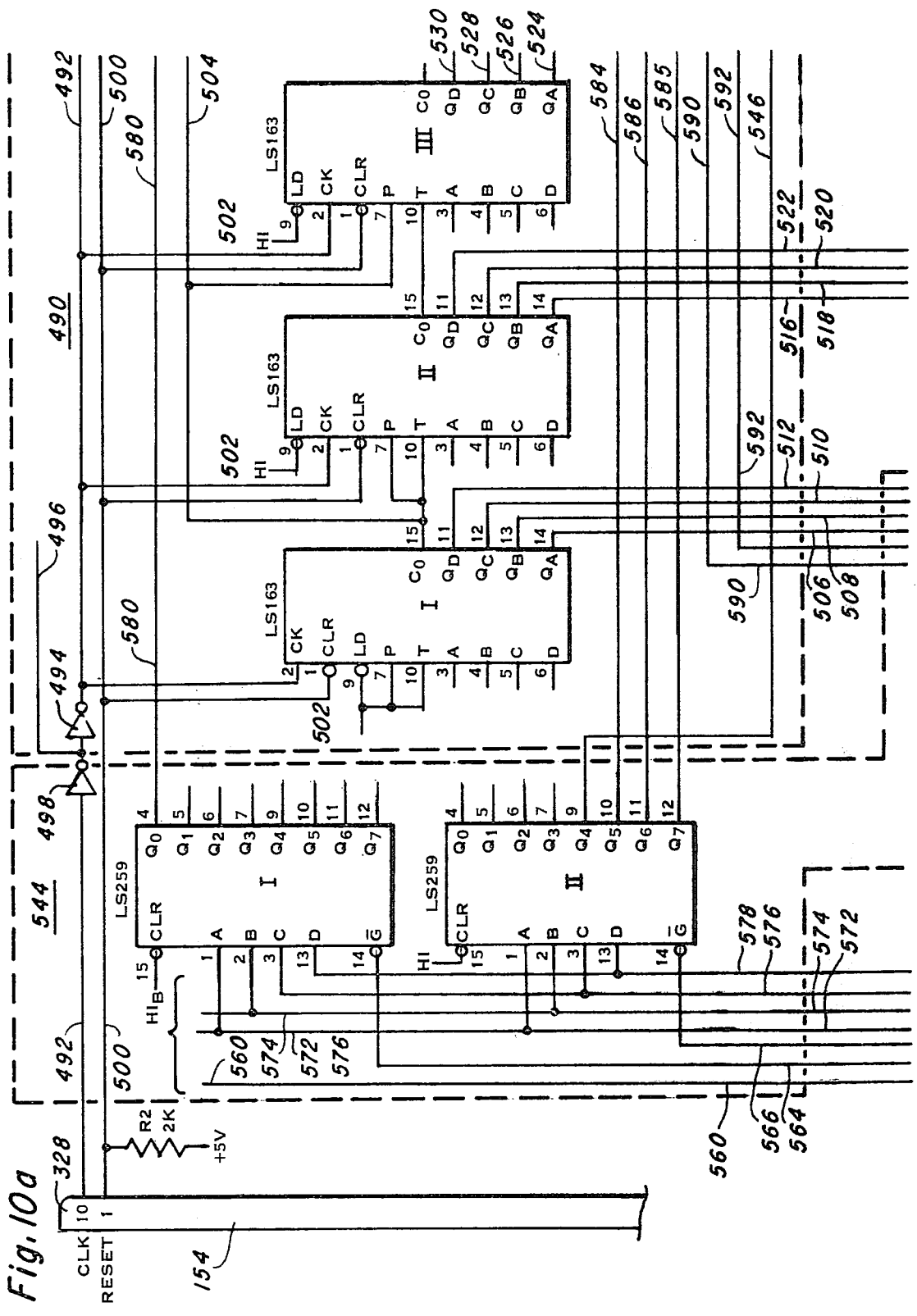
Figure 10B:
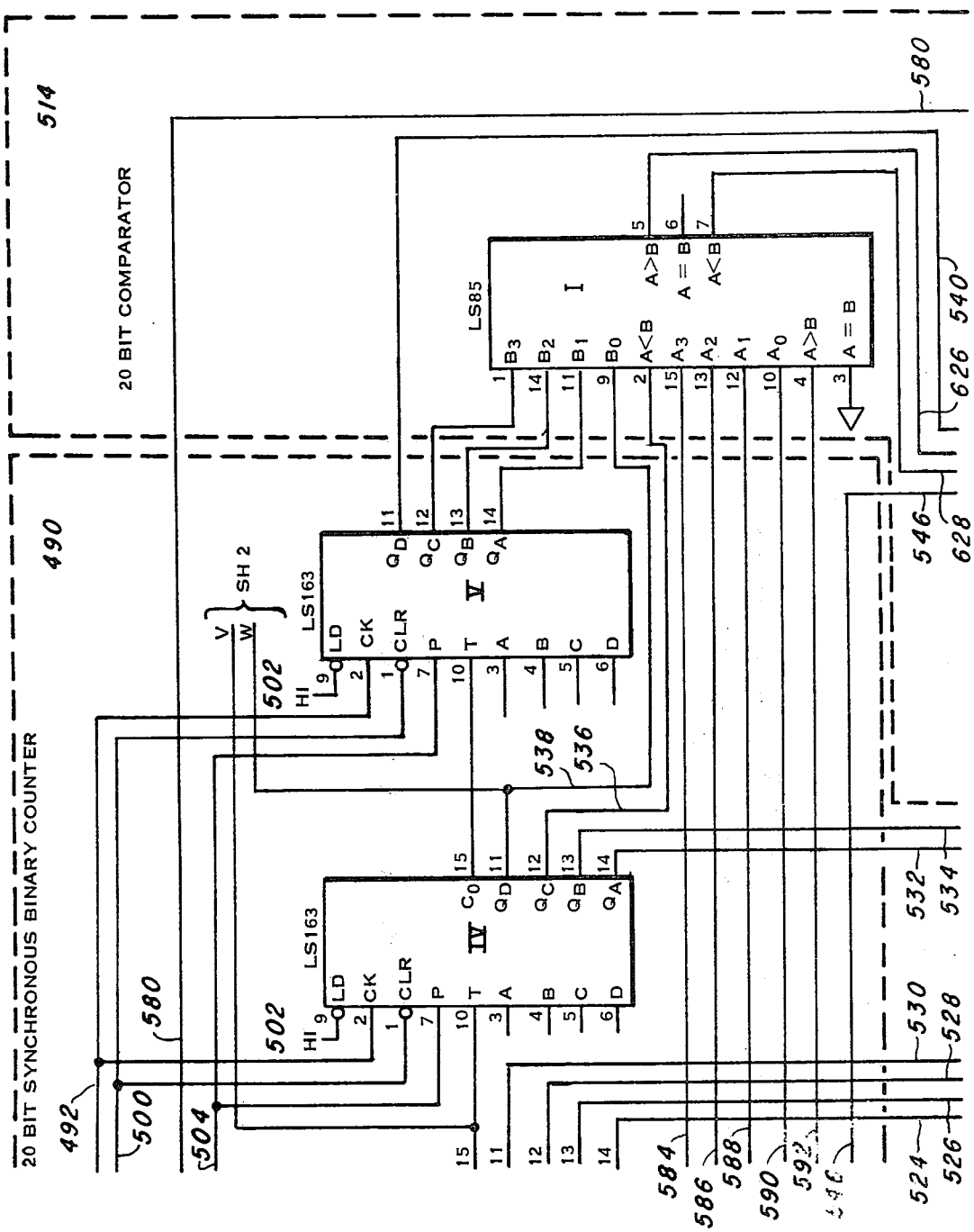

Referring now to FIGS. 10a through 10i for a more detailed description of timer 182 (FIG. 7g), the timing and strobing circuits include a 20 bit synchronous binary counter 490 (FIGS. 10a and 10b). The counter 490 includes five synchronous 4-bit binary counters I–V connected in cascade. The counters may be, for example, SN74LS163's. Synchronous operation is provided by having all flip-flops clocked simultaneously so that the outputs change coincident with each other when so instructed by the count enable inputs and internal gating. The clock terminals (PINS 2) of the counters I–V are each connected by lead 492 to the output of a buffer 494. The input terminal of buffer 494 is connected to the junction of lead 496 and output of buffer 498. Buffer 498 has its input terminal connected by lead 492 to the processors clock terminal 328. The counters I–V clear terminals (1 PINS) are connected through lead 500 to the processor's reset terminal (AO); and their load pins (PIN 9) are disabled. The enable terminals (P, T) of counter I (FIG. 10a) are connected to the HI voltage source and are thereby enabled. The ripple carry output (PIN 15) of the counter I is connected through lead 504 to the P, T enable terminals of counter II and to the P enable terminals of counters III–V (FIGS. 10a, 10b). The ripple carry output pin (15) of counters II–IV are cascaded to the enable pins (T) of counters II–V. The outputs (FIG. 10b) of the 20 bit synchronous counter 490 are connected to a bit comparator 514 (FIGS. 10b and 10d). The comparator 514 includes five comparators I–V which are, for example, SN74LS85's connected as follows. The data output terminals of counter I of the 20 bit synchronous binary counter (FIG. 10a) are connected through leads 506, 508, 510, 512 to the B0, B1, B2, B3 data input terminals (PINS 9, 11, 14, 1) of a 4 bit magnitude comparator IV (FIG. 10d) of the 20 bit comparator 514; the output terminals (PINS 11, 12, 13, 14) of counter II (FIG. 10a) are connected, respectively, by leads 516, 518, 520 and 522 to the A<B terminal (PIN 2) and to the B0, B1, B2 data input terminals (9, 11, 14) of the 4 bit magnitude comparator III (FIG. 10d); the output terminals (PINS 11, 12, 13, 14) of counter III (FIG. 10a) are connected by leads 524, 526, 528, and 530, respectively, to the B3 data input terminal (PIN 1) of comparator III (FIG. 10d) and to the A<B terminal (PIN 2), and B0, B1 data input terminals (PINS 9, 11) of comparator II; the output terminals (14, 13, 12, 11) of counter IV (FIG. 10b) are connected by leads 532, 534, 536, 538, respectively, to B2, B3 terminals (PINS 14, 1) of comparator II (FIG. 10d), input A<B terminal (PIN 2), and B0 data input terminal (PIN 9) of comparator I (FIG. 10b); and the output terminals (14, 13, 12, and 11) of counter V are connected, respectively, to the Bi, B2, and B3 terminals (PIN 11, 14, 1) of comparator I, and by lead 540 to the data input terminal B3 (PIN 1) of comparator V (FIG. 10d). The count output of the 20 bit synchronous binary counter 490 (FIGS. 10a and 10b) is compared in the 20 bit comparator 514 with the 20 bit timer word which is stored by the processor 171 into the input data and control register 544 using the CRU decoder and buffer 542.

CRU DECODER AND BUFFER

The CRU decoder and buffer 542 (FIG. 10c) includes a decoder 546 which is, for example, an SN74LS138 and a buffer (hex inverter) 548 which is, for example, a SN74LS04. The decoder 546 has its select terminals A,B,C (PINS 1, 2, 3) connected, respectively, to the A11, A10 and A9 address terminals (PINS 21, 22, 23) by leads 186, 187 and 188 and its enable terminal G1 (PIN 6) connected to the CRU clock terminal through lead 328 of the processor 171 (FIG. 7c). The output terminals of the decoder 546 (FIG. 10c) are connected to an interrupt reset circuit 752 (FIG. 10f) and to the input data and control register 544 (FIGS. 10a and 10c) as follows. Data output terminal Y6 (PIN 9) (FIG. 10c) is connected by lead 560 to interrupt reset circuit 752 (FIG. 10f) and decoder output terminals Y5, Y4, Y3, Y2 and Y1 (PINS 10 through 14) FIG. 10c) are connected, respectively, by leads 562, 564, 566, 568 and 570 to the enable terminals $\overline{G}$ (14 PINS) of 8 bit addressable latches I, II, III, IV, and V of the input data and control register 544 (FIGS. 10a and 10c). The addressable latches I through V may be, for example, SN74LS259's.

The buffer 548 (FIG. 10c) is an SN74LS04 hex inverter which has its output terminals (PINS 1, 3, 5, and 11) connected, respectively, to the processor's A14, A13, A12 and CRU data out terminal (PINS 18, 19, 20 and 16) by leads 183, 184, 185, and 259; its output terminals (PINS 2, 4, 6, and 10) connected by leads 572, 574, 576, and 578, respectively, to the A,B,C select terminals (PINS 1, 2, 3) and D data in terminal (PIN 13) of latches I, II, III, IV, and V of the output data and control register 544. The processor's address terminal (A14, A13 and A12) are also connected by leads 572, 574, and 576 to the interrupt circuitry 752 (FIG. 10j).

INPUT DATA AND CONTROL REGISTER

The clear terminals of the latches I through V (FIGS. 10a and 10c) are disabled by pull up resistors to the power supply of FIG. 10i. The output terminals of latches I-V (FIGS. 10a and 10c) are connected to inputs of the 20 bit comparator as follows: output Q0 of latch 1 is connected through lead 580 (FIGS. 10a, 10b and 10d) to an input terminal of an AND gate 582 (FIG. 10d); outputs Q5, Q6, Q7 (PINS 10, 11, 12) of latch II (FIG. 10a) are connected by leads 584, 586, 588 to input terminals A3, A2 and A1 (PINS 15, 13, 12) of comparator I (FIG. 10b); outputs Q0, Q1 (PINS 4, 5) of latch III (FIG. 10c) are connected by leads 590, 592 (FIGS. 10c, 10a) to data input terminals A0 and A>B (PINS L0, 4) of comparator I (FIG. 10b); output terminals Q2 through Q6 (FIG. 10c) of latch III are connected by leads 594, 596, 598, 600 and 602 to data input terminals A3, A2, A1, A0 and A>B (PINS 15, 13, 12, 10, 4) of comparator II (FIG. 10d); output terminal Q7 of latch III (FIG. 10c) is connected by lead 604 to data input terminal A3 (PIN 15) of comparator III (FIG. 10d); output terminals Q0 through Q3 of latch IV (FIG. 10c) are connected by leads 606, 608, 610 and 612 to data input terminals A2, A1, A0 and A>B (PINS 13, 12, 10 and 4) of comparator III (FIG. 10d); and output terminals Q4 through Q7 of latch IV (FIG. 10c) are connected by leads 614, 616, 618 and 620 to data input terminals A3, A2, A1, A0 of comparator IV (FIG. 10d). The A=B of comparator IV is enabled through a pull up resistor to the power source of FIG. 10i. The output terminal Q7 of latch V (FIG. 10c) is connected by lead 622 to one input of AND gate 624 of the 20 bit comparator 624 (FIG. 10d). The comparators I-V (FIGS. 10b and 10d) compare the 20 bit time word to the 20 bit synchronous binary counter bit by bit. The A>B and A<B terminals (PINS 5 and 7) of comparator I (FIG. 10b) are connected by leads 626 and 628 to input terminals A2, B2 (PINS 13, 14) of comparator V (FIG. 10d); output terminals A>B and A<B (PINS 5,7) of comparators II, III, and IV are connected, respectively, to input terminals A1, B1; A0, B0; and A>B, A<B data input terminals of comparator V, and output terminal A=B (PIN 6) of comparator IV is connected to input A=B (PIN 3) of comparator V. The output A=B (PIN 6) of comparator V is connected to the other input of AND gate 582 and to comparator out terminal 14 of the processor 171. AND gate 582 is enabled by Q0 of latch I (FIG. 10a) which allows the A=B output (PIN 6) of comparator V (FIG. 10d) to propagate an output logic 1 or 0 signal to an inverter 626 and to the remaining output of AND gate 624. AND gate 624 is enabled by the output of Q7 terminal (PIN 12) of latch V (FIG. 10c) and propagates the output of AND gate 582 as the master compare at terminal 15 (FIG. 10d) of processor 171.

FIVE DECADE SYNCHRONOUS COUNTER FOR COUNTING ONE MILLISECONDS

Figure 10F:
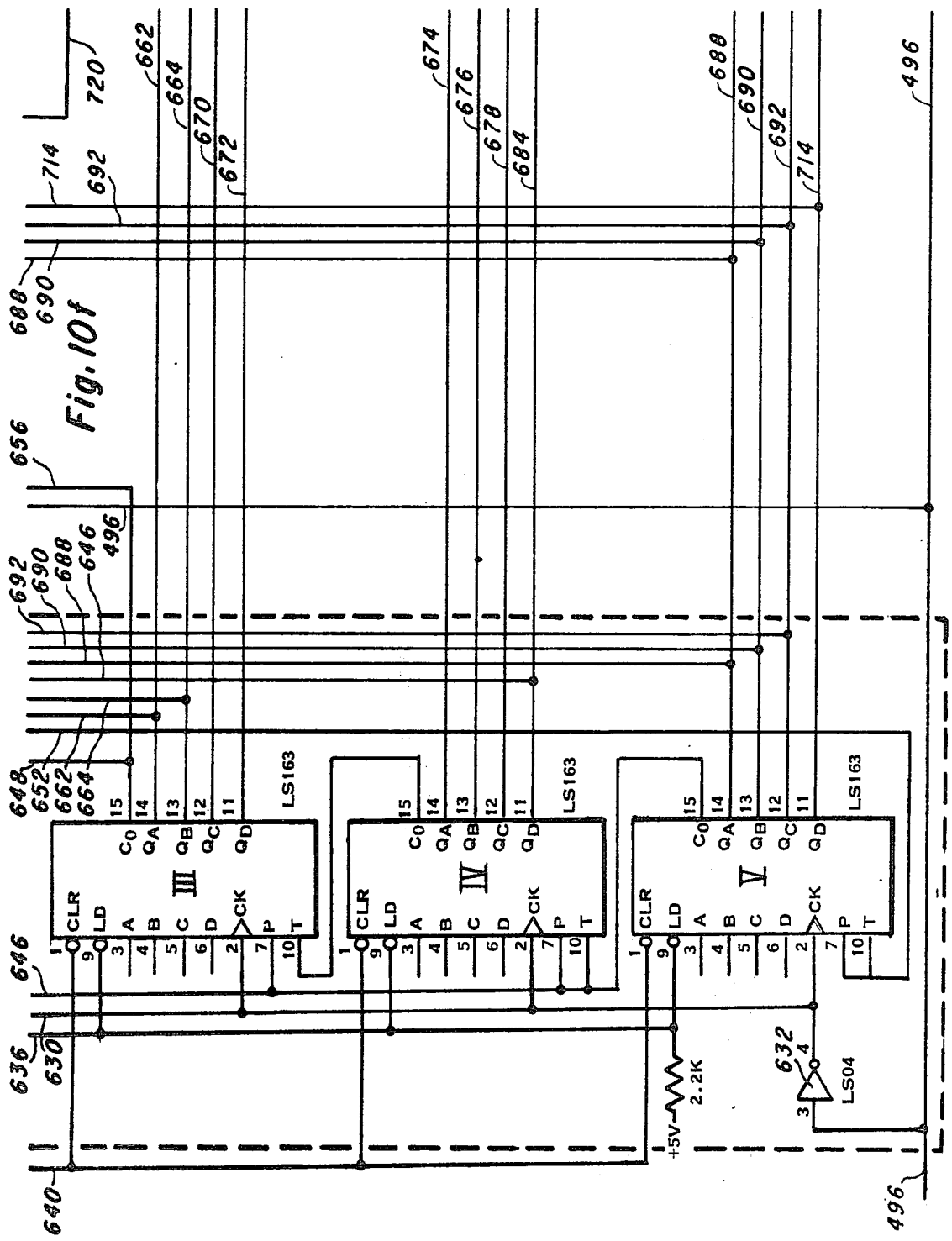

Referring now to FIGS. 10e and 10f, a five decade synchronous center 628 is disclosed. The counter 628 consists of five synchronous 4 bit counters I through V. The counter I may be, for example, a SN74LS162 and counters II–V may be, for example, SN74LS163's. The counters I–V are connected in cascade. The 4 bit counters I through V have the clock terminals (PINS 2) connected by lead 630 to buffer 632. Lead 496 provides the buffered clock output signals of the processor 171 (FIG. 10a) to the buffer 632 (FIG. 10f). Counter I (FIG. 10e) has its enable (T) terminal (PIN 10) and clear terminal (PIN 1) enabled, and the load terminals (9 PINS) of counters II through V disabled by lead 636 connecting them to a pull up resistor, connected to the +5 volt power source (FIG. 10i). The enable (P) terminal of counter I is connected to the output of an inverter 638 (FIG. 10e). The inverter 638 has its input connected to lead 640. Lead 640 is also connected to the clear terminals (1 PINS) of counters II through V, and to NAND gate 654 and $\overline{K}$ input terminals of J-K flip-flops I and II of dual J-K flip-flops 658. The load terminal (PIN 9) of counter I is connected by lead 642 to the inverted output of AND gate 582 (FIG. 10d). The data input terminal D (PIN 6) (FIG. 10e) of counter I is connected to the output of an inverter 644 whose input is connected to the junction of lead 572 (FIG. 10c) and input terminal A (PIN 3) of counter 1 (FIG. 10e). The enable (P) terminals of counters II through IV (FIGS. 10e and 10f) and the enable (T) terminal (PIN 10) of counter IV are connected by lead 646 to the ripple carry output terminal (PIN 15) of counter V, and the enable (T) terminal of counter II (FIG. 10e) is connected by lead 648 to the ripple carry output terminal (PIN 15) of counter III (FIG. 10f). The enable terminal (T) (PIN 10) of counter III is connected to the ripple carry output terminal (PIN 15) of counter IV, and ripple carry output terminal (PIN 15) of counter I (FIG. 10c) is connected to inverter 650 whose output is connected by lead 652 to the P, T enable terminals (PINS 7, 10) of counter V (FIG. 10f). The output terminal QA (PIN 14) of counter II (FIG. 10e) is connected to input terminal 1 of NAND gate 654.

Figure 10G:
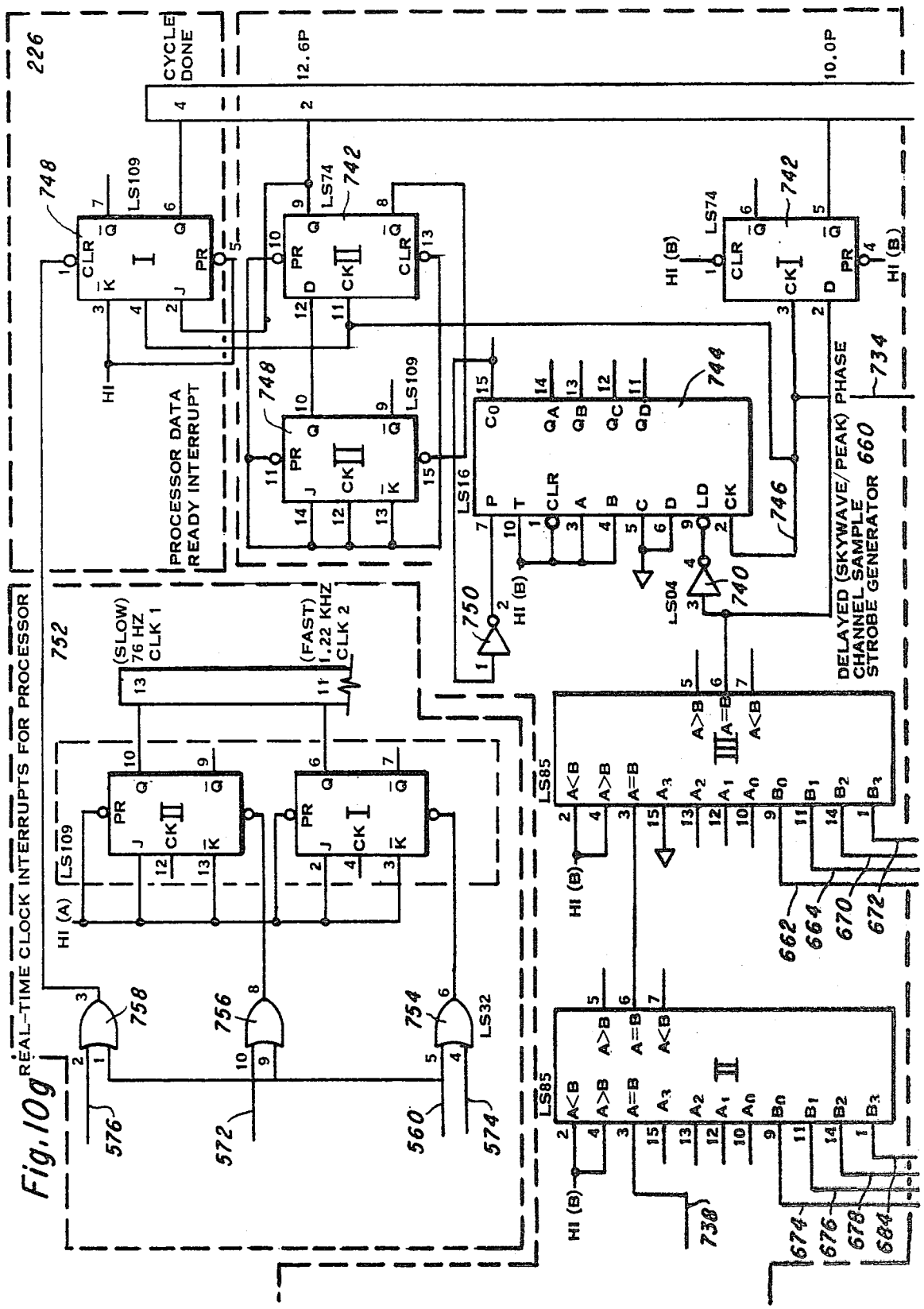

The ripple carry output terminal (PIN 15) of counter III (FIG. 10e) is also connected by lead 656 to the J terminal (PIN 2) of flip-flop I (FIG. 10e) of a dual J-K positive edge triggered flip-flop with present and clear 658 which is the delayed channel sample strobe generator enable. The QA, QB output terminals of counter III (FIG. 10f) are connected through leads 662 and 664 to PINS 3 and 2 of NAND gate 654 (FIG. 10e) and through leads 662, 664 to B0, B1 terminals of a 4-bit magnitude comparator I-III (FIG. 10g) of the delayed phase channel sample strobe generator 660. The QC, QD terminals (PINS 12, 11) of counter III (FIG. 10f) are connected through leads 670 and 672 to the B2, B3 input terminals (PINS 14, 1) of comparator III (FIG. 10g). The QA, QB, QC output terminals (PINS 14, 13, 12) of counter IV (FIG. 10f) are connected by leads 674, 676, 678 to the junctions of B0, B1, B2 terminals of comparator II (FIG. 10g) of the delayed phase channel sample strobe generator 660 and the B, C, D terminals of a decoder 680 (FIG. 10h) of a ground wave phase and envelope channel sample strobe generator 682. The QD terminal (PIN 11) of counter IV (FIG. 10f) is connected by lead 684 to the junction of a terminal (PIN 4) of NAND gate 654 (FIG. 10e) and the J terminal of flip-flop II of the dual J-K flip-flop 658 (FIG. 10e) and to the B3 terminal (PIN 1) of comparator II (FIG. 10g) of the delayed phase channel sample strobe generator 660. Finally, the QA, QB, QC terminals (PINS 14, 13, 12) of counter V (FIG. 10f) are connected by leads 688, 690 and 692 to terminals (PINS 5, 6, 11) of NAND gate 654 (FIG. 10e), to terminals B0, B1, B2 of comparator I (FIG. 10e) of the delayed phase channel sample strobe generator 660, and to B, C, D terminals (PINS 14, 13, 12) of a second decoder 712 (FIG. 10h) of the ground wave phase and envelope channel sample strobe generator 682. The QD output of the counter V (FIG. 10f) is connected by lead 714 to B3 terminal of comparator I (FIG. 10e) and to the A terminal of decoder 680 (FIG. 10h).

The output of NAND gate 654 (FIG. 10e), as previously mentioned, is connected to the $\overline{K}$ terminals (PINS 13, 3) of the flip-flop I and II dual J-K flip-flops 658 and to lead 640 of the five decade synchronous counter 658 for counting one millisecond intervals (FIG. 10e).

The clock terminals (PINS 4, 12) of the flip-flops I and II of the dual J-K flip-flops 658 (FIG. 10e) are connected by lead 496 to the processor clock output terminal (PIN 10) (FIGS. 10f and 10a).

The Q terminal (PIN 10) of flip-flop II (FIG. 10e) of the dual J-K flip-flop 658 is connected by lead 720 to input terminals (PINS 2, 5, 11, 3, 10) of triple input positive-NOR gates 724 and 726 (FIG. 10h). These triple 3-input positive NOR gates may be SN74LS27's.

GROUNDWAVE PHASE AND ENVELOPE CHANNEL SAMPLE STROBE GENERATOR

Output terminals 0, 3, 9, 6, 8 (PINS 1, 4, 11, 7, 10) of decoder 680 (FIG. 10h) are connected, respectively, to input terminals 13, 3, and 9 of triple 3-input positive NOR gate 724, and to input terminals 9 and 5 of identical NOR gate 726. While the output terminals 2, 4, 8, 0, 6 (PINS 1, 5, 10, 1, 7) of decoder 712 are connected, respectively, to input terminals 1, 4, 10 of NOR gate 724, and to input terminals 4 and 11 of NOR gate 726. The output terminals 12, 6, and 8 of triple NOR gate 724 are connected to input terminals 5, 2, and 12 of dual 2-wide 2-input AND-OR invert 728, which may be, for example, an SN74LS51. While outputs 6 and 8 of triple NOR gate 726 are connected, respectively, to the D terminals (PINS 2 and 12) of the positive D-type positive edged triggered flip-flops with preset and clear 730 (SN74LS74); terminal 8 is also connected to input 9 of the dual AND-OR-invert gates 728 (FIG. 10h). The output terminals (PINS 6, 8) of the dual 2-wide 2-input AND-OR-invert gates 728 are connected to the D terminals (PINS 12, 2) of dual D-type positive edge-triggered flip-flops with preset and clear 732. The clock terminals (PINS 11, 3) of dual flip-flops 732, and clock terminals 3 and 11 of dual flip-flop 730 are connected by lead 496 through the buffer 498 to the processor clock output terminal 10 (FIG. 10a), and the clear and preset terminals 10, 13 of flip-flops I and IV and clear and preset terminals 1 and 4 of flip-flops II and III are disabled by a lead 736 to a pull up resistor. The $\overline{Q}$ output terminals (PINS 8 and 6) of flip-flops I and II provide the 0 or 5 $\mu$secs and 10 or 15 $\mu$secs envelope channel timing pulses to terminals 9 and 6 of processor 171 (FIG. 7c) and latches V and VI of the RF unit data latches and processor input multiplexer 210 and the Q output terminals (PINS 5, 9) provide the 10.0 $\mu$sec and 12.6 $\mu$sec phase channel timing signals to terminals 8 and 7 of processor 171 and latches I and II of the RF unit data latches and processor input multiplexer 210.

DELAYED (SKYWAVE/PEAK) PHASE CHANNEL SAMPLE STROBE GENERATOR

The Q output terminal (PIN 7) of flip-flop I of the J-K flip-flop 658 (FIG. 10e) is connected to the A=B input terminal (PIN 3) of comparator I of the delayed phase channel sample strobe generator 660. The A<B and A>B input terminals (PINS 2 and 4) of comparator I are disabled by a pull up resistor to a source of power (FIG. 10i) and the A3, A2, A1, A0 input terminals (PINS 15, 13, 12, 10) are connected, respectively, to the Q0, Q1, Q2, Q3 output terminals (PINS 4 through 7) of latch II (FIG. 10a) of the input data and control register 544 (FIGS. 10a and 10c). The A=B output terminal (PIN 6) of comparator I (FIG. 10e) is connected by lead 738 to A=B input terminal (PIN 3) of comparator II (FIG. 10g) whose A<B and A>B input terminals (PINS 2, 4) are disabled by a pull up resistor to source of power (FIG. 10i). Input terminals A3, A2, A1 and A0 of comparator II are connected to the Q4, Q5, Q6, and Q7 output terminals (PINS 9, 10, 11, 12) of latch I of the input data and control resistor 544 (FIG. 10a). The A=B output terminal (PIN 6) of comparator II (FIG. 10g) is connected to the A=B input terminal (PIN 3) of comparator III whose A<B and A>B input terminals (PINS 2, 4) are disabled by a pull up resistor to source of power (FIG. 10i). The A2, A1, and A0 input terminals (PINS 13, 12, 10) are connected to the Q1, Q2, Q3 output terminals (PINS 5, 6, 7) of latch I of the input data control resister 544 (FIG. 10a). The A=B output terminal (PIN 6) of comparator III (FIG. 10g) is connected to the junction of inverter 740 and the D terminal (PIN 2) of flip-flop I of dual D-type positive-edge-triggered flip-flops 742. The output terminal of inverter 740 is coupled to the load terminal (PIN 9) of a synchronous 4-bit counter 744. The counter 744, which may be, for example, an SN74LS163, has its enable terminal (T) (PIN 10), clear terminal (PIN 1) and A and B data input terminals (PINS 3, 4) connected to a pull up resistor whereby T is enabled, clear is disabled and counter inputs A and B are forced to logic 1's. The clock terminal (PIN 2) is connected by lead 746 to the junction of clock terminals (PINS 3, 11) of flip-flops I and II of dual D type positive-edge-triggered flip-flops 742 and clock terminal (PIN 4) of flip-flop I of a dual J-K positive edge triggered flip-flops 748. The other (P) enable terminal (PIN 7) of the synchronous 4-bit counter 744 is connected to the output terminal of inverter 750 having its input terminal connected to the junction of ripple carry output terminal (PIN 15) and clock terminal (PIN 12) of flip-flop II of dual J-K flip-flop 748. The clear terminal (PIN 13) of the D-type flip-flop II of the dual D type flip-flop 742 and the $\overline{K}$ and J terminals (PINS 13, 14) of flip-flop II of the dual J-K flip-flop 748 are connected to the junction of the preset terminal (PIN 10) of the D type flip-flop II of the dual D type flip-flop 742 and to a pull up resistor to source of power (FIG. 10i). The preset terminal of flip-flop II of the dual J-K flip-flop 742 is connected also to the preset terminal of the J-K flip-flop II of the dual J-K flip-flop 748. The clear terminal (PIN 15) and Q output terminal of the flip-flop II of the dual J-K flip-flop 748 are connected, respectively, to the $\overline{Q}$ output terminal (PIN 8) and D terminal (PIN 12) of flip-flop II of dual D flip-flop 742. The Q output terminal (PIN 9) of this flip-flop II is coupled to the junction of the 12.6 P (peak) μsec output terminal 2 of the processor 171, and the J terminal (PIN 2) of J-K flip-flop I of dual J-K flip-flop 748. The data ready interrupt is generated after the last strobe which is the 12.6 peak μsec count. The preset terminal (PIN 5) and $\overline{K}$ input terminal (PIN 3) of the J-K flip-flop I of dual J-K flip-flop 748 are connected to a pull up resistor to source of power (FIG. 10i). The clear terminal (PIN 1) of J-K flip-flop I of J-K flip-flop 748 is connected to an output of an interrupt reset OR gate 758 (FIG. 10j).

REAL-TIME CLOCK INTERRUPTS FOR PROCESSOR

The real-time clock interrupts for processor 752 (FIG. 10j) includes three OR gates 754, 756, 758. OR gate 754 has its input terminals (PINS 4, 5) connected, respectively, to leads 574 and 560 of the processor CRU decoder and buffers 542 (FIGS. 10a, 10c). While OR gate 756 has its input terminals 10 and 9 connected, respectively, to leads 572 and 560 of the Processor CRU decoder and buffers 542, and OR gate 758 has its input terminals (PINS 1 and 2) connected, respectively, to leads 560 and 576 of the processor CRU decoder and buffers 542. The output terminals (PINS 6 and 8), respectively, of OR gates 754 and 756 are connected to the clear terminals (PINS 1 and 15) of J-K flip-flops I and II of a dual J-$\overline{K}$ positive edge triggered flip-flops 760. The preset terminals (PINS 5, 11) and J-$\overline{K}$ terminals (PINS 2, 3, 14, 13) are to a pull up resistor to a source of power (FIG. 10i). The Q output terminals (PINS 10, 6) provide, respectively, the 76 Hz (clock 1, slow) and 1.22 KHz (clock 2, fast) for the processor 171 (PINS 13, 11). As previously mentioned, the output of OR gate 758 is connected to the clear terminal (PIN 1) of the processor data ready interrupt J-$\overline{K}$ flip-flop I, of dual J-$\overline{K}$ flip-flop 748. The Q output terminal (PIN 6) of J-K flip-flop I is connected to the cycle done terminal (PIN 4) of the processor 171.

FRONT PANEL

Figure 11A:
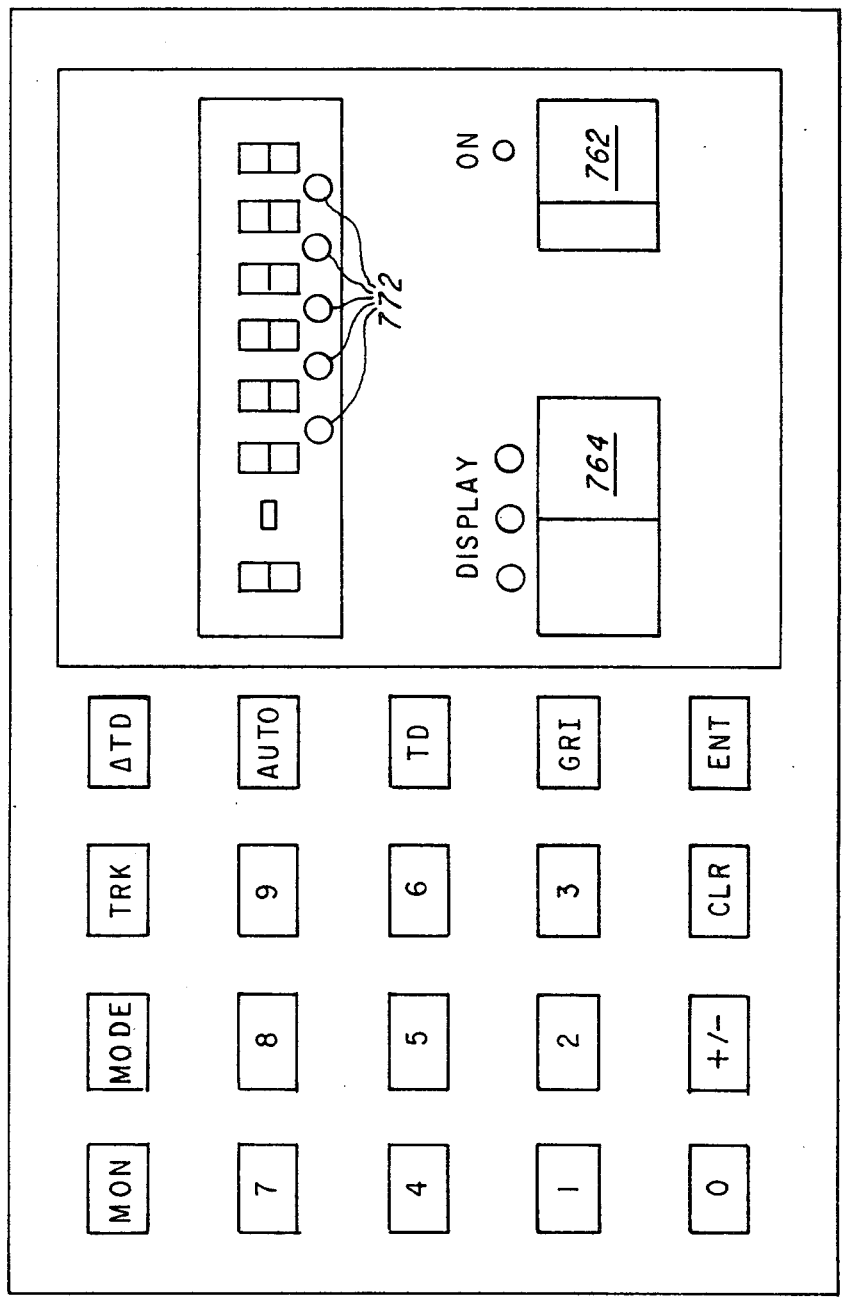
FIGS. 11a–11c are plan views of the front panel.

The front panel (FIG. 11a) includes an on/off switch 762 located at the lower right of the control panel. A dim siwtch 764 is located at the lower center portion of the control panel. Sliding the switch to the extreme right brightens the display. The middle position dims the display and the far left position will turn-off the display. When in the off mode, the decimal point/warning indicators 772 will be in the dim mode. The display (FIG. 11b) contains six data displays 766, a minus sign 768 for the data display, a station identification display 770, and the five decimal point/warning indicators 772.

The keyboard 774 (FIG. 11c) has twenty keys divided into either the data entry or function category. The data entry keys include the ten digits (0 through 9), plus/minus, clear (CLR) and enter (ENT) keys. The function keys are again divided into three groups, namely, primary function keys, secondary display keys and special function keys. The primaries are the group repetition interval (GRI), time difference (TD), and automatic (AUTO) keys; the secondaries are the monitor (MON) and Mode (MODE); and the special functions are the track (TRK) and change in time difference (ΔTD).

Figure 11B:
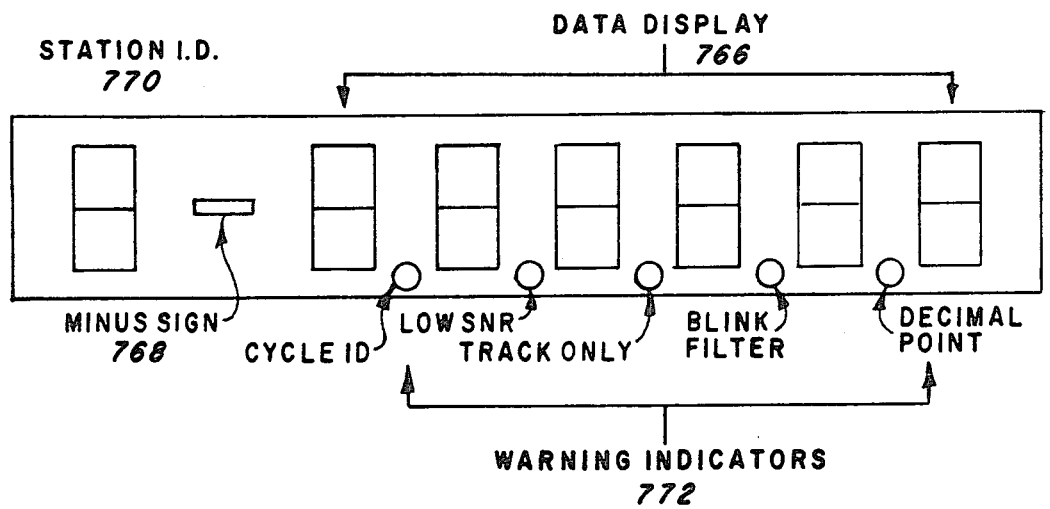

In operation of the keyboard for maximum ease, the Loran C receiver operates in the fixed format mode, after a function key is pressed that requires a station identification, the next key pressed, if it is valid station identification, will be placed in ID display 770 (FIG. 11b). When a data string is required, the digits entered will be automatically placed in the proper position of the data display 766. Any trailing zeros will be added or the decimal point will come on if necessary. All digits entered after the display is full are ignored. The receiver will respond to only one key at a time; errors are corrected after pressing the clear (CLR) key. The digit keys 0 through 9 enter numbers 0-9. The clear key erases information in the display and sets the keyboard to zero for the start of a new function. The contents of the GRI, any ΔTD changes or the mode of the stations are not changed by the clear key. The enter key is used only with functions GRI, ΔTD, and MON; it instructs the receiver that the number in the data display is to be used for entering, modifying or displaying the function. The plus/minus key is used only in function ΔTD. It instructs the display to change the sign of the number appearing in the data display. To enter a negative number, the proper number is entered, the plus/minus key pressed, and then the ENT key is pressed.

Error indications are flashing nines on all the displays. An error may occur for any of the following reasons: (1) a digit or the plus/minus key has been pressed after the clear key was pressed or after a function has been properly entered; (2) an invalid station identification has been entered (valid station ID for the following functions are time difference (TD)—1 through 4, monitor (MON), mode (MODE), track (TRK), (Δtd) 0 through 4); (3) invalid data has been entered (valid data for the following functions are GRI 4000 through 9999; MON 1 through 4 (monitor codes), and ΔTDO, ± 10.0 ± 20.0, ± 30.0. Error recovery is accomplished by either pressing the CLR key or by pressing any of the function keys).

Warning indications are given by the lighting of the proper decimal point/warning indicator 722 (FIG. 11b). The five dots are, from left to right: (1) CYCLE ID-the station has not finished with CYCLE ID or mode is less than 4; (2) SNR-station signal to noise ratio is low (this means the station may not be reliable as others); (3) TRACK-station has been locked out of CYCLE ID or the MODE is equal to "5"; (4) BLINK this means that the secondary stations are blinking and the time difference data are unreliable; (5) DECIMAL POINT—Turned on or off by the display; no waring is attached. Indicators 1, 2, 3, 4 and 5 are dependent upon which station and what data is being displayed and are cleared together with the data displays when the clear key is pressed.

As to the function keys, it is not necessary to press the clear key between functions. At any time, if a function has been completed or if it is to be aborted either the clear key or any of the function keys will terminate the function. Repeated pressing of a function key is not ignored. If a number entry is not made between functions, the receiver will maintain the current display. The automatic key is an exception, it will always display the lowest station ID and TD when pressed. The decimal point is used to indicate an accepted function key press. When a function key is pressed and the display is zeroed, the decimal point will light to indicate that the key has been accepted. This will occur when the following keys are pressed. GRI—at power on, when a GRI has not been entered. TD, ΔTD, TRK, MODE, MON—whenever they are pressed. And AUTO—when the unit is still searching for the stations.

The main or principal functions of GRI, TD, and AUTO are used to select a Loran chain and to display the measured time differences. The GRI (Group Repetition Interval) entered identifies the Loran chain being used. The correct GRI, ranging from 4000 to 9999, is obtained from navigation charts. The receiver will not start performing until GRI is entered. The time difference (TD) is computed between the master and secondary stations. The result, ranging from 10,000 to 90,000, will be displayed and can be found on the navigation charts. The automatic sequence of TD display (AUTO) displays a TD for four seconds then automatically changes the display to the next TD in sequence. The following examples illustrate the operation of these principal functions which are the only functions necessary to operate the receiver.

EXAMPLE I (TO ENTER A GRI)

If a GRI has not been previously entered the first decimal point will come on. The digit is placed in the proper display with trailing zeros added. If the last digit is a zero as in GRI 9930, it is not necessary to re-insert it. The enter key when pressed stores the GRI and starts the unit looking for stations. The displays turn off momentarily to indicate that the enter key has been recognized.

EXAMPLE II (END OF GRI ENTRY)

Press the clear key for optional clearing of the display. After a GRI has been entered, it will be displayed when the GRI key is pressed. To change a GRI the new GRI is entered over the previous one.

EXAMPLE III TD MANUAL OPERATION

By pressing the TD key, the first decimal point will come on to indicate receiver acceptance. Then when key 1 is pressed the time difference for station 1 is displayed. If the fifth decimal point light comes on it indicates the station is still in cycle identification. By pressing TD again the decimal point will come on again. It is not necessary to press the clear key between functions. Then by pressing the key 2 the time difference for station 2 is displayed. If the station is not out of cycle ID, or SNR is low the appropriate decimal point light comes on.

EXAMPLE IV (TD, AUTOMATIC OPERATION)

By pressing AUTO key the time difference for the lowest station is displayed. Four seconds later the next station in sequence is displayed and the cycle repeated.

EXAMPLE V (MONITOR)

The monitor is used to display one of the monitor codes as follows:

Code 1 displays the signal-to-noise (SNR);

Code 2 displays the absolute envelope-to-cycle discrepancy (ECD). ECD is an indication of the relative phase between the carrier and envelope of the station pulses selected.

Code 3 displays the relative ECD between the master-to-station ECD and the secondary station ECD;

Code 4 displays the frequency error which indicates a combination of frequency error in the unit, and the radial velocity with respect to the transmitter tower.

By pressing the MON key the decimal point will come on to indicate acceptance. Next the desired station is selected by selectively pressing a digit key, for example, key 1 for station 1. The station number is displayed together with the fifth decimal point if station 1 is still in cycle identification. Next, the desired monitor code is selecting by pressing selectively one of digit keys 1 through 4. The selected key is displayed which, for example, is four for the frequency error of that station. When the enter key is pressed the frequency error is displayed. After entry of any other code number, the code number is displayed and then the enter key is pressed to display the appropriate data for the new code number.

EXAMPLE VI (MODE)

The MODE key is used to display the mode of a particular station where the modes are:

0 for search to acquire all possible stations in the chain. 1 for narrowband to find the groundwave and be ahead of the skywave. 2 for wideband to fine tune stations with consideration to skywave. 3 for cycle ID to provide further resolution of the tuning. 4 for track during which the selected RF cycle is determined and phased locked to. 5 for track only provides a manual override of cycle ID.

When the mode key is pressed, the decimal point will come on to indicate an acceptance. Then the station desired is pressed in—a 2 for station 2—the mode is displayed. a 4 means it is in TRACK.

EXAMPLE VII (SPECIAL FUNCTION - TRACK)

The TRK key is for track only and allows the operator to override the decision in cycle ID when the operator knows the TD's are correct. This function will change the mode of the station from 3 or 5 to 5 and turns on the TRACK indicator. By entering TRACK a second time, the TRACK indicator will be turned off and the mode will go back to 4 (this will have no effect on the operation as a navigational instrument).

By pressing the mode key and a digit key for a station, the mode of the station selected is indicated. The mode must be a 3, 4, or 5. Then for entering track-only the TRK key is pressed; the decimal point comes on to indicate an accepted key press. Then the digit key for the desired station is pressed and the track indicator comes on and the time difference (TD) for the station is displayed. During this time the cycle indicator is off. Next the mode key and a digit key for the station are pressed and the mode is changed to 5 and the track indicator is still on. Next the track key and a digit key for the station is pressed and the TD is displayed, but the track indicator is now off. Finally the mode key and station key are pressed and the mode is changed to 4 (TRACK).

EXAMPLE VIII (SPECIAL FUNCTION-CHANGE IN TIME DIFFERENCE (ΔTD)

The ΔTD key allows the operator to override cycle ID in obtaining the correct TD. Valid changes are ± 30.0, ± 20.0 and ± 10.0 microseconds. A ΔTD to station 0 will result in a TD change of all the other stations.

To examine the present status the TD key and digit key for the station are pressed and the display shows the TD before the change. Next the mode is determined by pressing the mode key and the digit key for the station. The mode must be 3, 4, or 5. If the mode is, for example, a 4 the time difference can be changed by pressing the ΔTD. A decimal will come on to indicate an acceptance. Next the digit key for a station is pressed (1, for example); then the key for the time change is pressed, for example, a 2 for a 20.0. If the time is to be subtracted then the +/− key is pressed and the display indicates 20.0 μsecs are to be subtracted from the TD for station 1. Then the enter key is pressed and the actual subtraction is done and displayed.

OPERATION

Figure 11C:
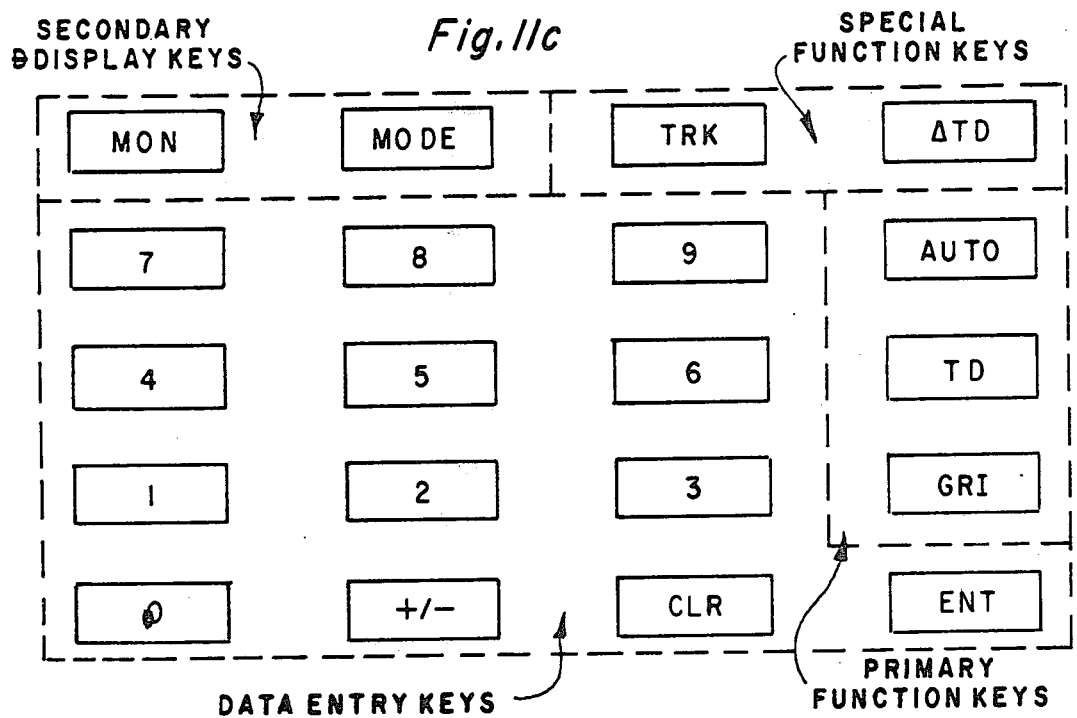

In operation the Loran C receiver is turned on by switch 316 (FIG. 8f) located on the control panel. When turned on the microprocessor 171 (FIGS. 7c and 7d) is reset to receive the first instruction. A group repetition interval (GRI) is entered into the microprocessor by selectively pressing the digit keys of the keyboard (FIG. 11c). The rows of the keyboard are constantly strobed by decoded signals obtained by the keyboard buffer 374 (FIG. 8d) from the data register 340 (FIG. 8a); while the columns of the keyboard are scanned by the keyboard input multiplexer 294 (FIG. 7h). The microprocessor 171 determines the digit pressed from the row and column information.

The microprocessor orients itself as to time by sending out an arbitrary twenty bit time word to timer input data and control register 544 (FIGS. 10a and 10c) which is compared with an input from the twenty bit synchronous binary counter 490 (FIGS. 10a and 10b) by the timer comparator 514 (FIGS. 10b and 10d). When the output of the twenty bit synchronous binary counter 490 reaches the arbitrary twenty bit time word, a comparator out and a master comparator signal (FIG. 10d) is sent to the processor 171 (FIGS. 7c and 7d) and to the five decade synchronous counter 628 (FIGS. 10e and 10f) of the timer 182 (FIG. 7g) for counting one or eight msecs. The microprocessor knows the clock frequency (5MHz) and therefore the count (5,000) in one msec. The microprocessor then sends out time data words (X + 5,000 counts) to the comparator 514 (FIGS. 10b and 10d) to determine one msec. intervals for the microprocessor. This is necessary as the microprocessor cannot operate as fast as the clock. The microprocessor 171 (FIGS. 7c and 7d) also sends out signals which are decoded and buffered in the processor CRU decoder and buffers 542 (FIG. 10c) to a real time clock interrupt 752 (FIG. 10j) for the microprocessor 171 for determining time lapse. The real time interrupts for the microprocessor provide a slow (76Hz) and a fast (1.22KHz) count for the microprocessor and a data ready interrupt 226 (FIG. 10j) indicates a completion of the strobe signals.

Figure 3D:
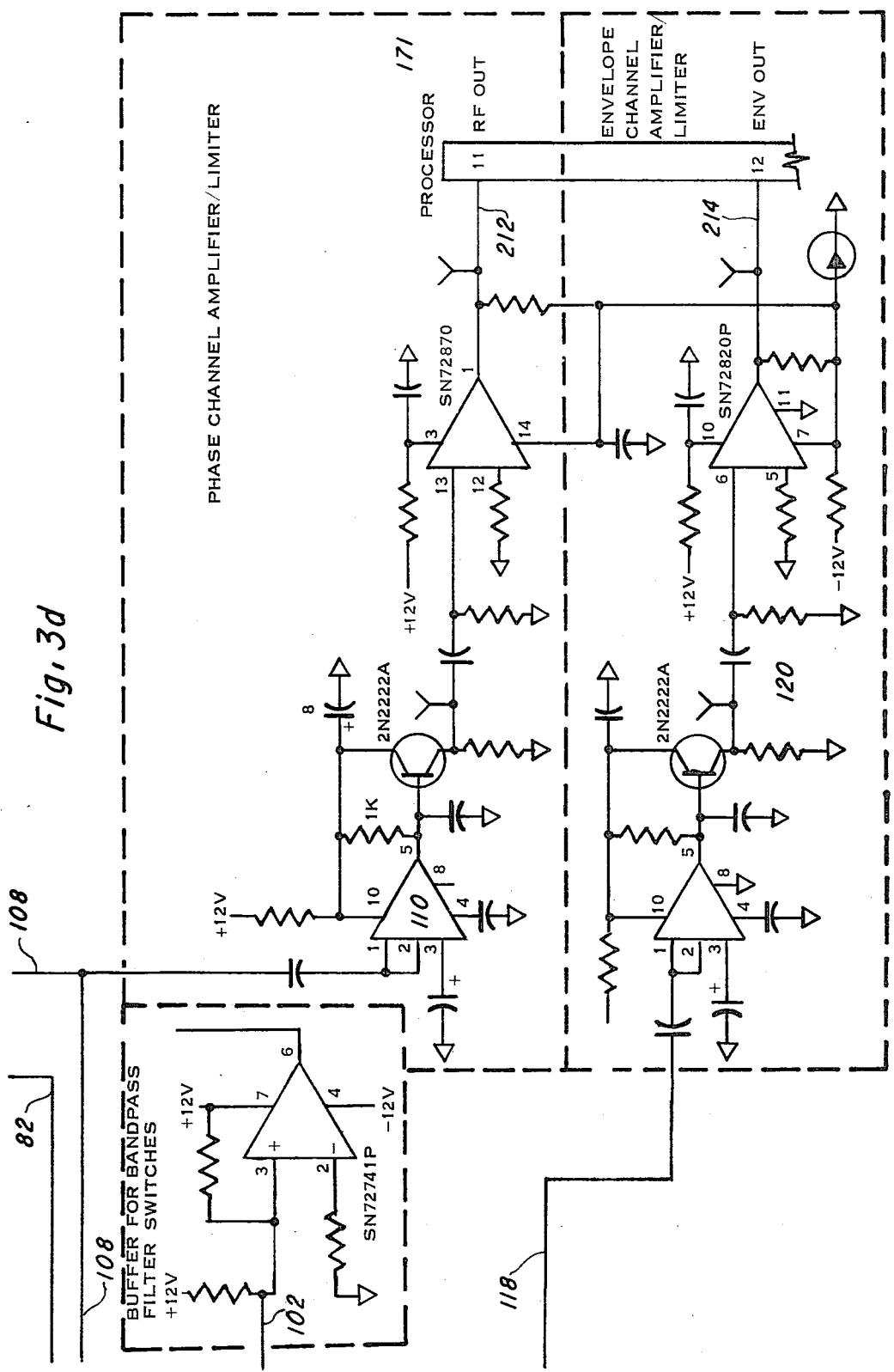

When the five decade synchronous counter 628 (FIGS. 10e and 10f) receives the comparator 514 (FIGS. 10b and 10d) output signal it begins counting. The count is connected to the groundwave phase and envelope channel sample strobe generator 682 (FIG. 10h) which provides a plurality of strobe signals as follows: 0/5, 10/15, 10, and 12.6 μsecs. A strobe selector 728 is provided to select either the 0 or 5, or 10 or 15 μsecs. signals. The count is also provided to a comparator of the delayed phase channel sample strobe generator 660 (FIG. 10g) which compares it to an 11 bit delay word of the input data and control register 544 (FIGS. 10a and 10c). The output of the comparator triggers a counter 744 (FIG. 10g) in the generator 660. The generator 660 provides 10.0 P (peak) μsecs. signal and 12.6 P μsecs. timing signals. The 12.6 P μsec. signal is applied also to the microprocessor 171 for providing a cycle done signal. The 10, 12.6, 10P, 12.6P, 0/5, 10/15 μsecs. strobes of timer 182 (FIG. 7g) are connected to latches of the RF unit data latches and microprocessor input multiplexer 210 (FIG. 7g and 7h) for sampling the digitized outputs of the phase channel limiter 112 (FIG. 3d) and the envelope channel limiter 120 (FIG. 3d).

The multiplexer 228 (FIG. 7h) of the RF unit data latches and microprocessor input multiplexer is controlled by the microprocessor 171 (FIGS. 7c and 7d) to multiplex the outputs of the latches I-VI to the microprocessor for processing. The microprocessor 171 (FIGS. 7c and 7d) while processing the outputs of the latches recognizes any envelope distortions and provides gain correction signals through the RF unit interface latch and buffer 246 (FIG. 7f) to appropriate switches of the variable gain element 86 (FIG. 3c) of the RF signal undelayed channel. The processing of the data is described in conjunction with the flow charts.

Figure 12:
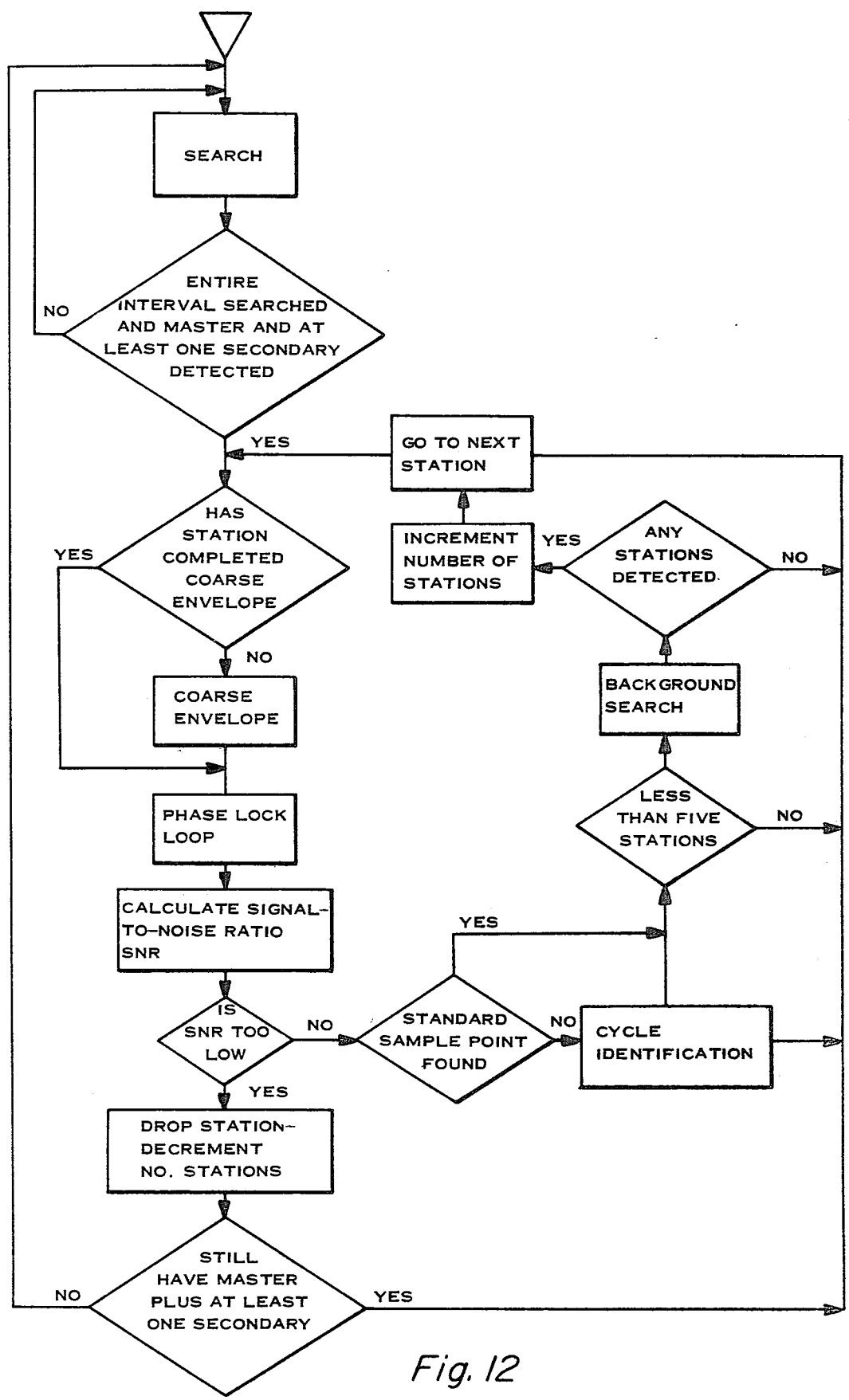
FIG. 12 is a top level flow chart of instructions for the LORAN C microprocessor.

The microprocessor 171 (FIGS. 7c and 7d) is programmed to process the incoming radio frequency signals in accordance with the top level flow chart (FIG. 12). When the Loran C receiver is turned on, the time reference and phase code synchronization of the transmitted RF signals is unknown and arbitrary. Thus, a search 780 is conducted of the entire group repetition interval (GRI) and a decision 782 made whether a master and at least one secondary (slave) signal is detected. If not, the time interval is advanced a selected segment of the time interval and the interval searched again. If yes, the decision 784 is made whether the station has completed coarse envelope. If not, coarse envelope 786 is completed.

When a station has completed coarse envelope, phase lock loop 788 locks onto the signal chain and the signal-to-noise ratio (SNR) 790 determined. A decision 792 is then made whether the SNR is too low. If it is, the station is dropped 794 and a decision 796 made whether a master and at least one secondary signal are present. If not, a new search is made, and if true, the next station is selected 798. If the SNR is not too low, a decision 800 is made whether a standard sample point has been found. If it has not, cycle identification 802 is made. If the standard sample point was found or after cycle identification, a decision 804 is made whether less than five stations are present. If not the system proceeds to the next station. If less than five stations, a background search 806 is made and a decision 808 made whether any stations are detected. If no stations are detected the system goes to the next station and repeats; if stations are detected, the number of stations are incremented 810 and the cycle repeated.

Figure 13:
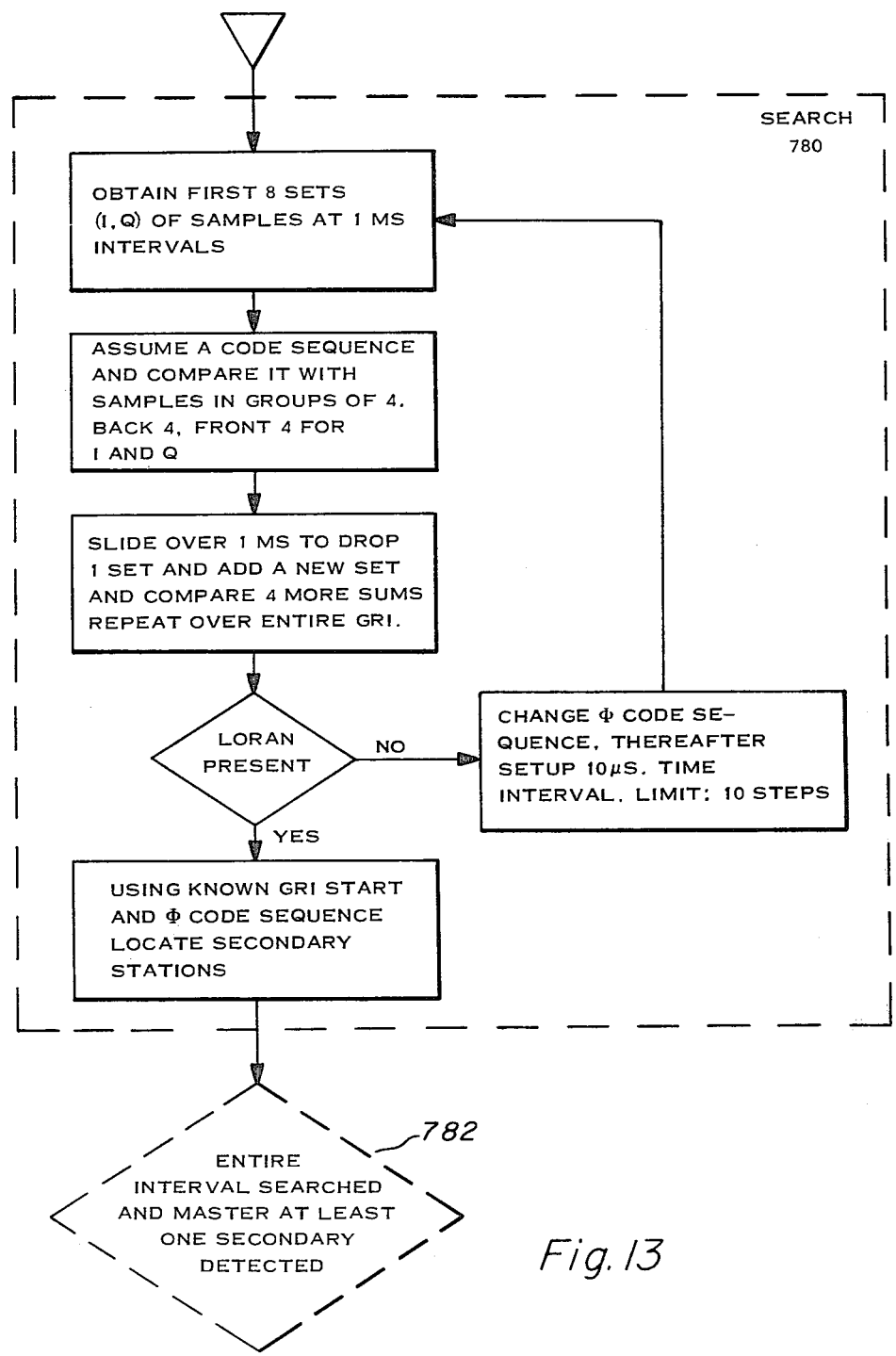
FIG. 13 is a flow chart for the search algorithm.

Referring now to FIG. 13, the search 780 (FIG. 12) is made by first outputting a 20-bit control word to the timer. At the time indicated by the control word, the timer generates two quadrature sampling instants which are separated by 2.5 $\mu$secs. The two data bits generated by these sampling instants are an in phase (I) and a guadrature (Q) sample. After the I and Q samples have been taken and latched into the storage flip-flops the timer also generates a data ready interrupts which indicates completion of the data sampling. The processor then proceeds by reading the two data bits and outputting a new control word which is incremented precisely one millisecond from the previous one and the cycle is repeated. The one millisecond cycle is repeated up to the end of the GRI where the processor must account for the difference between the actual GRI and some integer multiple of one millisecond intervals.

As the Loran signals are transmitted with a phase code of either normal or inverted signals, the phase code is seen as a change of algebraic sign in the input data. Each phase code being a pattern of eight plus or minus signals, and as the sampling position as to the Loran signals is not known all the possible phase codes must be tested.

The method used to test for the presence of a Loran signal is the sequential likelihood ratio test (SLRT). That is, samples are integrated according to an assumed phase code sequence for a number of GRI. Loran signals will tend to add linearly, while noise signals will tend to cancel out. This improves SNR and makes it possible to find and track the Loran signals even if the noise is much larger than the Loran signal. The SLRT is performed separately on the first and second halves of the Loran signal, and only if both SLRT's give a "found Loran" result for a given pattern it is assumed that a Loran signal has been found. As the data is taken at one millisecond intervals, it is possible that the samples will be taken between the received pulses and no detection made. Therefore, once all possible time slots on the GRI timeline have failed, the entire sampling pattern will be moved 100 $\mu$seconds, all integrators zeroed and the entire process repeated.

Thus, the search flow chart is as follows. Obtain the first eight measurements, spaced one msec. apart, beginning at the assumed start of the GRI. Each set contains an I (in phase) and a Q (quadrature) sample. Next, a phase code sequence, MA, is assumed and compared with the samples in groups of four for each of the samples. The four results are summed separately and the threshold tested. Then slide over one msec. to drop one sample and add a new sample to the seven retained and continue this procedure over the entire GRI. Four results are possible; namely, (1) a front four and back four for I and Q crosses either of the "Loran Present" thresholds — master found; (2) the sums cross the "No Loran Present" threshold — no master found; (3) time limit exceeded (13 GRI's); and (4) none of the above — take more data.

If no test passes or fails, change to the opposite phase code sequence and repeat. Testing and sampling with alternating phase code sequences is continued until a definitive test result occurs or the maximum number of GRI's is reached. When either the threshold is crossed or not crossed all sums are reset and a new GRI sequence begun offset by a 100 $\mu$sec. step. The steps are repeated until the master is found or 10 steps of 100 $\mu$sec. used.

If no master is found the entire process is begun again with the opposite phase code sequence used. If no master station has been found after this process the GRI is shifted 10 milliseconds and the search begun again.

Once a master station has been found, then the known GRI start and phase code sequence is used to search for secondary stations. The receiver then proceeds in accordance with the flow diagram of FIG. 12 down to cycle identification 802.

The purpose of cycle identification is to identify the standard sampling point of the Loran pulse. It runs concurrently with phase lock loop. Phase lock loop keeps the I (in phase) sample on a positive to negative zero crossing. This causes the envelope samples to be on an RF peak. The envelope channel (or delayed channel) is formed by delaying a portion of the Loran pulse and summing it with the incoming signal. At the point of the envelope where the delayed and undelayed signals are of equal amplitude after scaling the envelope crosses zero. At this point, there is a phase reversal, and this phase reversal defines a unique point on the pulse.

Envelope one (ENV1) and envelope two (ENV2) samples are taken on the envelope channel ten microseconds apart. Normally these two samples will have the same sign. If, however, the phase reversal occurs between the samples, the two samples will have opposite signs. The change in sign denotes the standard sampling point.

As the SNR of the envelope channel is very low ($-31$dB), ENV1 and ENV2 are actually formed by adding each respective envelope samples of each of the eight pulses from a given station overy many GRI's. These sums are compared with thresholds to determine the actual sign of the signal. These thresholds and the number of GRI's within which the thresholds must be reached to make a definitive sign determination are set using statistical analysis and simulation to provide a desired confidence level.

There are four possible conditions of the integrator. A positive correlation ($+$) is declared if the positive threshold is passed. A negative correlation ($-$) is declared if the negative threshold is exceeded. No correlation (NC) is declared if neither threshold has been passed and the timelimit has been passed. If neither threshold has been passed and the timelimit has not been passed then more data is collected. Each condition may apply to either integrator. Correct cycle identification results only when positive correlation on ENV1 and negative correlation on ENV2 occurs.

The rationale in the cycle selection process for a station is to select a PLL point whose nulling $R_n$ is within the allowable limits for R. If more than one PLL point has an $R_n$ within the limits, then the cycle having an $R_n$ closest to the nominal, $R_o$, is chosen.

The possible conditions and the corresponding actions are given in the following decision algorithm:

```
IF + - and R = R_o THEN CYCLE ID COMPLETE
IF + - AND R ≠ R_o THEN
  IF FLAG = 0 THEN
    FLAG ← SIGN (R-R_o)*R
    R ← R_o
    T ← T + SIGN (FLAG)*10μsec (MOVE 1 CYCLE)
  ELSE
  IF | R - R_o | > ||FLAG|-R_o| THEN
    T ← T - SIGN (FLAG)*10μsec (MOVE 1 CYCLE)
    R ← |FLAG|
    CYCLE ID COMPLETE
```

```
-continued
ELSE
IF + + OR (+/NC AND R = 15) THEN
  IF FLAG ≠ 0 THEN
      T ← T - SIGN (FLAG)*10μsec
      R ← |FLAG|
      CYCLE ID COMPLETE
  ELSE
      T ← T + 10μsec
      R ← R_o
ELSE
IF - - OR (NC/- AND R = 0) THEN
  IF FLAG ≠ 0 THEN
      T ← T - SIGN (FLAG)*10μsec
      R ← |FLAG|
  ELSE
      T ← T - 10μsec
      R = R_o
```

Although only a single embodiment of this invention has been described herein, it will be apparent to a person skilled in the art that various modifications to the details of construction shown and described may be made without departing from the scope of this invention.

What is claimed is:

1. A Loran C receiver comprising:
   (a) a keyboard means having a plurality of data entry keys for entering data including a GRI;
   (b) a microprocessor connected to the keyboard means for receiving data information including the GRI, the microprocessor including a bit time word producing means;
   (c) a timing means connected to the bit time word means of the microprocessor for orienting the microprocessor as to time in response to a time bit word;
   (d) a counter connected to the timing means for counting, said counter beginning to count upon receipt of a signal from the timing means indicating orientation of the microprocessor;
   (e) a groundwave phase and envelope channel sample strobe generator connected to the counter and microprocessor for producing a plurality of strobe signals at selected time intervals;
   (f) a delayed phase channel sample strobe generator means for producing a plurality of timing signals including a cycle done signal for the microprocessor;
   (g) a real time clock interrupt connected to the microprocessor timing means for providing a selected count frequency to the microprocessor;
   (h) an RF energy receiver means including a phase channel limiter and an envelope channel limiter for processing received RF signals into digital representations of the RF phase and envelope phase of the RF energy cycles;
   (i) an RF energy data latches and microprocessor input multiplexer, said latches selectively connected to the phase channel limiter and envelope channel limiter of the RF energy receiver means, and to the groundwave phase and envelope sample strobe generator for sampling the digitized representations of the RF phase and envelope phase of the RF energy cycles at the selected time intervals of the groundwave phase and envelope channel sample strobe generator, and said multiplexer connected to the latches and microprocessor for multiplexing the outputs of the latches of the microprocessor for processing;
   (j) a processing means for said microprocessor connected to the multiplexer, said processing means for utilizing the digitized phase information for GRI searching, coarse envelope and cycle identification of the master and secondary signals of the GRI and time difference determinations between the master station and succeeding secondary stations of the GRI; and
   (i) display means for displaying the time differences.

2. A Loran C receiver comprising:
   (a) a keyboard means having a plurality of data entry keys for entering data including a GRI into a microprocessor and a plurality of primary function keys including an automatic key for selecting automatic operation of the microprocessor;
   (b) a microprocessor connected to the keyboard means for receiving data information including the GRI, the microprocessor including a bit time word producing means;
   (c) a timing means connected to the bit time word means of the microprocessor for orienting the microprocessor as to time in response to a time bit word;
   (d) a counter connected to the timing means for counting, said counter beginning to count upon receipt of a signal from the timing means indicating orientation of the microprocessor;
   (e) a groundwave phase and envelope channel sample strobe generator connected to the counter and microprocessor for producing a plurality of strobe signals at selected time intervals;
   (f) a delayed phase channel sample strobe generator means for producing a plurality of timing signals including a cycle done signal for the microprocessor;
   (g) a real time clock interrupt connected to the microprocessor timing means for providing a selected count frequency to the microprocessor;
   (h) an RF energy receiver means including a phase channel limiter and an envelope channel limiter for processing received RF signals into digital representations of the RF phase and envelope phase of the RF energy cycles;
   (i) an RF energy data latches and microprocessor input multiplexer, said latches selectively connected to the phase channel limiter and envelope channel limiter of the RF energy receiver means, and to the groundwave phase and envelope sample strobe generator for sampling the digitized representations of the RF phase and envelope phase of the RF energy cycles at the selected time intervals of the groundwave phase and envelope channel sample strobe generator, and said multiplexer connected to the latches and microprocessor for multiplexing the outputs of the latches to the microprocessor for processing;
   (j) an automatic processing means for said microprocessor connected to the multiplexer, said automatic processing means for utilizing the digital phase information for master and secondary station searching of the GRI entered, coarse and cycle identification of the signals of the master station and secondary stations, and time difference determinations between the master station and succeeding secondary stations; and
   (k) display means for automatically displaying the time differences sequentially at regular intervals.

3. A Loran C receiver comprising:

(a) a keyboard means having a plurality of keys arranged in rows and columns including data entry keys for entering data including a GRI and primary function keys including an automatic key for selecting automatic operation;

(b) a microprocessor including a strobe for strobing the rows of keys, and a multiplexer for scanning the columns of keys for determining in sequence the keys pressed, said microprocessor having a time word producing means for producing a time word, a delay word, and control bits;

(c) a timing means connected to the time word producing means of the microprocessor for orienting the microprocessor as to time in response to the time bit word, said timing means including an address decoder 542, an input data and control register 544, a binary counter 490, and a comparator 514, said address decoder connected to the input data and control register for addressing the time bit word therein, and said comparator connected to the binary counter and register for comparing the count and the timer word and producing an output signal when equal;

(d) a real time clock interrupt 752 connected to the output of the address decoder and microprocessor time word producing means, said address decoder providing a reset signal to the interrupt and said interrupt producing a count frequency in response to the binary counter 490;

(e) a counter 628 connected to the register 544 and comparator 514 of said timing means, said counter beginning to count in response to the output signal of the comparator;

(f) a groundwave phase and envelope sample strobe generator 682 connected to the counter for producing a plurality of selected strobe signals in response to both the control bits of the microprocessor and the counter;

(g) a delayed phase channel sample strobe generator 660 having a comparator connected to the counter 628 and input data and control register 544 for comparing the count of the counter to the time delay word of the microprocessor, a counter 744 connected to the comparator output and a plurality of flip-flops operatively connected together and to the counter for producing a plurality of timing signals including a cycle done signal for the microprocessor;

(h) an RF energy receiver means including a phase channel limiter and an envelope channel limiter for processing received RF signals into digital representations of the RF phase and envelope phase of the cycles;

(i) an RF energy data latches and microprocessor input multiplexer 210, said latches selectively connected to the phase channel limiter and envelope channel limiter of the RF energy receiver means and to the groundwave phase and envelope sample strobe generator, said multiplexer connected to the latches and microprocessor for multiplexing the outputs of the latches to the microprocessor for processing;

(j) an automatic processing means for said microprocessor receiving the output of the multiplexer for GRI searching, coarse envelope and cycle identification of the master and secondary stations of the GRI and determining sequentially the time differences between the master station and succeeding secondary stations; and (k) a display means connected to the microprocessor for automatically displaying the time differences sequentially at regular intervals.

4. A Loran C receiver according to claim 3 wherein the primary function keys further includes a time difference key for converting the microprocessor from the automatic operation to a manual operation.

5. A Loran C receiver according to claim 3 wherein the keyboard means further includes secondary display keys including secondary display keys including a monitor key, said monitor key connected to the microprocessor for use in conjunction first with a data entry key for desired station selection and secondly with a data entry key for a desired monitor code for selecting for display one of the following codes:

Code 1 for displaying the signal-to-noise ratio,

Code 2 for displaying the absolute envelope-to-cycle discrepancy,

Code 3 for displaying the relative envelope-to-cycle discrepancy between the master-to-station envelope-to-cycle discrepancy; and Code 4 for displaying the frequency error.

6. Loran C receiver according to claim 5 wherein the secondary display keys further include a mode key connected to the microprocessor for selecting for display one of the following modes:

(0) for searching to acquire all possible stations in the chain;

(1) for narrowband for finding the groundwave and be ahead of the skywave;

(2) for wideband for fine tuning stations;

(3) for cycle identification for providing further resolution of the tuning;

(4) for track for determining the selected RF cycle and for phase locking to it; and (5) for track only for providing a manual override of cycle identification.

7. A Loran C receiver according to claim 3 wherein the keyboard means further includes special function keys including a track key operatively connected to the microprocessor, said track key for overriding the decision in cycle identification when the correct time difference is known.

8. A Loran C receiver according to claim 7 wherein the special function keys further include a change in time difference key connected to said microprocessor, said change in time difference key operative to override cycle identification in obtaining the correct TD.

9. A Loran C receiver according to claim 3 wherein the microprocessor is programmed: (a) for searching the GRI and making a decision whether a master station and at least one secondary signal is detected, if not advancing the time interval a selected segment and searching the GRI again; if true (b) making a decision whether the station has completed coarse envelope, if not coarse envelope is completed; if true (c) for locking onto the signal chain and determining whether the signal-to-noise ratio is too low, if it is dropping the station and making a decision whether a master and at least one secondary station are present, if not making a new search and if true selecting the next station; if not too low (e) for making a decision whether cycle identification has been made, if not making cycle identification; if true (f) for making a decision whether less than five stations are present, if not proceeding to the next station; if true (g) for making a background search and making a decision whether any stations are detected, if not proceeding to the next station and repeat; and if true (h) for incrementing the number of stations and the cycle repeated.

10. A Loran C receiver comprising:
  (a) an antenna for receiving master and slave RF signals at group repetition intervals;
  (b) a preamplifier connected to the antenna for amplifying the RF signals received by the antenna;
  (c) a filter connected to the preamplifier for passing a preselected center frequency and bandwidth;
  (d) an undelayed channel and a delayed channel connected to the filter, said undelayed channel passing the filtered RF signals and said delayed channel passing inverted the filtered RF signals after a preselected delay time;
  (e) a summer for adding the filtered RF signals of the undelayed channel to those of the delayed channel;
  (f) a phase channel limiter connected to the output of the delayed channel for converting the delayed channel filtered RF signals into digital information to preserve the phase of the incoming signals;
  (g) an envelope channel limiter connected to the output of the summer for converting the summed RF energy into digital information to preserve the phase of the summed signals;
  (h) a timer means for producing clock pulses including sample strobes at preselected intervals;
  (i) a solid state logic means connected to the timer and digital outputs of the phase channel limiter, and the envelope channel limiter, said solid state logic means for storing the state of the phase channel limiter and envelope channel limiter at preselected times as determined by the sample strobes of the timer;
  (j) a solid state microprocessor connected to the timer and solid state logic means, said solid state microprocessor programmed to generate a timer word, to selectively control the solid state logic means, to receive the states of the phase channel limiter and envelope channel limiter to determine the presence of Loran C signals at a selected group repetition interval, both master and slave pulses thereof to perform coarse envelope, phase lock loop and cycle identification on the master and slave pulses and to determine the time differences between the master and each slave station; and
  (k) a panel means including a keyboard for selecting a Loran C GRI and a visible display for displaying the time difference between the time of arrival of the master and slave station pulses.

11. A Loran C receiver according to claim 10 further including a tunable notch filter means connected to the output of the preamplifier for determining the frequencies of interfering signals and tuning them out of the received signals.

12. A Loran C receiver according to claim 10 wherein the undelayed channel means includes a pulse shaping means connected to the solid state microprocessor, said pulse shaping means operative responsive to correction signals of the solid state microporcessor for correcting the received master and slave pulses for any distortions whereby they correspond with the master and slave pulses as transmitted.

13. A Loran C receiver according to claim 10 wherein the timer means includes a temperature compensated crystal oscillator, a timing and strobe circuit connected to the crystal oscillator for producing selected timing pulses for the solid state logic means, and a four phase clock generator connected to the crystal oscillator for producing phased clock signals for the solid state microprocessor.

14. A Loran C receiver according to claim 13 wherein the timing and strobe circuit includes a microprocessor communications register unit (CRU) decoder and buffer, the CRU decoder having its select terminals connected to a first set of preselected address terminals of the microprocessor, its enable terminal connected to the CRU clock terminal, and its buffer input terminals connected to a second set of preselected address terminals of the microprocessor, and data terminal of the microprocessor for determining the bit of the timer word input, an input data and control register including a plurality of latches connected to the microprocessor CRU decoder and buffer for storing the timer word, a 20 bit synchronous binary counter, and a 20 bit comparator for comparing bit by bit the timer word with the 20 bit synchronous binary counter for producing a comparator out signal and a master comparator signal, a real time clock interrupt circuit for the microprocessor connected to the microprocessor CRU decoder and buffer for producing two preselected clocking frequencies for the microprocessor to determine time lapse, a processor data ready interrupt having its clear terminal connected to an output of the microprocessor CRU decoder and buffer for communicating to the microprocessor the completion of the timer clock sampling pulses, a five decade synchronous counter for counting preselected one msec. intervals including a plurality of synchronous 4 bit counters connected in cascade, and an RF phase channel sample strobe generator connected to the five decade synchronous counter and input data and control register for generating a first set of timing signals for ground wave phase lock loop determination and an envelope channel sample strobe generator connected to the output of the five decade synchronous counter for generating a second set of timing signals for use in determining cycle identification, and a delayed phase channel sample strobe generator for generating a third set of selected timing signals for use in determining coarse envelope.

15. A Loran C receiver according to claim 10 wherein the solid state logic means includes an interrupt latch and decoder connected to the timer means for interrupting the solid state microprocessor when data is ready for input, a plurality of latches connected to selected timing outputs of the timer, the digitized output of the phase channel limiter, and the digitized output of the envelope channel limiter for storing the sampled RF output of the phase channel limiter and the digitized output of the envelope channel limiter, a multiplexer connected to the outputs of the latches and microprocessor select terminals, the output of said multiplexer connected to the communications register unit IN terminal and a keyboard input multiplexer, a keyboard having a plurality of columns and rows, the keyboard multiplexer connected to the keyboard columns for scanning the keyboard for pressed keys and providing information to microprocessor.

16. A Loran C receiver according to claim 13 wherein the pulse shaping means comprises a switchable variable gain element and an RF unit interface latch and buffer having inputs connected to the microprocessor select terminals and data out terminals for storing gain control signals and outputs connected to the switchable variable gain element for controlling switching of the switchable variable gain element.

17. A Loran C receiver according to claim 10 wherein the display means comprises a microprocessor communications register unit decoder and address buffers having inputs connected to the solid state microprocessor for receiving therefrom four bits of binary coded decimal for each of seven digits, a data register connected to the outputs of the processor CRU and address buffers, a keyboard buffer and display decoders connected to the outputs of the data register, a keyboard having its rows connected to the keyboard buffer for row strobing and a plurality of displays connected to the display decoders for displaying information.

* * * * *